US008069462B2

(12) United States Patent
Choi et al.

(10) Patent No.: US 8,069,462 B2
(45) Date of Patent: Nov. 29, 2011

(54) DIGITAL BROADCASTING SYSTEM AND DATA PROCESSING METHOD

(75) Inventors: In Hwan Choi, Gyeonggi-do (KR); Jong Yeul Suh, Seoul (KR); Chul Soo Lee, Seoul (KR); Jae Hyung Song, Seoul (KR); Jin Pil Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 527 days.

(21) Appl. No.: 12/234,855

(22) Filed: Sep. 22, 2008

(65) Prior Publication Data

US 2009/0083785 A1 Mar. 26, 2009

Related U.S. Application Data

(60) Provisional application No. 60/974,084, filed on Sep. 21, 2007, provisional application No. 60/977,379, filed on Oct. 4, 2007, provisional application No. 60/979,861, filed on Oct. 14, 2007, provisional application No. 61/044,504, filed on Apr. 13, 2008, provisional application No. 61/076,686, filed on Jun. 29, 2008.

(30) Foreign Application Priority Data

Sep. 18, 2008 (KR) ........................ 10-2008-0091839

(51) Int. Cl.
*H04N 7/16* (2006.01)

(52) U.S. Cl. .............. 725/62; 725/28; 725/39; 725/148; 725/151; 375/316

(58) Field of Classification Search .................... 725/28, 725/39, 62, 148, 151; 375/316
See application file for complete search history.

(56) References Cited

U.S. PATENT DOCUMENTS 5,754,651 A 5/1998 Blatter et al.
7,672,399 B2 * 3/2010 Simon .......................... 375/299

(Continued)

FOREIGN PATENT DOCUMENTS

EP 0996291 4/2000

(Continued)

OTHER PUBLICATIONS

ETSI, "Digital Video Broadcasting; Transmission System for Handheld Terminals", ETSI EN 302 304, V1.1.1, Nov. 2004.

(Continued)

*Primary Examiner* — Pankaj Kumar
*Assistant Examiner* — Sahar A Baig
(74) *Attorney, Agent, or Firm* — Lee, Hong, Degerman, Kang & Waimey

(57) ABSTRACT

A digital broadcasting system and method of processing data therein are disclosed. A receiving system of the digital broadcasting system includes a baseband processor unit receiving a broadcast signal including mobile service data and main service data, the mobile service data configuring an RS frame, the RS frame including the mobile service data and at least one signaling information data describing rating information of the mobile service data, a management processor unit obtaining the rating information of the mobile service data by parsing the signaling information data from the RS frame, the management processor unit determining a presence or non-presence of a viewing restriction by comparing the obtained rating information of the mobile service data to viewing restriction rating information set by a user, and a presentation processor unit blocking the mobile service data if the viewing restriction of the mobile service data is determined.

16 Claims, 41 Drawing Sheets

U.S. PATENT DOCUMENTS

| | | | | |
|---|---|---|---|---|
| 2004/0136352 | A1* | 7/2004 | Fu et al. | 370/341 |
| 2005/0166244 | A1 | 7/2005 | Moon | |
| 2006/0072623 | A1* | 4/2006 | Park | 370/487 |
| 2006/0126668 | A1 | 6/2006 | Kwon et al. | |
| 2006/0140301 | A1 | 6/2006 | Choi et al. | |
| 2006/0184965 | A1 | 8/2006 | Lee et al. | |
| 2006/0246836 | A1* | 11/2006 | Simon | 455/3.01 |
| 2007/0071110 | A1 | 3/2007 | Choi et al. | |
| 2007/0101352 | A1 | 5/2007 | Rabina et al. | |
| 2007/0121681 | A1 | 5/2007 | Kang et al. | |
| 2008/0313678 | A1* | 12/2008 | Ryu et al. | 725/62 |

FOREIGN PATENT DOCUMENTS

| | | |
|---|---|---|
| EP | 1628420 | 2/2006 |
| EP | 1768396 | 3/2007 |
| JP | 11-069253 | 3/1999 |
| JP | 2001-54031 | 2/2001 |
| JP | 2002-141877 | 5/2002 |
| JP | 2003-134117 | 5/2003 |
| JP | 2004-129126 | 4/2004 |
| JP | 2007-096403 | 4/2007 |
| KR | 10-2001-0022306 | 3/2001 |
| KR | 10-2003-0030175 | 4/2003 |
| KR | 10-2003-0037138 | 5/2003 |
| KR | 1020040032282 | 4/2004 |
| KR | 1020040032283 | 4/2004 |
| KR | 10-2005-0062867 | 6/2005 |
| KR | 1020050066954 | 6/2005 |
| KR | 1020050072988 | 7/2005 |
| KR | 10-2005-0117314 | 12/2005 |
| KR | 1020050118206 | 12/2005 |
| KR | 10-2006-0012510 | 2/2006 |
| KR | 10-2006-0013999 | 2/2006 |
| KR | 10-2006-0063867 | 6/2006 |
| KR | 10-2006-0070665 | 6/2006 |
| KR | 10-2006-0108057 | 10/2006 |
| KR | 1020060133011 | 12/2006 |
| KR | 1020070015810 | 2/2007 |
| KR | 1020070030739 | 3/2007 |
| KR | 1020070055671 | 5/2007 |
| KR | 1020070068960 | 7/2007 |
| KR | 1020070075549 | 7/2007 |
| WO | 01/28246 | 4/2001 |
| WO | 03/017254 | 2/2003 |
| WO | 03/049449 | 6/2003 |
| WO | 2004/057873 | 7/2004 |
| WO | 2004/066652 | 8/2004 |
| WO | 2005/032034 | 4/2005 |

OTHER PUBLICATIONS

Advanced Television Systems Committee, "ATSC Standard: Program and System information Protocol for Terrestrial Broadcast and Cable (Revision C) with Amendment No. 1", A165C, Jan. 2, 2006.

European Telecommunications Standards Institute (ETSI), "Digital Video Broadcasting (DVB); IP Datacast over DVB-H: Program Specific Information (PSI)/Service Information (SI)," ETSI TS 102 470, Version 1.1.1, Apr. 2006.

Digital Video Broadcasting (DVB), "DVB-H Implementation Guidelines," DVB Document A092, Revision 2, May 2007.

European Telecommunications Standards Institute (ETSI), "Radio Broadcasting Systems; Digital Audio Broadcasting (DAB) to Mobile, Portable and Fixed Receivers," ETSI EN 300 401, Version 1.4.1, Jun. 2006.

European Telecommunications Standards Institute (ETSI), "Digital Audio Broadcasting (DAB); Internet Protocol (IP) Datagram Tunnelling," ETSI EN 201 735, Version 1.1.1, Sep. 2000.

* cited by examiner

FIG. 15

| Syntax | # of bits |
|---|---|
| FIC_Segment () { | |
| FIC_type | 2 |
| Reserved | 5 |
| error_indicator | 1 |
| FIC_seg_number | 4 |
| FIC_last_seg_number | 4 |
| for (i=0:i<N:i++) { | |
| data_byte | 8 |
| } | |
| } | |

FIG. 16

| | Syntax | # of bits |
|---|---|---|
| A first region | if (FIC_seg_number == 0) { | |
| | current_next_indicator | 1 |
| | Reserved | 2 |
| | ESG_version | 5 |
| | transport_stream_id | 16 |
| | } | |
| A second region | while ( ensemble_id ! = 0xFF ) | |
| | ensemble id | 8 |
| | reserved | 3 |
| | SI_version | 5 |
| | num_channel | 3 |
| A third region | for (i=0:i< num_channel:i++) { | |
| | channel_type | 5 |
| | channel_activity | 2 |
| | CA_indicator | 1 |
| | Stand_alone_Semce_indtcator | |
| | major_channel_num | 8 |
| | minor_channel_num | 8 |
| | } | |
| | } // end of while | |
| | } | |

FIG. 17

| Syntax | No. of Bits | Format |
|---|---|---|
| service_map_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| reserved | 3 | '111' |
| version_number | 5 | uimsbf |
| section_number | 8 | uimsbf |
| last_section_number | 8 | uimsbf |
| SMT_protocol_version | 8 | uimsbf |
| ensemble_id | 8 | uimsbf |
| num_channels | 8 | uimsbf |
| for (i=0; i<num_channels; i++) | | |
| { | | |
| major_channel_number | 8 | uimsbf |
| minor_channel_number | 8 | uimsbf |
| short_channel_name | 8*8 | |
| service_id | 16 | uimsbf |
| service_type | 6 | uimsbf |
| virtual_channel_activity | 2 | uimsbf |
| num_components | 5 | uimsbf |
| IP_version_flag | 1 | bslbf |
| source_IP_address_flag | 1 | bslbf |
| virtual_channel_target_IP_address_flag | 1 | bslbf |
| if (source_IP_address_flag) | | |
| source_IP_address | 32 or 128 | uimsbf |
| if (virtual_channel_target_IP_address_flag) | | |
| virtual_channel_target_IP_address | 32 or 128 | uimsbf |
| for (j=0; j<num_components; j++) | | |
| { | | |
| RTP_payload_type | 7 | uimsbf |
| component_target_IP_address _flag | 1 | bslbf |
| if (component_target_IP_address _flag) | | |
| component_target_IP_address | 32 or 128 | uimsbf |
| reserved | 2 | '11' |
| port_num_count | 6 | uimsbf |
| target_UDP_port_num | 16 | uimsbf |
| descriptors_length | 8 | uimsbf |
| for (k=0; k<descriptors_length; k++) | | |
| { | | |
| component_level_descriptor() | | |
| } | | |
| } | | |
| descriptors_length | 8 | uimsbf |
| for (m=0; m<descriptors_length; m++) | | |
| { | | |
| virtual_channel_level_descriptor() | | |
| } | | |
| } | | |
| descriptors_length | 8 | uimsbf |
| for (n=0; n<descriptors_length; n++) { | | |
| { | | |
| ensemble_level_descriptor() | | |
| } ensemble_level_descriptor() | | |
| } | | |

FIG. 18

| Syntax | No. of Bits | Format |
|---|---|---|
| MH_audio_descriptor() { | | |
| descriptor_tag | 8 | TBD |
| descriptor_length | 8 | uimsbf |
| channel_configuration | 8 | uimsbf |
| reserved | 5 | '11111' |
| sample_rate_code | 3 | uimsbf |
| reserved | 2 | '11' |
| bit_rate_code | 6 | uimsbf |
| ISO_639_language_code | 3*8 | uimsbf |
| } | | |

FIG. 19

| Syntax | No. of Bits | Format |
|---|---|---|
| MH_RTP_payload_type_descriptor() { | | |
| descriptor_tag | 8 | TBD |
| descriptor_length | 8 | uimsbf |
| reserved | 1 | '1' |
| RTP_payload_type | 7 | uimsbf |
| MIME_type_length | 8 | uimsbf |
| MIME_typc() | var | |
| } | | |

FIG. 20

| Syntax | No. of Bits | Format |
|---|---|---|
| MH_current_event_descriptor() { | | |
| descriptor_tag | 8 | TBD |
| descriptor_length | 8 | uimsbf |
| current_event_start_time | 4*8 | uimsbf |
| current_event_duration | 3*8 | uimsbf |
| Title_length | 8 | uimsbf |
| Title_text() | var | |
| } | | |

FIG. 21

| Syntax | No. of Bits | Format |
|---|---|---|
| MH_next_event_descriptor() { | | |
| descriptor_tag | 8 | TBD |
| descriptor_length | 8 | uimsbf |
| next_event_start_time | 4*8 | uimsbf |
| next_event_duration | 3*8 | uimsbf |
| title_length | 8 | uimsbf |
| title_text() | var | |
| } | | |

FIG. 22

| Syntax | No. of Bits | Format |
|---|---|---|
| MH_system_time_descriptor() { | | |
| descriptor_tag | 8 | TBD |
| descriptor_length | 8 | uimsbf |
| system_time | 32 | uimsbf |
| GPS_UTC_offset | 8 | uimsbf |
| time_zone_offset_polarity_rate_code | 1 | bslbf |
| time_zone_offset | 31 | uimsbf |
| daylight_savings() | 16 | uimsbf |
| time_zone() | 5*8 | |
| } | | |

FIG. 26

| Syntax | No. of bits | Format |
|---|---|---|
| system_time_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| reserved | 3 | '111' |
| version_number | 5 | uimsbf |
| section_number | 8 | uimsbf |
| last_section_number | 8 | uimsbf |
| system_time | 32 | uimsbf |
| GPS_UTC_offset | 8 | uimsbf |
| daylight_savings | 16 | uimsbf |
| reserved | 7 | '1111111' |
| time_zone_offset_polarity | 1 | bslbf |
| time_zone_offset | 32 | uimsbf |
| descriptors_length | 8 | uimsbf |
| for (i=0; i<N; i++) { | | |
| descriptors() | | |
| } | | |
| } | | |

FIG. 29

```
STT type:
<xs:complexType name="STT type">
    <xs:sequence>
        <xs:element name="SystemTime" type="xs:unsignedInt"/>
        <xs:element name="GPSUTCoffset" type="xs:unsignedInt"/>
        <xs:element name="DaylightSavings" type="xs:unsignedInt"/>
        <xs:element name="TimeZoneOffsetPolarity" type="xs:boolean"/>
        <xs:element name="TimeZoneOffset" type="xs:unsignedInt"/>
    </xs:sequence>
    <xs:attributeGroup ref="MHip:RecordFormat"/>
</xs:complexType>

Record Format:
<xs:attributeGroup name="RecordFormat">
    <xs:attribute name="RecordId" type="xs:unsignedInt" use="required"/>
    <xs:attribute name="VersionNumber" type="xs:unsignedInt" use="required"/>
</xs:attributeGroup>
```

FIG. 31

| Syntax | No. of bits | Format |
|---|---|---|
| cell_information_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| reserved | 3 | '111' |
| version_number | 5 | uimsbf |
| section_number | 8 | uimsbf |
| last_section_number | 8 | uimsbf |
| num_cells_in_section | 8 | uimsbf |
| for (i=0; i<num_cells_in_section; i++) | | |
| { | | |
| cell_id | 32 | uimsbf |
| num_channels_in_cell | 8 | uimsbf |
| for (j=0; j<num_channels_in_cell; j++) { | | |
| major_channel_number | 8 | uimsbf |
| minor_channel_number | 8 | uimsbf |
| carrier_frequency | 32 | uimsbf |
| descriptors_length | 8 | uimsbf |
| for (k=0; k<N; k++) { | | |
| descriptor() | | |
| } | | |
| } | | |
| additional_descriptors_length | 8 | uimsbf |
| for (m=0; m<N; m++) { | | |
| additional_descriptor() | | |
| } | | |
| } | | |

FIG. 34

```
CIT type:
<xs:complexType name="CIT-type">
  <xs:sequence>
    <xs:element name="NumCellsInSection" type="xs:unsignedInt"/>
    <xs:element name="CellInformation" type="MHip:CellInformationtype" maxOccurs="unbounded"/>
  </xs:sequence>
  <xs:attributeGroup ref="MHip:RecordFormat"/>
</xs:complexType>
Cell Information type:
<xs:complexType name="CellInformationtype">
  <xs:sequence>
    <xs:element name="ChannelInformation" type="MHip:ChannelInformationtype" maxOccurs="unbounded"/>
  </xs:sequence>
  <xs:attributeGroup ref="MHip:CellInformationAttribute"/>
</xs:complexType>
Channel Information type:
<xs:complexType name="ChannelInformationtype">
  <xs:sequence>
    <xs:element name="MajorChannelNumber"/>
    <xs:element name="MinorChannelNumber"/>
    <xs:element name="CarrierFrequency"/>
  </xs:sequence>
</xs:complexType>
Cell Information Attribute:
<xs:attributeGroup name="CellInformationAttribute">
  <xs:attribute name="CellID" type="xs:unsignedInt" use="required"/>
  <xs:attribute name="NumChannels" type="xs:unsignedInt" use="required"/>
</xs:attributeGroup>
Record Format:
<xs:attributeGroup name="RecordFormat">
  <xs:attribute name="RecordId" type="xs:unsignedInt" use="required"/>
  <xs:attribute name="VersionNumber" type="xs:unsignedInt" use="required"/>
</xs:attributeGroup>
```

FIG. 36

| Syntax | No. of bits | Format |
|---|---|---|
| rating_region_table_section() { | | |
| table_id | 8 | TBD |
| section_syntax_indicator | 1 | '0' |
| private_indicator | 1 | '1' |
| reserved | 2 | '11' |
| section_length | 12 | uimsbf |
| rating_region | 8 | uimsbf |
| reserved | 3 | '111' |
| version_number | 5 | uimsbf |
| section_number | 8 | uimsbf |
| last_section_number | 8 | uimsbf |
| rating_region_name_length | 8 | uimsbf |
| rating_region_name_text() | var | |
| dimensions_defined | 8 | uimsbf |
| for(i=0; i<dimensions_defined; i++) { | | |
| dimension_name_length | 8 | uimsbf |
| dimension_name_text() | var | |
| reserved | 3 | '111' |
| graduated_scale | 1 | bslbf |
| values_defined | 4 | uimsbf |
| for (j=0; j<values_defined; j++) { | | |
| rating_level_tag | 8 | uimsbf |
| abbrev_rating_value_length | 8 | uimsbf |
| abbrev_rating_value_text() | var | |
| rating_value_length | 8 | uimsbf |
| rating_value_text() | var | |
| } | 8 | uimsbf |
| } | | |
| reserved | 6 | '111111' |
| descriptors_length | 10 | uimsbf |
| for (i=0; i<N; i++) { | | |
| descriptor() | | |
| } | | |
| } | | |

FIG. 37

| Syntax | No. of bits | Format |
|---|---|---|
| content_advisory_descriptor() { | | |
| descriptor_tag | 8 | TBD |
| descriptor_length | 8 | uimsbf |
| reserved | 2 | '11' |
| rating_region_count | 6 | |
| for (i=0; i<rating_region_count; i++) { | | |
| rating_region | 8 | uimsbf |
| rated_dimensions | 3 | '111' |
| for (j=0; j<rated_dimensions; j++) { | | |
| rating_dimension_j | 8 | uimsbf |
| rating_level_tag | 8 | uimsbf |
| reserved | 4 | '1111' |
| rating_value | 4 | uimsbf |
| } | var | |
| rating_desription_length | 8 | uimsbf |
| rating_description_text() | var | |
| } | | |
| } | | |

FIG. 43

```
RRT type:
<xs:complexType name="RRT type">
  <xs:sequence>
    <xs:element name="RatingRegion" type="xs:unsignedInt"/>
    <xs:element name="RatingRegionName" type="xs:string"/>
    <xs:element name="DimensionsDefined" type="xs:unsignedInt"/>
    <xs:element name="Dimension" type="MHip:Dimensiontype" maxOccurs="unbounded"/>
  </xs:sequence>
  <xs:attributeGroup ref="MHip:RecordFormat"/>
</xs:complexType>

Dimension type:
<xs:complexType name="Dimensiontype">
  <xs:sequence>
    <xs:element name="GraduatedScale" type="xs:boolean"/>
    <xs:element name="ValuesDefined" type="xs:unsignedInt"/>
    <xs:element name="RatingValue" type="MPHip:RatingValuetype" maxOccurs="unbounded"/>
  </xs:sequence>
  <xs:attribute name="DimensionName" use="required"/>
</xs:complexType>

Rating Value type:
<xs:complexType name="RatingValuetype">
  <xs:sequence>
    <xs:element name="RatingLevelTag" type="xs:unsignedInt"/>
  </xs:sequence>
    <xs:attribute name="AbbrevRatingValueText" type="xs:string" use="required"/>
    <xs:attribute name="RatingValueText" type="xs:string" use="required"/>
</xs:complexType>
```

FIG. 44

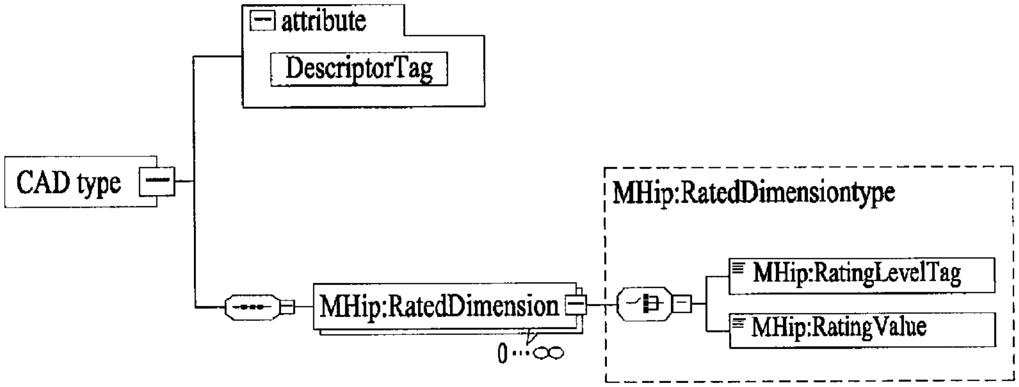

FIG. 45

```
CAD type:
<xs:complexType name="CAD type">
  <xs:sequence>
    <xs:element name="RatedDimension" type="MHip:RatedDimensiontype" maxOccurs="unbounded"/>
  </xs:sequence>
  <xs:attribute name="DescriptorTag" type="xs:unsignedInt" use="required"/>
</xs:complexType>

Rated Dimension type:
 <xs:complexType name="RatedDimensiontype">
   <xs:choice>
     <xs:element name="RatingLevelTag" type="xs:unsignedInt"/>
     <xs:element name="RatingValue" type="xs:unsignedInt"/>
   </xs:choice>
 </xs:complexType>
```

DIGITAL BROADCASTING SYSTEM AND DATA PROCESSING METHOD

This application claims the benefit of U.S. Provisional Application No. 60/974,084, filed on Sep. 21, 2007, which is hereby incorporated by reference. Also, this application claims the benefit of U.S. Provisional Application No. 60/977,379, filed on Oct. 4, 2007, which is hereby incorporated by reference. This application also claims the benefit of U.S. Provisional Application No. 60/979,861, filed on Oct. 14, 2007, which is hereby incorporated by reference. This application also claims the benefit of U.S. Provisional Application No. 61/044,504, filed on Apr. 13, 2008, which is hereby incorporated by reference. This application also claims the benefit of U.S. Provisional Application No. 61/076,686, filed on Jun. 29, 2008, which is hereby incorporated by reference. This application also claims the priority benefit of Korean Application No. 10-2008-0091839, filed on Sep. 18, 2008, which is hereby incorporated by reference.

BACKGROUND OF THE INVENTION

1. Field of the Invention

The present invention relates to a digital broadcasting system, and more particularly, to a digital broadcasting system and a data processing method.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a data processing method that substantially obviate one or more problems due to limitations and disadvantages of the related art.

An object of the present invention is to provide a digital broadcasting system and a data processing method that are highly resistant to channel changes and noise.

Another object of the present invention is to provide a receiving system and method of processing data therein, by which IP based signal table data is received and processed.

Another object of the present invention is to provide a receiving system and method of processing data therein, by which non-IP type signal table data is received and processed.

A further object of the present invention is to provide a receiving system and method of processing data therein, by which a program can be blocked within a user-specific viewing level even if a viewing restriction level within an RRT (rating region table) in a signaling table is changed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a receiving system according to the present invention includes a baseband processor unit, a management processor, and a presentation processor unit. The baseband processor unit receives a broadcast signal including mobile service data and main service data. The mobile service data can configure an RS frame, the RS frame includes the mobile service data and at least one signaling information data describing rating information of the mobile service data. The management processor unit obtains the rating information of the mobile service data by parsing the signaling information data from the RS frame. The management processor unit determines a presence or non-presence of a viewing restriction by comparing the obtained rating information of the mobile service data to viewing restriction rating information set by a user. The presentation processor unit blocks the mobile service data if the viewing restriction of the mobile service data is determined.

Data of the RS frame can configure at least one or more data groups, each of the at least one or more data groups includes the data of the RS frame and a plurality of known data sequences, and transmission parameter channel (TPC) data and fast information channel (FIC) data are received by being included between a first known data sequence and a second known data sequence among a plurality of the known data sequences.

If the signaling information data is received in a non-IP signaling format by being included in the RS frame, the management processor unit obtains the rating information of the mobile service data in a manner of extracting a non-IP signaling packet from the RS frame and then parsing the corresponding signaling information data from the extracted non-IP signaling packet according to a unique identifier of the signaling information data.

If the signaling information data is received in an IP-based signaling format by being included in the RS frame, the management processor unit obtains the rating information of the mobile service data in a manner of extracting an IP datagram from the RS frame and then parsing the corresponding signaling information data from the extracted IP datagram according to a unique identifier of the signaling information data.

The signaling information data includes a rating region table (RRT) describing rating classification information of the mobile service data and a content advisory descriptor (CAD) describing the rating information on the corresponding mobile service data.

Each of the rating region table and the content advisory descriptor includes rating level tag information for identifying a corresponding rating level uniquely.

In this case, the management processor unit determines the presence or non-presence of the viewing restriction of the mobile service data by referring to the rating level tag information of the corresponding mobile service data obtained from the rating region table and the content advisory descriptor.

The signaling information data further includes at least one selected from the group consisting of a service map table (SMT) providing channel configuration information of the mobile service data, a system time table (STT) providing information associated with a time and a cell information table (CIT) providing information associated with a cell.

In another aspect of the present invention, a method of processing data in a receiving system includes the steps of receiving a broadcast signal including mobile service data and main service data, the mobile service data configuring an RS frame, the RS frame including the mobile service data and at least one signaling information data describing rating information of the mobile service data, determining a presence or non-presence of a viewing restriction in a manner of obtaining the rating information of the mobile service data by parsing the signaling information data from the RS frame and then comparing the obtained rating information of the mobile service data to viewing restriction rating information set by a user, and blocking the mobile service data if the viewing restriction of the mobile service data is determined.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 illustrates an exemplary bit stream syntax structure with respect to an FIC segment according to an embodiment of the present invention;

FIG. 16 illustrates an exemplary bit stream syntax structure with respect to a payload of an FIC segment according to the present invention, when an FIC type field value is equal to '0';

FIG. 17 illustrates an exemplary bit stream syntax structure of a service map table according to the present invention;

FIG. 18 illustrates an exemplary bit stream syntax structure of an MH audio descriptor according to the present invention;

FIG. 19 illustrates an exemplary bit stream syntax structure of an MH RTP payload type descriptor according to the present invention;

FIG. 20 illustrates an exemplary bit stream syntax structure of an MH current event descriptor according to the present invention;

FIG. 21 illustrates an exemplary bit stream syntax structure of an MH next event descriptor according to the present invention;

FIG. 22 illustrates an exemplary bit stream syntax structure of an MH system time descriptor according to the present invention;

FIG. 26 is a diagram of a syntax structure for an STT section in signaling tables according to one embodiment of the present invention;

FIG. 29 is a diagram for the STT data of FIG. 28 represented in XML schema format;

FIG. 31 is a diagram of a syntax structure for a CIT section in signaling tables according to one embodiment of the present invention;

FIG. 34 is a diagram for the CIT data of FIG. 33 represented in XML schema format;

FIG. 36 is a diagram of a syntax structure for an RRT section in signaling tables according to one embodiment of the present invention;

FIG. 37 is a diagram of a syntax structure for a content advisory descriptor (CAD) according to one embodiment of the present invention;

FIG. 43 is a diagram for the RRT data of FIG. 42 represented in XML schema format;

FIG. 44 is an exemplary diagram for an XML data structure of CAD data received in IP based signaling format according to the present invention;

FIG. 45 is a diagram for the CAD data of FIG. 44 represented in XML schema format.

DETAILED DESCRIPTION OF THE INVENTION

Figure 1:
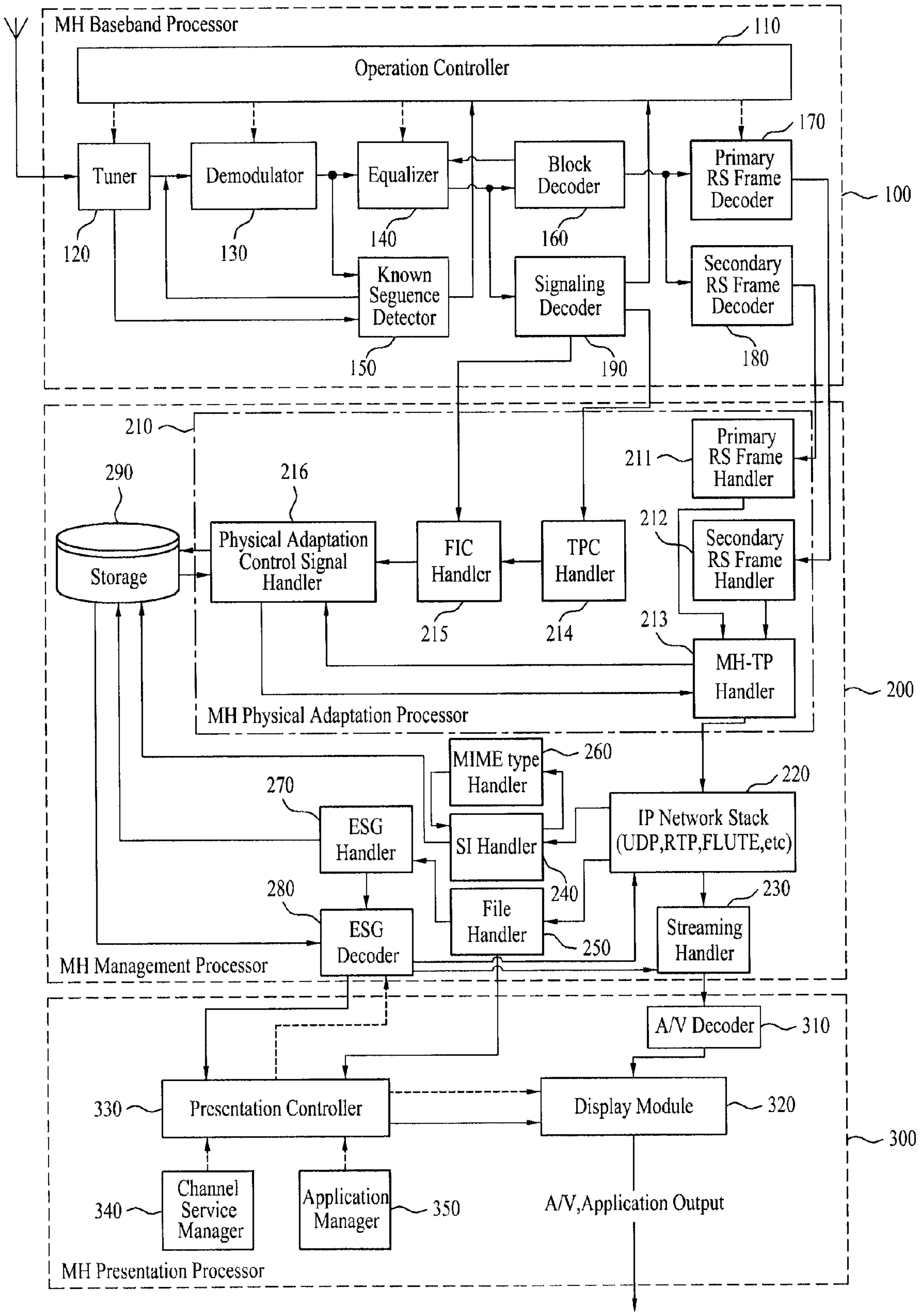
FIG. 1 illustrates a block diagram showing a general structure of a digital broadcasting receiving system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, among the terms used in the present invention, "MH" corresponds to the initials of "mobile" and "handheld" and represents the opposite concept of a fixed-type system. Furthermore, the MH service data may include at least one of mobile service data and handheld service data, and will also be referred to as "mobile service data" for simplicity. Herein, the mobile service data not only correspond to MH service data but may also include any type of service data with mobile or portable characteristics. Therefore, the mobile service data according to the present invention are not limited only to the MH service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Furthermore, the digital broadcast transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

Receiving System

FIG. 1 illustrates a block diagram showing a general structure of a digital broadcasting receiving system according to an embodiment of the present invention. The digital broadcast receiving system according to the present invention includes a baseband processor 100, a management processor 200, and a presentation processor 300. The baseband processor 100 includes an operation controller 110, a tuner 120, a demodulator 130, an equalizer 140, a known sequence detector (or known data detector) 150, a block decoder (or mobile handheld block decoder) 160, a primary Reed-Solomon (RS) frame decoder 170, a secondary RS frame decoder 180, and a signaling decoder 190. The operation controller 110 controls the operation of each block included in the baseband processor 100.

By tuning the receiving system to a specific physical channel frequency, the tuner 120 enables the receiving system to receive main service data, which correspond to broadcast signals for fixed-type broadcast receiving systems, and mobile service data, which correspond to broadcast signals for mobile broadcast receiving systems. At this point, the tuned frequency of the specific physical channel is down-converted to an intermediate frequency (IF) signal, thereby being outputted to the demodulator 130 and the known sequence detector 140. The passband digital IF signal being outputted from the tuner 120 may only include main service data, or only include mobile service data, or include both main service data and mobile service data.

The demodulator 130 performs self-gain control, carrier recovery, and timing recovery processes on the passband digital IF signal inputted from the tuner 120, thereby modifying the IF signal to a baseband signal. Then, the demodulator 130 outputs the baseband signal to the equalizer 140 and the known sequence detector 150. The demodulator 130 uses the known data symbol sequence inputted from the known sequence detector 150 during the timing and/or carrier recovery, thereby enhancing the demodulating performance. The equalizer 140 compensates channel-associated distortion included in the signal demodulated by the demodulator 130.

Then, the equalizer 140 outputs the distortion-compensated signal to the block decoder 160. By using a known data symbol sequence inputted from the known sequence detector 150, the equalizer 140 may enhance the equalizing performance. Furthermore, the equalizer 140 may receive feedback on the decoding result from the block decoder 160, thereby enhancing the equalizing performance.

The known sequence detector 150 detects known data place (or position) inserted by the transmitting system from the input/output data (i.e., data prior to being demodulated or data being processed with partial demodulation). Then, the known sequence detector 150 outputs the detected known data position information and known data sequence generated from the detected position information to the demodulator 130 and the equalizer 140. Additionally, in order to allow the block decoder 160 to identify the mobile service data that have been processed with additional encoding by the transmitting system and the main service data that have not been processed with any additional encoding, the known sequence detector 150 outputs such corresponding information to the block decoder 160.

If the data channel-equalized by the equalizer 140 and inputted to the block decoder 160 correspond to data processed with both block-encoding and trellis-encoding by the transmitting system (i.e., data within the RS frame, signaling data), the block decoder 160 may perform trellis-decoding and block-decoding as inverse processes of the transmitting system. On the other hand, if the data channel-equalized by the equalizer 140 and inputted to the block decoder 160 correspond to data processed only with trellis-encoding and not block-encoding by the transmitting system (i.e., main service data), the block decoder 160 may perform only trellis-decoding.

The signaling decoder 190 decoded signaling data that have been channel-equalized and inputted from the equalizer 140. It is assumed that the signaling data inputted to the signaling decoder 190 correspond to data processed with both block-encoding and trellis-encoding by the transmitting system. Examples of such signaling data may include transmission parameter channel (TPC) data and fast information channel (FIC) data. Each type of data will be described in more detail in a later process. The FIC data decoded by the signaling decoder 190 are outputted to the FIC handler 215. And, the TPC data decoded by the signaling decoder 190 are outputted to the TPC handler 214.

Meanwhile, according to the present invention, the transmitting system uses RS frames by encoding units. Herein, the RS frame may be divided into a primary RS frame and a secondary RS frame. However, according to the embodiment of the present invention, the primary RS frame and the secondary RS frame will be divided based upon the level of importance of the corresponding data. The primary RS frame decoder 170 receives the data outputted from the block decoder 160. At this point, according to the embodiment of the present invention, the primary RS frame decoder 170 receives only the mobile service data that have been Reed-Solomon (RS)-encoded and/or cyclic redundancy check (CRC)-encoded from the block decoder 160.

Herein, the primary RS frame decoder 170 receives only the mobile service data and not the main service data. The primary RS frame decoder 170 performs inverse processes of an RS frame encoder (not shown) included in the digital broadcast transmitting system, thereby correcting errors existing within the primary RS frame. More specifically, the primary RS frame decoder 170 forms a primary RS frame by grouping a plurality of data groups and, then, correct errors in primary RS frame units. In other words, the primary RS frame decoder 170 decodes primary RS frames, which are being transmitted for actual broadcast services.

Additionally, the secondary RS frame decoder 180 receives the data outputted from the block decoder 160. At this point, according to the embodiment of the present invention, the secondary RS frame decoder 180 receives only the mobile service data that have been RS-encoded and/or CRC-encoded from the block decoder 160. Herein, the secondary RS frame decoder 180 receives only the mobile service data and not the main service data. The secondary RS frame decoder 180 performs inverse processes of an RS frame encoder (not shown) included in the digital broadcast transmitting system, thereby correcting errors existing within the secondary RS frame. More specifically, the secondary RS frame decoder 180 forms a secondary RS frame by grouping a plurality of data groups and, then, correct errors in secondary RS frame units. In other words, the secondary RS frame decoder 180 decodes secondary RS frames, which are being transmitted for mobile audio service data, mobile video service data, guide data, and so on.

Meanwhile, the management processor 200 according to an embodiment of the present invention includes an MH physical adaptation processor 210, an IP network stack 220, a streaming handler 230, a system information (SI) handler 240, a file handler 250, a multi-purpose internet main extensions (MIME) type handler 260, and an electronic service guide (ESG) handler 270, and an ESG decoder 280, and a storage unit 290. The MH physical adaptation processor 210 includes a primary RS frame handler 211, a secondary RS frame handler 212, an MH transport packet (TP) handler 213, a TPC handler 214, an FIC handler 215, and a physical adaptation control signal handler 216. The TPC handler 214 receives and processes baseband information required by modules corresponding to the MH physical adaptation processor 210. The baseband information is inputted in the form of TPC data. Herein, the TPC handler 214 uses this information to process the FIC data, which have been sent from the baseband processor 100.

The TPC data are transmitted from the transmitting system to the receiving system via a predetermined region of a data group. The TPC data may include at least one of an MH ensemble ID, an MH sub-frame number, a total number of MH groups (TNoG), an RS frame continuity counter, a column size of RS frame (N), and an FIC version number. Herein, the MH ensemble ID indicates an identification number of each MH ensemble carried in the corresponding channel. The MH sub-frame number signifies a number identifying the MH sub-frame number in an MH frame, wherein each MH group associated with the corresponding MH ensemble is transmitted. The TNoG represents the total number of MH groups including all of the MH groups belonging to all MH parades included in an MH sub-frame. The RS frame continuity counter indicates a number that serves as a continuity counter of the RS frames carrying the corresponding MH ensemble. Herein, the value of the RS frame continuity counter shall be incremented by 1 modulo 16 for each successive RS frame. N represents the column size of an RS frame belonging to the corresponding MH ensemble. Herein, the value of N determines the size of each MH TP. Finally, the FIC version number signifies the version number of an FIC body carried on the corresponding physical channel.

As described above, diverse TPC data are inputted to the TPC handler 214 via the signaling decoder 190 shown in FIG. 1. Then, the received TPC data are processed by the TPC handler 214. The received TPC data may also be used by the FIC handler 215 in order to process the FIC data. The FIC handler 215 processes the FIC data by associating the FIC data received from the baseband processor 100 with the TPC data. The physical adaptation control signal handler 216 collects FIC data received through the FIC handler 215 and SI data received through RS frames. Then, the physical adaptation control signal handler 216 uses the collected FIC data and SI data to configure and process IP datagrams and access information of mobile broadcast services. Thereafter, the physical adaptation control signal handler 216 stores the processed IP datagrams and access information to the storage unit 290.

The primary RS frame handler 211 identifies primary RS frames received from the primary RS frame decoder 170 of the baseband processor 100 for each row unit, so as to configure an MH TP. Thereafter, the primary RS frame handler 211 outputs the configured MH TP to the MH TP handler 213. The secondary RS frame handler 212 identifies secondary RS frames received from the secondary RS frame decoder 180 of the baseband processor 100 for each row unit, so as to configure an MH TP. Thereafter, the secondary RS frame handler 212 outputs the configured MH TP to the MH TP handler 213. The MH transport packet (TP) handler 213 extracts a header from each MH TP received from the primary RS frame handler 211 and the secondary RS frame handler 212, thereby determining the data included in the corresponding MH TP. Then, when the determined data correspond to SI data (i.e., SI data that are not encapsulated to IP datagrams), the corresponding data are outputted to the physical adaptation control signal handler 216. Alternatively, when the determined data correspond to an IP datagram, the corresponding data are outputted to the IP network stack 220.

The IP network stack 220 processes broadcast data that are being transmitted in the form of IP datagrams. More specifically, the IP network stack 220 processes data that are inputted via user datagram protocol (UDP), real-time transport protocol (RTP), real-time transport control protocol (RTCP), asynchronous layered coding/layered coding transport (ALC/LCT), file delivery over unidirectional transport (FLUTE), and so on. Herein, when the processed data correspond to streaming data, the corresponding data are outputted to the streaming handler 230. And, when the processed data correspond to data in a file format, the corresponding data are outputted to the file handler 250. Finally, when the processed data correspond to SI-associated data, the corresponding data are outputted to the SI handler 240.

The SI handler 240 receives and processes SI data having the form of IP datagrams, which are inputted to the IP network stack 220. When the inputted data associated with SI correspond to MIME-type data, the inputted data are outputted to the MIME-type handler 260. The MIME-type handler 260 receives the MIME-type SI data outputted from the SI handler 240 and processes the received MIME-type SI data. The file handler 250 receives data from the IP network stack 220 in an object format in accordance with the ALC/LCT and FLUTE structures. The file handler 250 groups the received data to create a file format. Herein, when the corresponding file includes ESG, the file is outputted to the ESG handler 270. On the other hand, when the corresponding file includes data for other file-based services, the file is outputted to the presentation controller 330 of the presentation processor 300.

The ESG handler 270 processes the ESG data received from the file handler 250 and stores the processed ESG data to the storage unit 290. Alternatively, the ESG handler 270 may output the processed ESG data to the ESG decoder 280, thereby allowing the ESG data to be used by the ESG decoder 280. The storage unit 290 stores the system information (SI) received from the physical adaptation control signal handler 210 and the ESG handler 270 therein. Thereafter, the storage unit 290 transmits the stored SI data to each block.

The ESG decoder 280 either recovers the ESG data and SI data stored in the storage unit 290 or recovers the ESG data transmitted from the ESG handler 270. Then, the ESG decoder 280 outputs the recovered data to the presentation controller 330 in a format that can be outputted to the user. The streaming handler 230 receives data from the IP network stack 220, wherein the format of the received data are in accordance with RTP and/or RTCP structures. The streaming handler 230 extracts audio/video streams from the received data, which are then outputted to the audio/video (A/V) decoder 310 of the presentation processor 300. The audio/video decoder 310 then decodes each of the audio stream and video stream received from the streaming handler 230.

The display module 320 of the presentation processor 300 receives audio and video signals respectively decoded by the A/V decoder 310. Then, the display module 320 provides the received audio and video signals to the user through a speaker and/or a screen. The presentation controller 330 corresponds to a controller managing modules that output data received by the receiving system to the user. The channel service manager 340 manages an interface with the user, which enables the user to use channel-based broadcast services, such as channel map management, channel service connection, and so on. The application manager 350 manages an interface with a user using ESG display or other application services that do not correspond to channel-based services.

Data Format Structure

Figure 2:
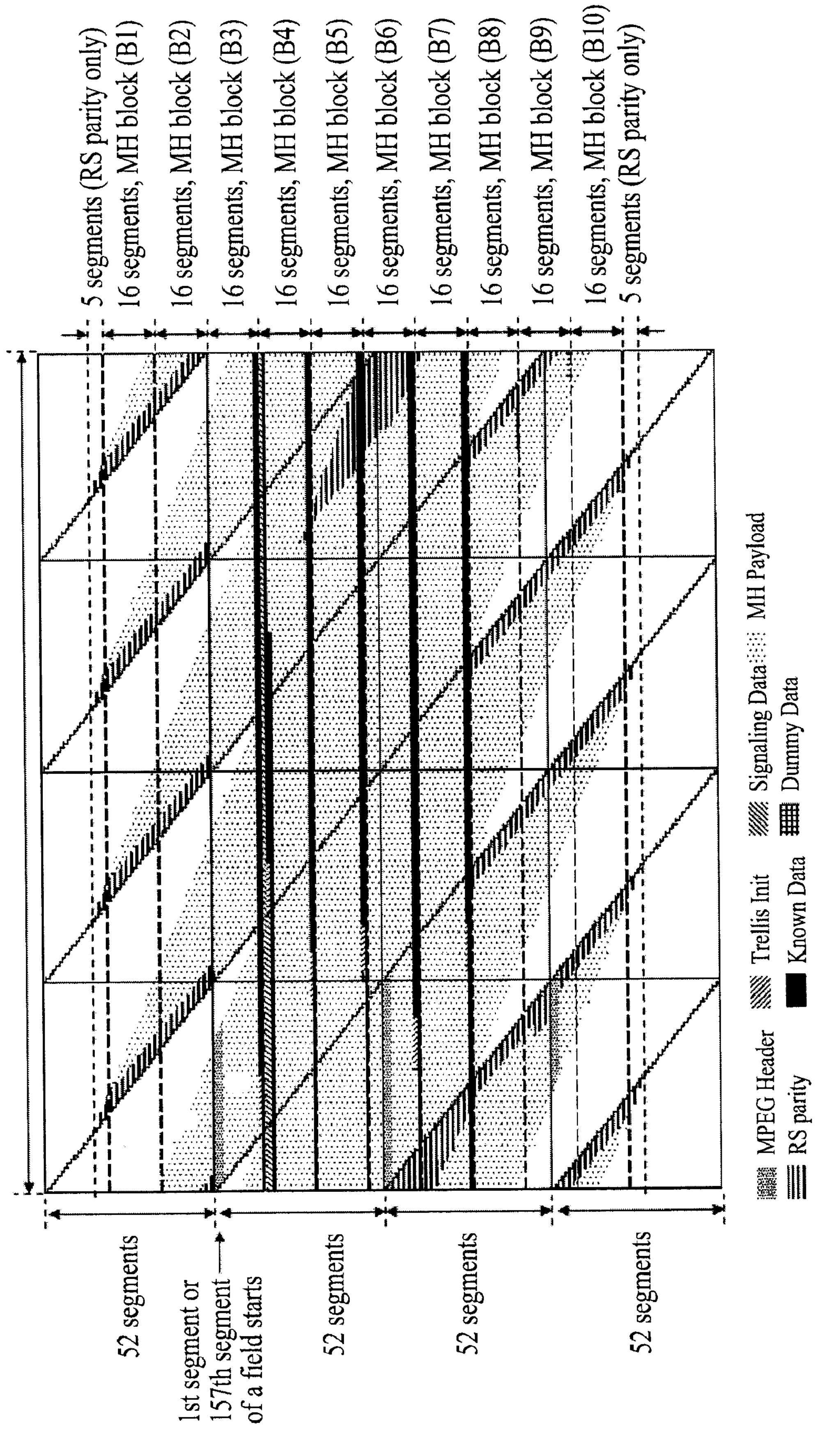
FIG. 2 illustrates an exemplary structure of a data group according to the present invention.

Meanwhile, the data structure used in the mobile broadcasting technology according to the embodiment of the present invention may include a data group structure and an RS frame structure, which will now be described in detail. FIG. 2 illustrates an exemplary structure of a data group according to the present invention. FIG. 2 shows an example of dividing a data group according to the data structure of the present invention into 10 MH blocks (i.e., MH block 1 (B1) to MH block 10 (B10)). In this example, each MH block has the length of 16 segments. Referring to FIG. 2, only the RS parity data are allocated to portions of the first 5 segments of the MH block 1 (B1) and the last 5 segments of the MH block 10 (B10). The RS parity data are excluded in regions A to D of the data group. More specifically, when it is assumed that one data group is divided into regions A, B, C, and D, each MH block may be included in any one of region A to region D depending upon the characteristic of each MH block within the data group.

Herein, the data group is divided into a plurality of regions to be used for different purposes. More specifically, a region of the main service data having no interference or a very low interference level may be considered to have a more resistant (or stronger) receiving performance as compared to regions having higher interference levels. Additionally, when using a system inserting and transmitting known data in the data group, wherein the known data are known based upon an agreement between the transmitting system and the receiving system, and when consecutively long known data are to be periodically inserted in the mobile service data, the known data having a predetermined length may be periodically inserted in the region having no interference from the main service data (i.e., a region wherein the main service data are not mixed). However, due to interference from the main service data, it is difficult to periodically insert known data and also to insert consecutively long known data to a region having interference from the main service data.

Referring to FIG. 2, MH block 4 (B4) to MH block 7 (B7) correspond to regions without interference of the main service data. MH block 4 (B4) to MH block 7 (B7) within the data group shown in FIG. 2 correspond to a region where no interference from the main service data occurs. In this example, a long known data sequence is inserted at both the beginning and end of each MH block. In the description of the present invention, the region including MH block 4 (B4) to MH block 7 (B7) will be referred to as "region A (=B4+B5+B6+B7)". As described above, when the data group includes region A having a long known data sequence inserted at both the beginning and end of each MH block, the receiving system is capable of performing equalization by using the channel information that can be obtained from the known data. Therefore, the strongest equalizing performance may be yielded (or obtained) from one of region A to region D.

In the example of the data group shown in FIG. 2, MH block 3 (B3) and MH block 8 (B8) correspond to a region having little interference from the main service data. Herein, a long known data sequence is inserted in only one side of each MH block B3 and B8. More specifically, due to the interference from the main service data, a long known data sequence is inserted at the end of MH block 3 (B3), and another long known data sequence is inserted at the beginning of MH block 8 (B8). In the present invention, the region including MH block 3 (B3) and MH block 8 (B8) will be referred to as "region B (=B3+B8)". As described above, when the data group includes region B having a long known data sequence inserted at only one side (beginning or end) of each MH block, the receiving system is capable of performing equalization by using the channel information that can be obtained from the known data. Therefore, a stronger equalizing performance as compared to region C/D may be yielded (or obtained).

Referring to FIG. 2, MH block 2 (B2) and MH block 9 (B9) correspond to a region having more interference from the main service data as compared to region B. A long known data sequence cannot be inserted in any side of MH block 2 (B2) and MH block 9 (B9). Herein, the region including MH block 2 (B2) and MH block 9 (B9) will be referred to as "region C (=B2+B9)". Finally, in the example shown in FIG. 2, MH block 1 (B1) and MH block 10 (B10) correspond to a region having more interference from the main service data as compared to region C. Similarly, a long known data sequence cannot be inserted in any side of MH block 1 (B1) and MH block 10 (B10) Herein, the region including MH block 1 (B1) and MH block 10 (B10) will be referred to as "region D (=B1+B10)". Since region C/D is spaced further apart from the known data sequence, when the channel environment undergoes frequent and abrupt changes, the receiving performance of region C/D may be deteriorated.

Additionally, the data group includes a signaling information area wherein signaling information is assigned (or allocated). In the present invention, the signaling information area may start from the $1^{st}$ segment of the $4^{th}$ MH block (B4) to a portion of the $2^{nd}$ segment. According to an embodiment of the present invention, the signaling information area for inserting signaling information may start from the $1^{st}$ segment of the $4^{th}$ MH block (B4) to a portion of the $2^{nd}$ segment. More specifically, 276(=207+69) bytes of the $4^{th}$ MH block (B4) in each data group are assigned as the signaling information area. In other words, the signaling information area consists of 207 bytes of the $1^{st}$ segment and the first 69 bytes of the $2^{nd}$ segment of the $4^{th}$ MH block (B4). The $1^{st}$ segment of the $4^{th}$ MH block (B4) corresponds to the $17^{th}$ or $173^{rd}$ segment of a VSB field.

Herein, the signaling information may be identified by two different types of signaling channels: a transmission parameter channel (TPC) and a fast information channel (FIC). Herein, the TPC data may include at least one of an MH ensemble ID, an MH sub-frame number, a total number of MH groups (TNoG), an RS frame continuity counter, a column size of RS frame (N), and an FIC version number. However, the TPC data (or information) presented herein are merely exemplary. And, since the adding or deleting of signaling information included in the TPC data may be easily adjusted and modified by one skilled in the art, the present invention will, therefore, not be limited to the examples set forth herein. Furthermore, the FIC is provided to enable a fast service acquisition of data receivers, and the FIC includes cross layer information between the physical layer and the upper layer(s).

For example, when the data group includes 6 known data sequences, as shown in FIG. 2, the signaling information area is located between the first known data sequence and the second known data sequence. More specifically, the first known data sequence is inserted in the last 2 segments of the $3^{rd}$ MH block (B3), and the second known data sequence in inserted in the $2^{nd}$ and $3^{rd}$ segments of the $4^{th}$ MH block (B4). Furthermore, the $3^{rd}$ to $6^{th}$ known data sequences are respectively inserted in the last 2 segments of each of the $4^{th}$, $5^{th}$, $6^{th}$, and $7^{th}$ MH blocks (B4, B5, B6, and B7). The $1^{st}$ and $3^{rd}$ to $6^{th}$ known data sequences are spaced apart by 16 segments.

Figure 3:
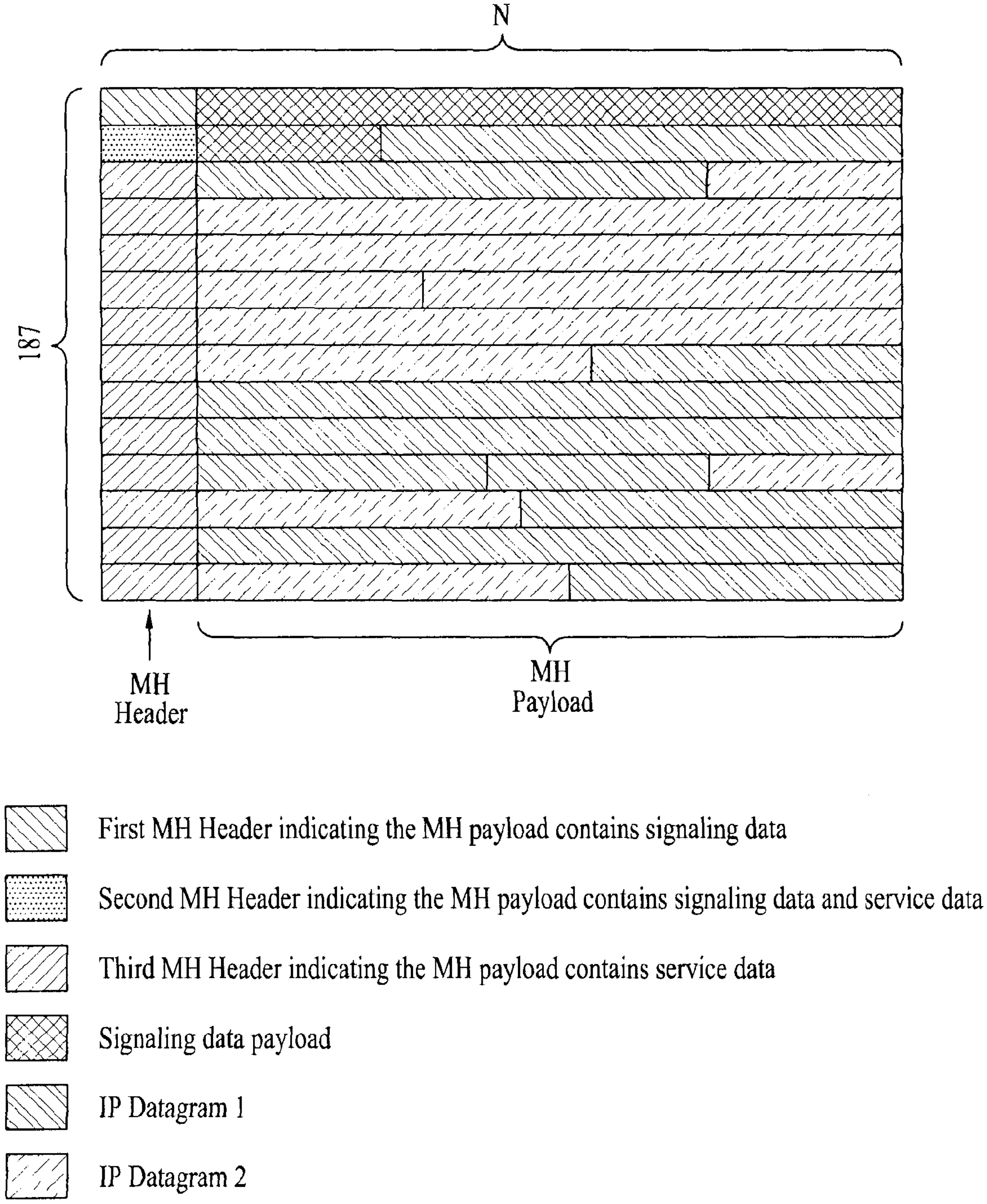
FIG. 3 illustrates an RS frame according to an embodiment of the present invention.

FIG. 3 illustrates an RS frame according to an embodiment of the present invention. The RS frame shown in FIG. 3 corresponds to a collection of one or more data groups. The RS frame is received for each MH frame in a condition where the receiving system receives the FIC and processes the received FIC and where the receiving system is switched to a time-slicing mode so that the receiving system can receive MH ensembles including ESG entry points. Each RS frame includes IP streams of each service or ESG, and SMT section data may exist in all RS frames. The RS frame according to the embodiment of the present invention consists of at least one MH transport packet (TP). Herein, the MH TP includes an MH header and an MH payload.

The MH payload may include mobile service data as wekk as signaling data. More specifically, an MH payload may include only mobile service data, or may include only signaling data, or may include both mobile service data and signaling data. According to the embodiment of the present invention, the MH header may identify (or distinguish) the data types included in the MH payload. More specifically, when the MH TP includes a first MH header, this indicates that the MH payload includes only the signaling data. Also, when the MH TP includes a second MH header, this indicates that the MH payload includes both the signaling data and the mobile service data. Finally, when MH TP includes a third MH header, this indicates that the MH payload includes only the mobile service data. In the example shown in FIG. 3, the RS frame is assigned with IP datagrams (IP datagram 1 and IP datagram 2) for two service types.

Data Transmission Structure

Figure 4:
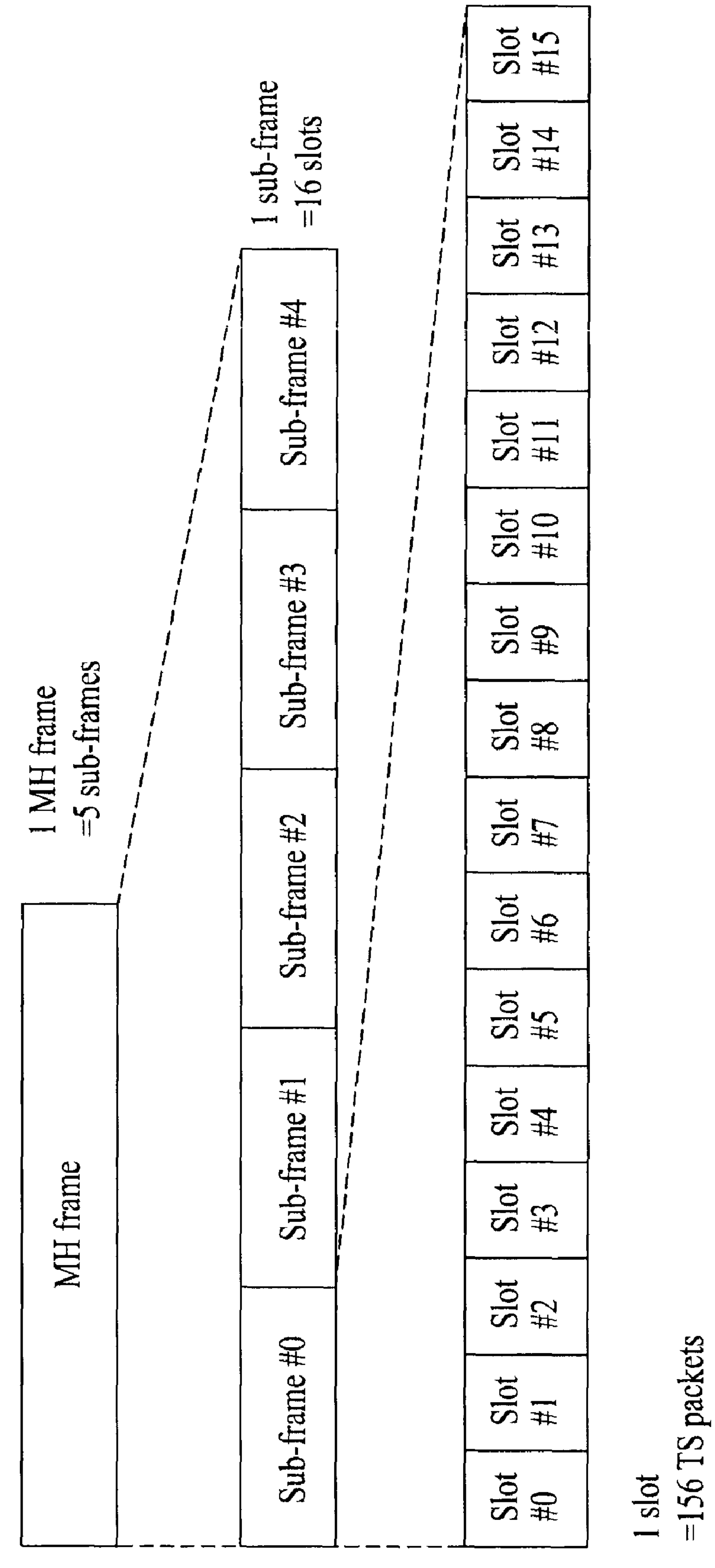
FIG. 4 illustrates an example of an MH frame structure for transmitting and receiving mobile service data according to the present invention.

FIG. 4 illustrates a structure of a MH frame for transmitting and receiving mobile service data according to the present invention. In the example shown in FIG. 4, one MH frame consists of 5 sub-frames, wherein each sub-frame includes 16 slots. In this case, the MH frame according to the present invention includes 5 sub-frames and 80 slots. Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of data as a data segment, a data packet prior to being interleaved may also be used as a data segment. At this point, two VSB fields are grouped to form a VSB frame.

Figure 5:
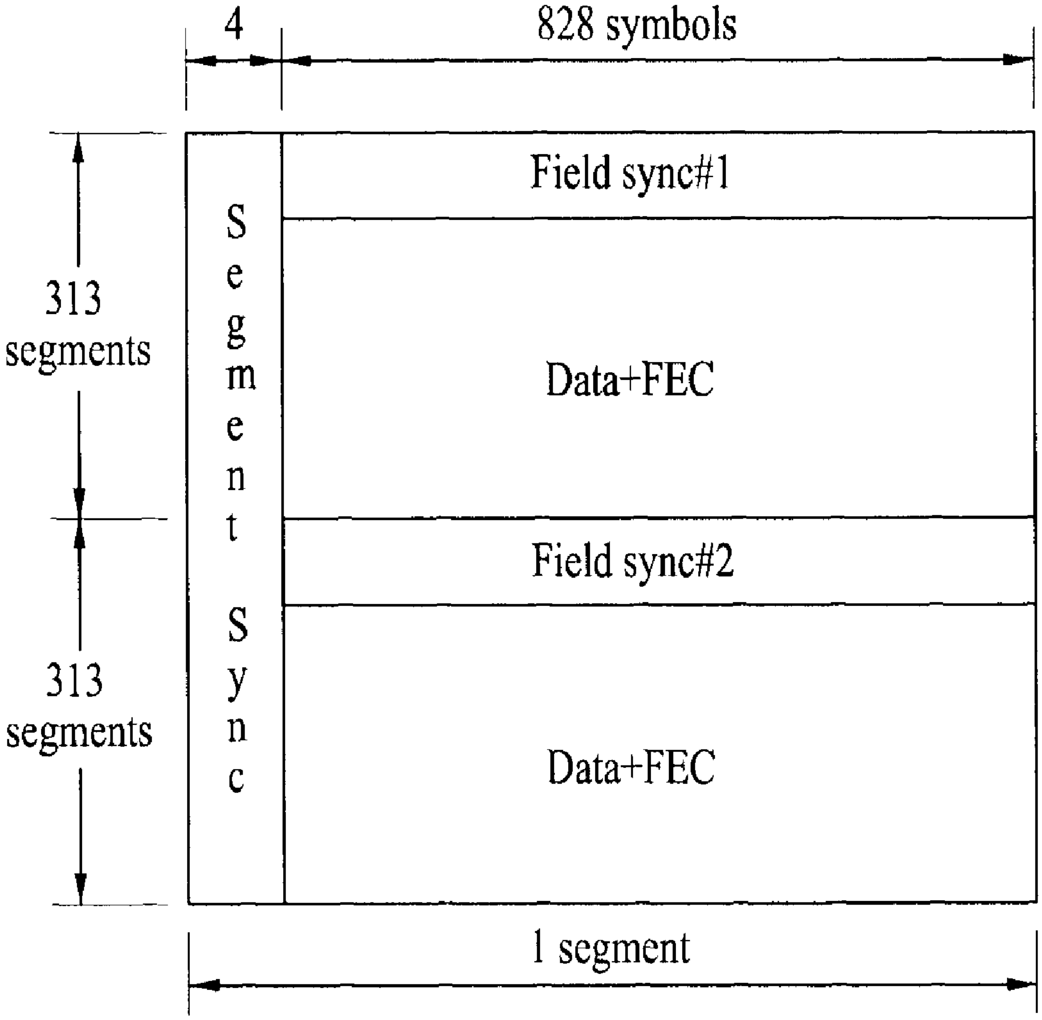
FIG. 5 illustrates an example of a general VSB frame structure.

FIG. 5 illustrates an exemplary structure of a VSB frame, wherein one VSB frame consists of 2 VSB fields (i.e., an odd field and an even field). Herein, each VSB field includes a field synchronization segment and 312 data segments. The slot corresponds to a basic time unit for multiplexing the mobile service data and the main service data. Herein, one slot may either include the mobile service data or be configured only of the main service data. If the first 118 data packets within the slot correspond to a data group, the remaining 38 data packets become the main service data packets. In another example, when no data group exists in a slot, the corresponding slot is configured of 156 main service data packets. Meanwhile, when the slots are assigned to a VSB frame, an off-set exists for each assigned position.

Figure 6:
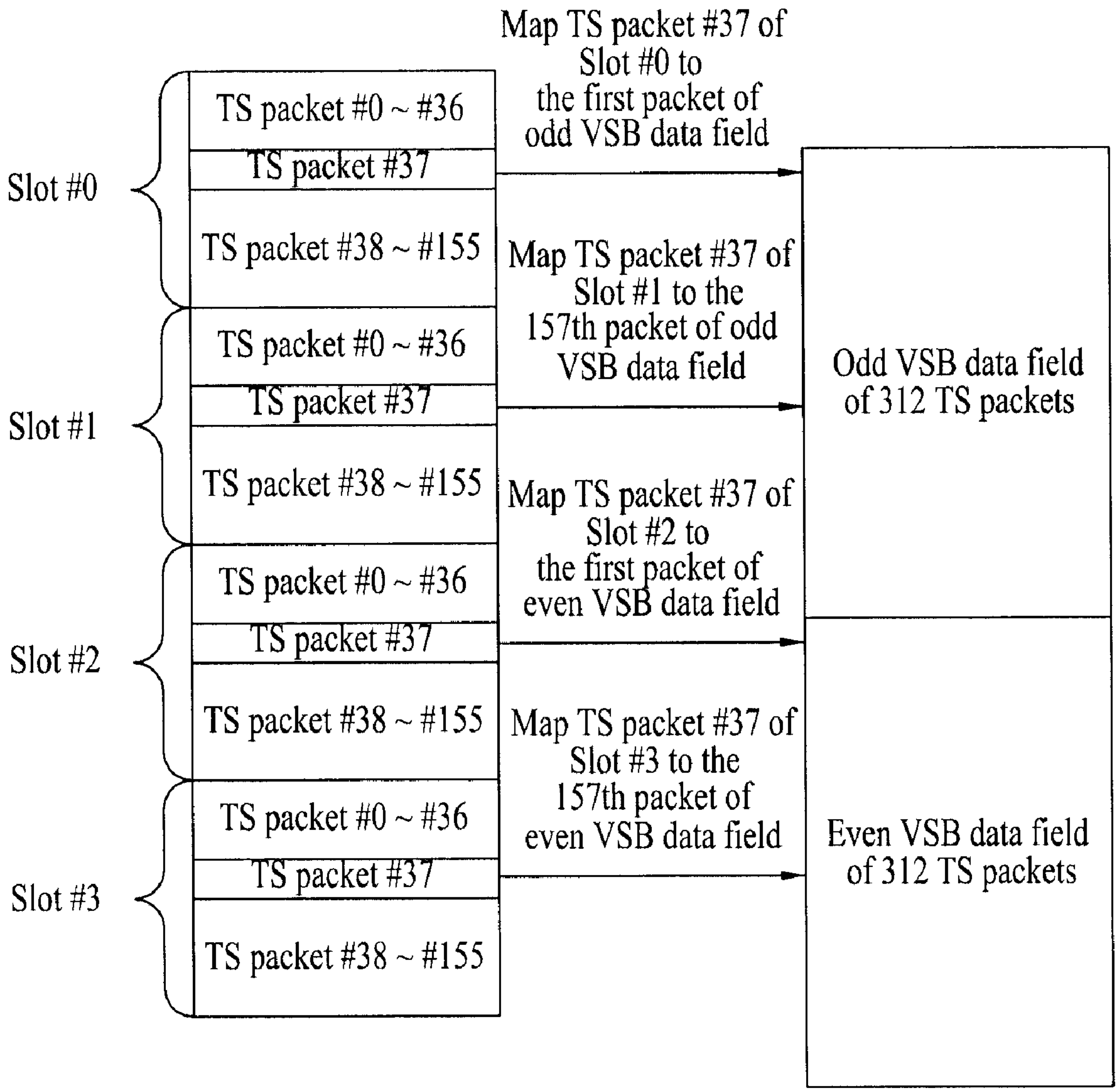
FIG. 6 illustrates a example of mapping positions of the first 4 slots of a sub-frame in a spatial area with respect to a VSB frame.
Figure 7:
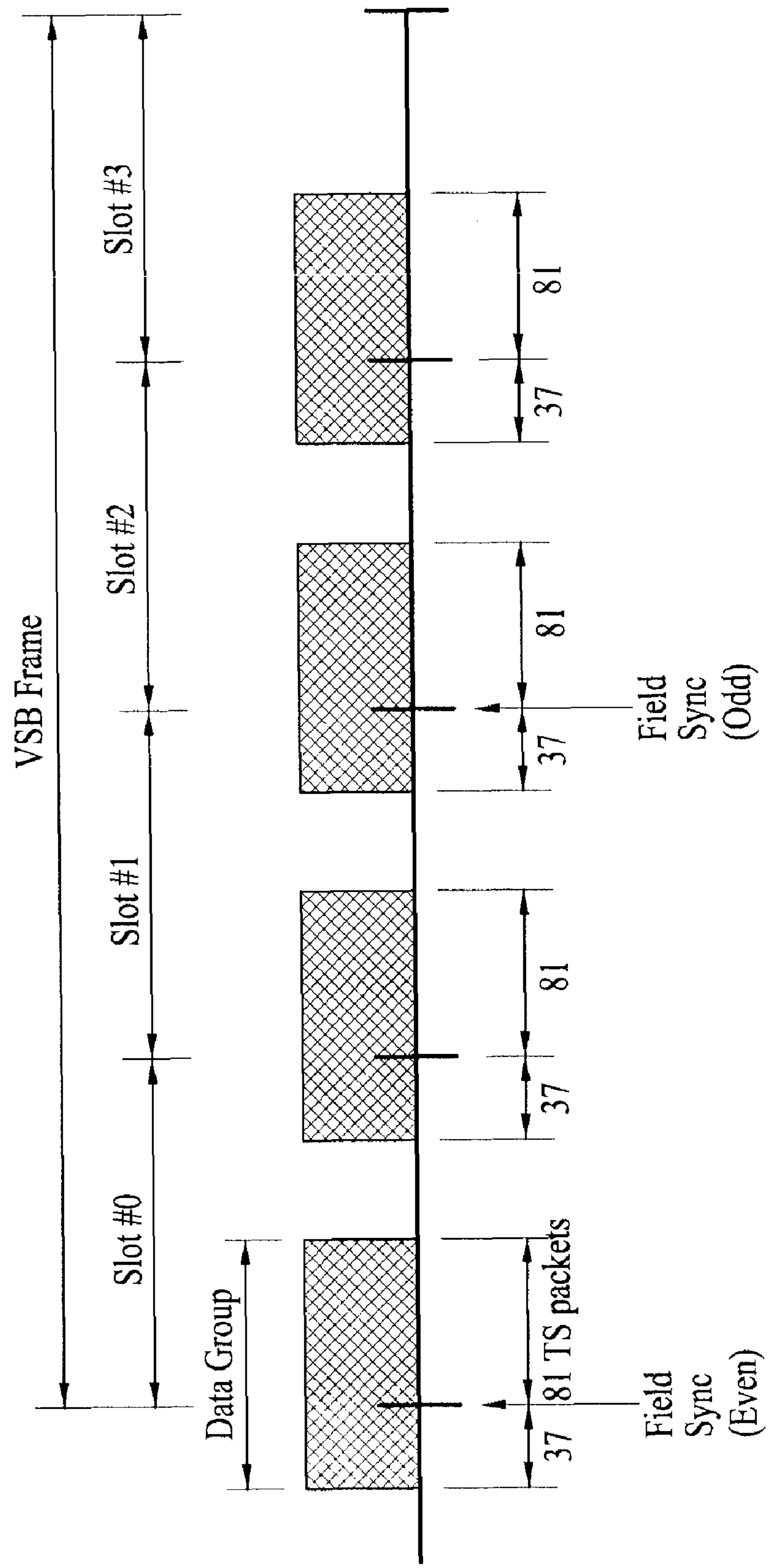
FIG. 7 illustrates a example of mapping positions of the first 4 slots of a sub-frame in a chronological (or time) area with respect to a VSB frame.

FIG. 6 illustrates a mapping example of the positions to which the first 4 slots of a sub-frame are assigned with respect to a VSB frame in a spatial area. And, FIG. 7 illustrates a mapping example of the positions to which the first 4 slots of a sub-frame are assigned with respect to a VSB frame in a chronological (or time) area. Referring to FIG. 6 and FIG. 7, a $38^{th}$ data packet (TS packet #37) of a $1^{st}$ slot (Slot #0) is mapped to the $1^{st}$ data packet of an odd VSB field. A $38^{th}$ data packet (TS packet #37) of a $2^{nd}$ slot (Slot #1) is mapped to the $157^{th}$ data packet of an odd VSB field. Also, a $38^{th}$ data packet (TS packet #37) of a $3^{rd}$ slot (Slot #2) is mapped to the $1^{st}$ data packet of an even VSB field. And, a $38^{th}$ data packet (TS packet #37) of a $4^{th}$ slot (Slot #3) is mapped to the $157^{th}$ data packet of an even VSB field. Similarly, the remaining 12 slots within the corresponding sub-frame are mapped in the subsequent VSB frames using the same method.

Figure 8:
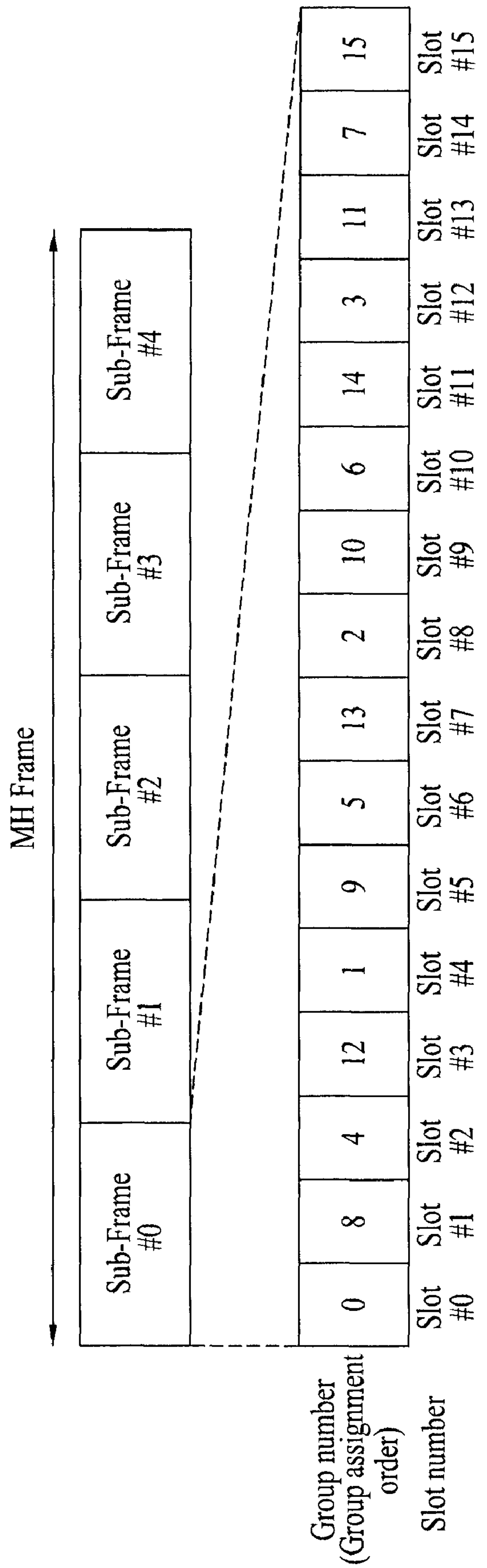
FIG. 8 illustrates an exemplary order of data groups being assigned to one of 5 sub-frames configuring an MH frame according to the present invention.

FIG. 8 illustrates an exemplary assignment order of data groups being assigned to one of 5 sub-frames, wherein the 5 sub-frames configure an MH frame. For example, the method of assigning data groups may be identically applied to all MH frames or differently applied to each MH frame. Furthermore, the method of assigning data groups may be identically applied to all sub-frames or differently applied to each sub-frame. At this point, when it is assumed that the data groups are assigned using the same method in all sub-frames of the corresponding MH frame, the total number of data groups being assigned to an MH frame is equal to a multiple of '5'. According to the embodiment of the present invention, a plurality of consecutive data groups is assigned to be spaced as far apart from one another as possible within the MH frame. Thus, the system can be capable of responding promptly and effectively to any burst error that may occur within a sub-frame.

For example, when it is assumed that 3 data groups are assigned to a sub-frame, the data groups are assigned to a $1^{st}$ slot (Slot #0), a $5^{th}$ slot (Slot #4), and a $9^{th}$ slot (Slot #8) in the sub-frame, respectively. FIG. 8 illustrates an example of assigning 16 data groups in one sub-frame using the above-described pattern (or rule). In other words, each data group is serially assigned to 16 slots corresponding to the following numbers: 0, 8, 4, 12, 1, 9, 5, 13, 2, 10, 6, 14, 3, 11, 7, and 15. Equation 1 below shows the above-described rule (or pattern) for assigning data groups in a sub-frame.

$$j=(4i+0)\bmod 16 \qquad \text{Equation 1}$$

Herein, 0=0 if i<4,

0=2 else if i<8,

0=1 else if i<12,

0=3 else.

Herein, j indicates the slot number within a sub-frame. The value of j may range from 0 to 15 (i.e., 0≦j≦15). Also, variable i indicates the data group number. The value of i may range from 0 to 15 (i.e., 0≦i≦15).

In the present invention, a collection of data groups included in a MH frame will be referred to as a "parade". Based upon the RS frame mode, the parade transmits data of at least one specific RS frame. The mobile service data within one RS frame may be assigned either to all of regions A/B/C/D within the corresponding data group, or to at least one of regions A/B/C/D. In the embodiment of the present invention, the mobile service data within one RS frame may be assigned either to all of regions A/B/C/D, or to at least one of regions A/B and regions C/D. If the mobile service data are assigned to the latter case (i.e., one of regions A/B and regions C/D), the RS frame being assigned to regions A/B and the RS frame being assigned to regions C/D within the corresponding data group are different from one another.

According to the embodiment of the present invention, the RS frame being assigned to regions A/B within the corresponding data group will be referred to as a "primary RS frame", and the RS frame being assigned to regions C/D within the corresponding data group will be referred to as a "secondary RS frame", for simplicity. Also, the primary RS frame and the secondary RS frame form (or configure) one parade. More specifically, when the mobile service data within one RS frame are assigned either to all of regions A/B/C/D within the corresponding data group, one parade transmits one RS frame. Conversely, when the mobile service data within one RS frame are assigned either to at least one of regions A/B and regions C/D, one parade may transmit up to 2 RS frames. More specifically, the RS frame mode indicates whether a parade transmits one RS frame, or whether the parade transmits two RS frames. Such RS frame mode is transmitted as the above-described TPC data. Table 1 below shows an example of the RS frame mode.

TABLE 1

| RS frame mode (2 bits) | Description |
|---|---|
| 00 | There is only one primary RS frame for all group regions |
| 01 | There are two separate RS frames.<br>Primary RS frame for group regions A and B<br>Secondary RS frame for group regions C and D |
| 10 | Reserved |
| 11 | Reserved |

Table 1 illustrates an example of allocating 2 bits in order to indicate the RS frame mode. For example, referring to Table 1, when the RS frame mode value is equal to '00', this indicates that one parade transmits one RS frame. And, when the RS frame mode value is equal to '01', this indicates that one parade transmits two RS frames, i.e., the primary RS frame and the secondary RS frame. More specifically, when the RS frame mode value is equal to '01', data of the primary RS frame for regions A/B are assigned and transmitted to regions A/B of the corresponding data group. Similarly, data of the secondary RS frame for regions C/D are assigned and transmitted to regions C/D of the corresponding data group.

As described in the assignment of data groups, the parades are also assigned to be spaced as far apart from one another as possible within the sub-frame. Thus, the system can be capable of responding promptly and effectively to any burst error that may occur within a sub-frame. Furthermore, the method of assigning parades may be identically applied to all MH frames or differently applied to each MH frame. According to the embodiment of the present invention, the parades may be assigned differently for each MH frame and identically for all sub-frames within an MH frame. More specifically, the MH frame structure may vary by MH frame units. Thus, an ensemble rate may be adjusted on a more frequent and flexible basis.

Figure 9:
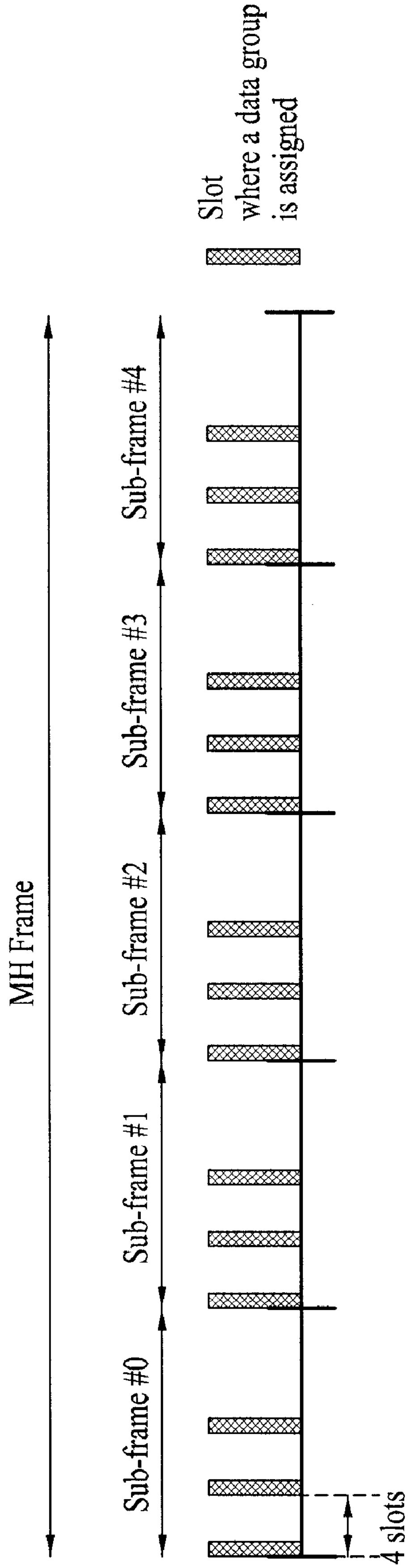
FIG. 9 illustrates an example of a single parade being assigned to an MH frame according to the present invention.

FIG. 9 illustrates an example of multiple data groups of a single parade being assigned (or allocated) to an MH frame. More specifically, FIG. 9 illustrates an example of a plurality of data groups included in a single parade, wherein the number of data groups included in a sub-frame is equal to '3', being allocated to an MH frame. Referring to FIG. 9, 3 data groups are sequentially assigned to a sub-frame at a cycle period of 4 slots. Accordingly, when this process is equally performed in the 5 sub-frames included in the corresponding MH frame, 15 data groups are assigned to a single MH frame. Herein, the 15 data groups correspond to data groups included in a parade. Therefore, since one sub-frame is configured of 4 VSB frame, and since 3 data groups are included in a sub-frame, the data group of the corresponding parade is not assigned to one of the 4 VSB frames within a sub-frame.

For example, when it is assumed that one parade transmits one RS frame, and that a RS frame encoder (not shown) included in the transmitting system performs RS-encoding on the corresponding RS frame, thereby adding 24 bytes of parity data to the corresponding RS frame and transmitting the processed RS frame, the parity data occupy approximately 11.37% (=24/(187+24)×100) of the total code word length. Meanwhile, when one sub-frame includes 3 data groups, and when the data groups included in the parade are assigned, as shown in FIG. 9, a total of 15 data groups form an RS frame. Accordingly, even when an error occurs in an entire data group due to a burst noise within a channel, the percentile is merely 6.67% (=1/15×100). Therefore, the receiving system may correct all errors by performing an erasure RS decoding process. More specifically, when the erasure RS decoding is performed, a number of channel errors corresponding to the number of RS parity bytes may be corrected. By doing so, the receiving system may correct the error of at least one data group within one parade. Thus, the minimum burst noise length correctable by a RS frame is over 1 VSB frame.

Meanwhile, when data groups of a parade are assigned as shown in FIG. 9, either main service data may be assigned between each data group, or data groups corresponding to different parades may be assigned between each data group. More specifically, data groups corresponding to multiple parades may be assigned to one MH frame. Basically, the method of assigning data groups corresponding to multiple parades is very similar to the method of assigning data groups corresponding to a single parade. In other words, data groups included in other parades that are to be assigned to an MH frame are also respectively assigned according to a cycle period of 4 slots. At this point, data groups of a different parade may be sequentially assigned to the respective slots in a circular method. Herein, the data groups are assigned to slots starting from the ones to which data groups of the previous parade have not yet been assigned. For example, when it is assumed that data groups corresponding to a parade are assigned as shown in FIG. 9, data groups corresponding to the next parade may be assigned to a sub-frame starting either from the $12^{th}$ slot of a sub-frame. However, this is merely exemplary. In another example, the data groups of the next parade may also be sequentially assigned to a different slot within a sub-frame at a cycle period of 4 slots starting from the $3^{rd}$ slot.

Figure 10:
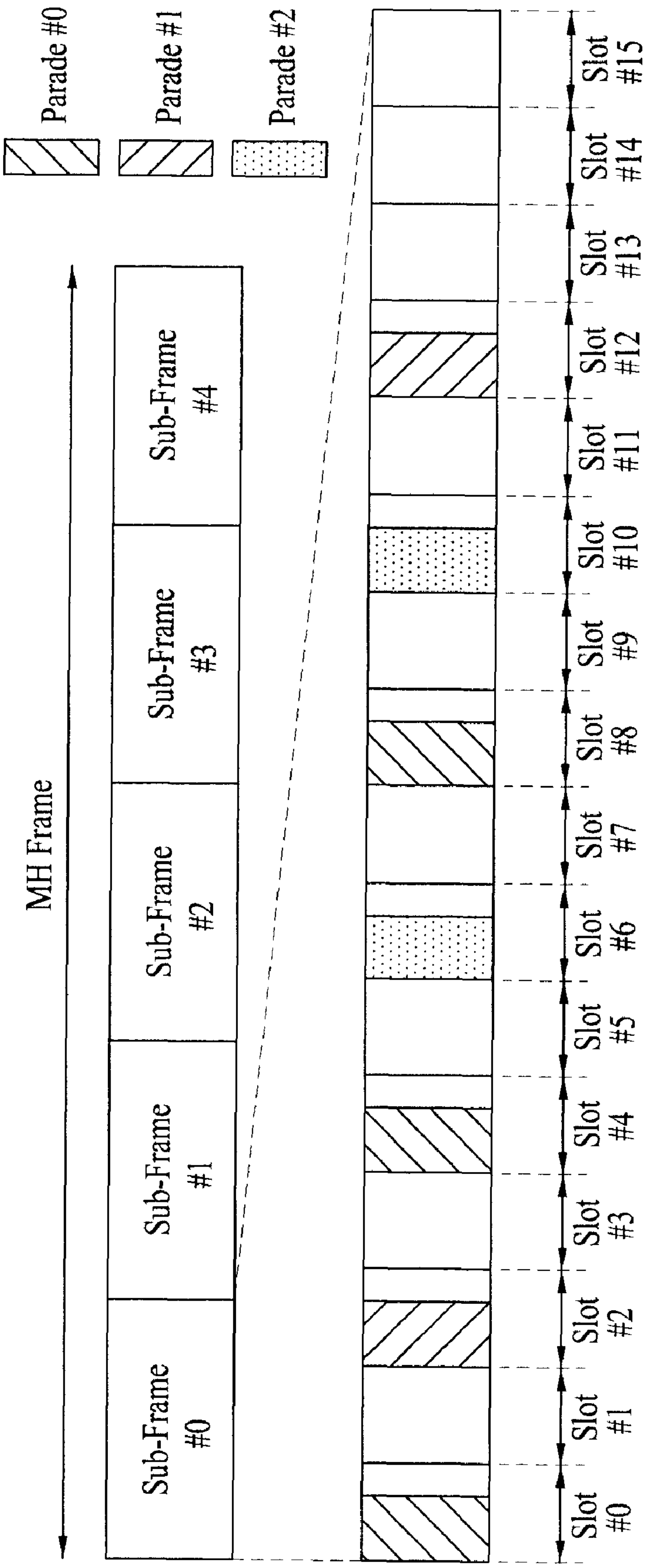
FIG. 10 illustrates an example of 3 parades being assigned to an MH frame according to the present invention.

FIG. 10 illustrates an example of transmitting 3 parades (Parade #0, Parade #1, and Parade #2) to an MH frame. More specifically, FIG. 10 illustrates an example of transmitting parades included in one of 5 sub-frames, wherein the 5 sub-frames configure one MH frame. When the $1^{st}$ parade (Parade #0) includes 3 data groups for each sub-frame, the positions of each data groups within the sub-frames may be obtained by substituting values '0' to '2' for i in Equation 1. More specifically, the data groups of the $1^{st}$ parade (Parade #0) are sequentially assigned to the $1^{st}$, $5^{th}$, and $9^{th}$ slots (Slot #0, Slot #4, and Slot #8) within the sub-frame. Also, when the $2^{nd}$ parade includes 2 data groups for each sub-frame, the positions of each data groups within the sub-frames may be obtained by substituting values '3' and '4' for in Equation 1. More specifically, the data groups of the $2^{nd}$ parade (Parade #1) are sequentially assigned to the $2^{nd}$ and $12^{th}$ slots (Slot #3 and Slot #11) within the sub-frame. Finally, when the $3^{rd}$ parade includes 2 data groups for each sub-frame, the positions of each data groups within the sub-frames may be obtained by substituting values '5' and '6' for i in Equation 1. More specifically, the data groups of the $3^{rd}$ parade (Parade #2) are sequentially assigned to the $7^{th}$ and $11^{th}$ slots (Slot #6 and Slot #10) within the sub-frame.

As described above, data groups of multiple parades may be assigned to a single MH frame, and, in each sub-frame, the data groups are serially allocated to a group space having 4 slots from left to right. Therefore, a number of groups of one parade per sub-frame (NoG) may correspond to any one integer from '1' to '8'. Herein, since one MH frame includes 5 sub-frames, the total number of data groups within a parade that can be allocated to an MH frame may correspond to any one multiple of '5'ranging from '5' to '40'.

Figure 11:
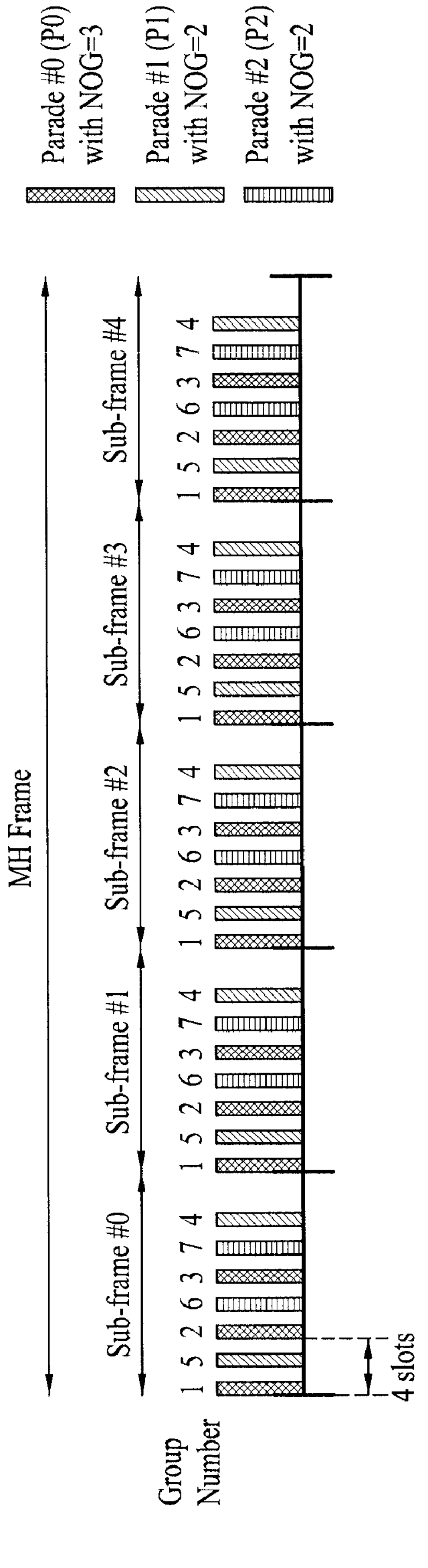
FIG. 11 illustrates an example of the process of assigning 3 parades shown in FIG. 10 being expanded to 5 sub-frames within an MH frame.
Figure 12:
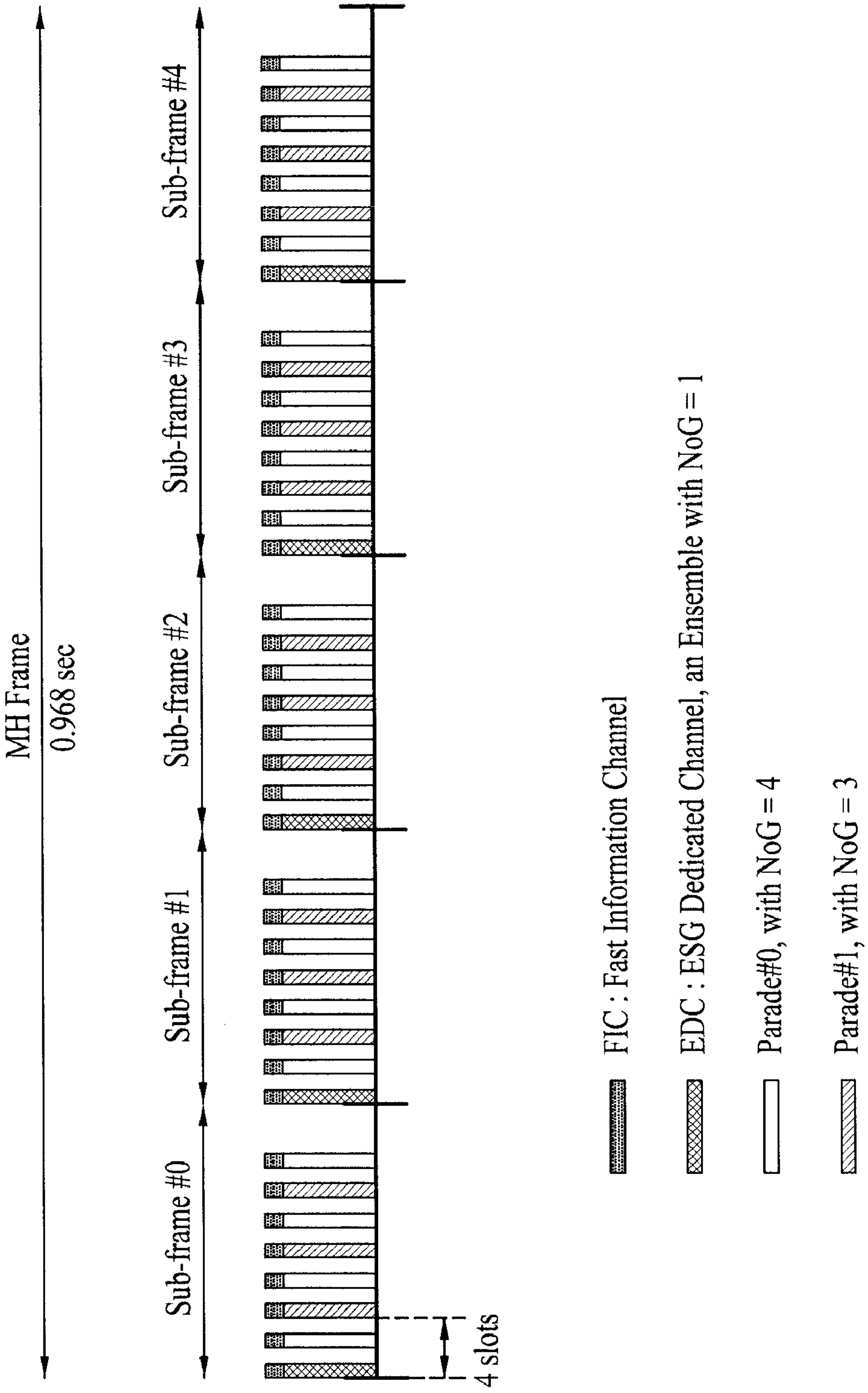
FIG. 12 illustrates a data transmission structure according to an embodiment of the present invention, wherein signaling data are included in a data group so as to be transmitted.

FIG. 11 illustrates an example of expanding the assignment process of 3 parades, shown in FIG. 10, to 5 sub-frames within an MH frame. FIG. 12 illustrates a data transmission structure according to an embodiment of the present invention, wherein signaling data are included in a d at a group so as to be transmitted. As described above, an MH frame is divided into 5 sub-frames. Data groups corresponding to a plurality of parades co-exist in each sub-frame. Herein, the data groups corresponding to each parade are grouped by MH frame units, thereby configuring a single parade.

The data structure shown in FIG. 12 includes 3 parades, one ESG dedicated channel (EDC) parade (i.e., parade with NoG=1), and 2 service parades (i.e., parade with NoG=4 and parade with NoG=3). Also, a predetermined portion of each data group (i.e., 37 bytes/data group) is used for delivering (or sending) FIC information associated with mobile service data, wherein the FIC information is separately encoded from the RS-encoding process. The FIC region assigned to each data group consists of one FIC segments. Herein, each segment is interleaved by MH sub-frame units, thereby configuring an FIC body, which corresponds to a completed FIC transmission structure. However, whenever required, each segment may be interleaved by MH frame units and not by MH sub-frame units, thereby being completed in MH frame units.

Meanwhile, the concept of an MH ensemble is applied in the embodiment of the present invention, thereby defining a collection (or group) of services. Each MH ensemble carries the same QoS and is coded with the same FEC code. Also, each MH ensemble has the same unique identifier (i.e., ensemble ID) and corresponds to consecutive RS frames. As shown in FIG. 12, the FIC segment corresponding to each data group described service information of an MH ensemble to which the corresponding data group belongs. When FIC segments within a sub-frame are grouped and deinterleaved, all service information of a physical channel through which the corresponding FICs are transmitted may be obtained.

Therefore, the receiving system may be able to acquire the channel information of the corresponding physical channel, after being processed with physical channel tuning, during a sub-frame period. Furthermore, FIG. 12 illustrates a structure further including a separate EDC parade apart from the service parade and wherein electronic service guide (ESG) data are transmitted in the $1^{st}$ slot of each sub-frame.

Hierarchical Signaling Structure

Figure 13:
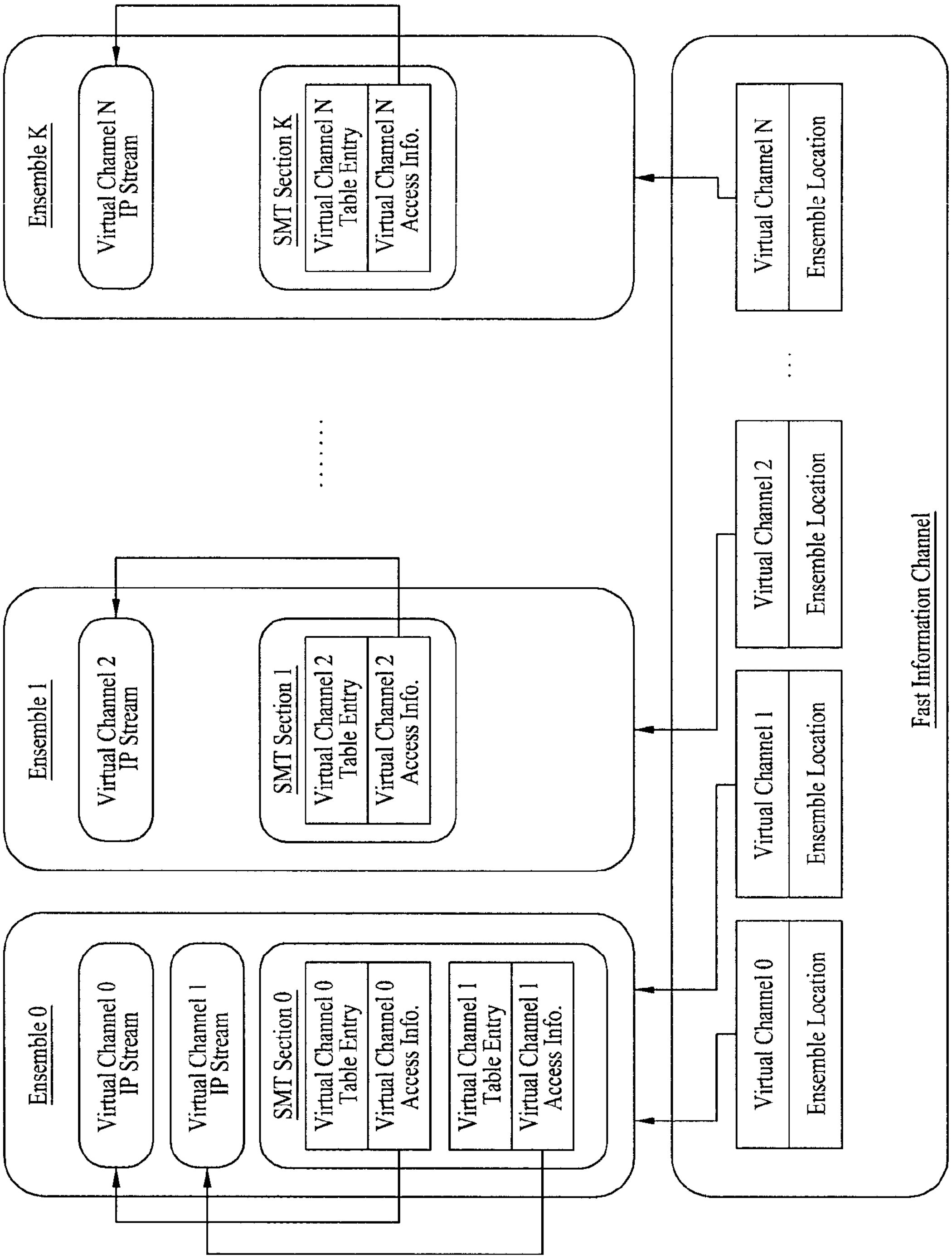
FIG. 13 illustrates a hierarchical signaling structure according to an embodiment of the present invention.

FIG. 13 illustrates a hierarchical signaling structure according to an embodiment of the present invention. As shown in FIG. 13, the mobile broadcasting technology according to the embodiment of the present invention adopts a signaling method using FIC and SMT. In the description of the present invention, the signaling structure will be referred to as a hierarchical signaling structure. Hereinafter, a detailed description on how the receiving system accesses a virtual channel via FIC and SMT will now be given with reference to FIG. 13. The FIC body defined in an MH transport (M1) identifies the physical location of each the data stream for each virtual channel and provides very high level descriptions of each virtual channel. Being MH ensemble level signaling information, the service map table (SMT) provides MH ensemble level signaling information. The SMT provides the IP access information of each virtual channel belonging to the respective MH ensemble within which the SMT is carried. The SMT also provides all IP stream component level information required for the virtual channel service acquisition.

Referring to FIG. 13, each MH ensemble (i.e., Ensemble 0, Ensemble 1, . . . , Ensemble K) includes a stream information on each associated (or corresponding) virtual channel (e.g., virtual channel 0 IP stream, virtual channel 1 IP stream, and virtual channel 2 IP stream). For example, Ensemble 0 includes virtual channel 0 IP stream and virtual channel 1 IP stream. And, each MH ensemble includes diverse information on the associated virtual channel (i.e., Virtual Channel 0 Table Entry, Virtual Channel 0 Access Info, Virtual Channel 1 Table Entry, Virtual Channel 1 Access Info, Virtual Channel 2 Table Entry, Virtual Channel 2 Access Info, Virtual Channel N Table Entry, Virtual Channel N Access Info, and so on). The FIC body payload includes information on MH ensembles (e.g., ensemble_id field, and referred to as "ensemble location" in FIG. 13) and information on a virtual channel associated with the corresponding MH ensemble (e.g., when such information corresponds to a major_channel_num field and a minor_channel_num field, the information is expressed as Virtual Channel 0, Virtual Channel 1, . . . , Virtual Channel N in FIG. 13).

The application of the signaling structure in the receiving system will now be described in detail. When a user selects a channel he or she wishes to view (hereinafter, the user-selected channel will be referred to as "channel θ" for simplicity), the receiving system first parses the received FIC. Then, the receiving system acquires information on an MH ensemble (i.e., ensemble location), which is associated with the virtual channel corresponding to channel θ (hereinafter, the corresponding MH ensemble will be referred to as "MH ensemble θ" for simplicity). By acquiring slots only corresponding to the MH ensemble θ using the time-slicing method, the receiving system configures ensemble θ. The ensemble θ configured as described above, includes an SMT on the associated virtual channels (including channel θ) and IP streams on the corresponding virtual channels. Therefore, the receiving system uses the SMT included in the MH ensemble θ in order to acquire various information on channel θ (e.g., Virtual Channel θ Table Entry) and stream access information on channel θ (e.g., Virtual Channel θ Access Info). The receiving system uses the stream access information on channel θ to receive only the associated IP streams, thereby providing channel θ services to the user.

Fast Information Channel (FIC)

Figure 14:
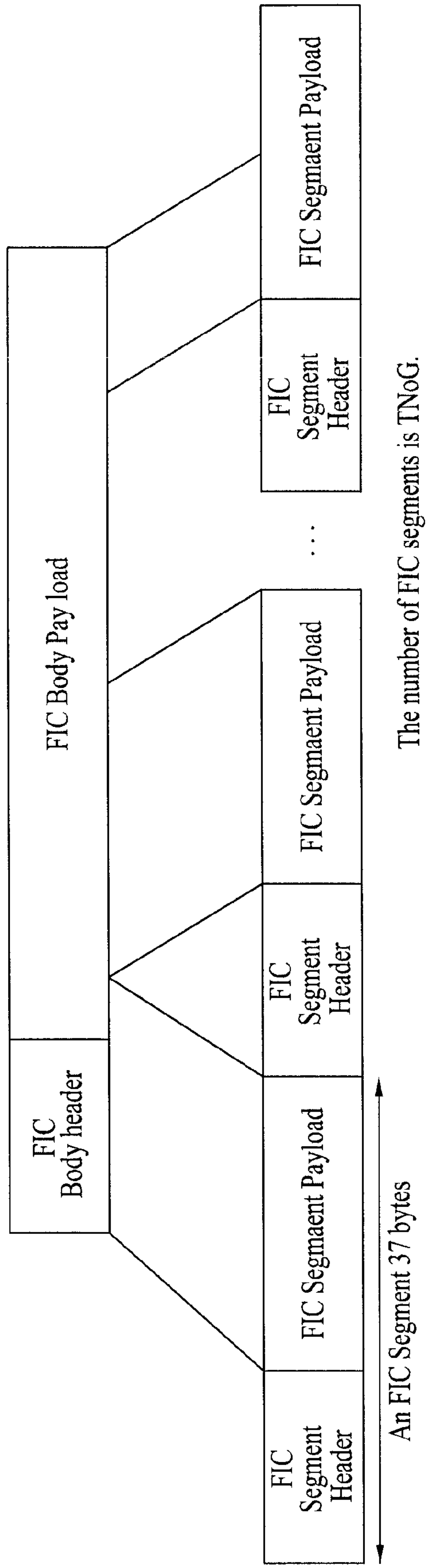
FIG. 14 illustrates an exemplary FIC body format according to an embodiment of the present invention.

The digital broadcast receiving system according to the present invention adopts the fast information channel (FIC) for a faster access to a service that is currently being broadcasted. More specifically, the FIC handler 215 of FIG. 1 parses the FIC body, which corresponds to an FIC transmission structure, and outputs the parsed result to the physical adaptation control signal handler 216. FIG. 14 illustrates an exemplary FIC body format according to an embodiment of the present invention. According to the embodiment of the present invention, the FIC format consists of an FIC body header and an FIC body payload.

Meanwhile, according to the embodiment of the present invention, data are transmitted through the FIC body header and the FIC body payload in FIC segment units. Each FIC segment has the size of 37 bytes, and each FIC segment consists of a 2-byte FIC segment header and a 35-byte FIC segment payload. More specifically, an FIC body configured of an FIC body header and an FIC body payload, is segmented in units of 35 data bytes, which are then carried in at least one FIC segment within the FIC segment payload, so as to be transmitted. In the description of the present invention, an example of inserting one FIC segment in one data group, which is then transmitted, will be given. In this case, the receiving system receives a slot corresponding to each data group by using a time-slicing method.

The signaling decoder 190 included in the receiving system shown in FIG. 1 collects each FIC segment inserted in each data group. Then, the signaling decoder 190 uses the collected FIC segments to created a single FIC body. Thereafter, the signaling decoder 190 performs a decoding process on the FIC body payload of the created FIC body, so that the decoded FIC body payload corresponds to an encoded result of a signaling encoder (not shown) included in the transmitting system. Subsequently, the decoded FIC body payload is outputted to the FIC handler 215. The FIC handler 215 parses the FIC data included in the FIC body payload, and then outputs the parsed FIC data to the physical adaptation control signal handler 216. The physical adaptation control signal handler 216 uses the inputted FIC data to perform processes associated with MH ensembles, virtual channels, SMTs, and so on.

According to an embodiment of the present invention, when an FIC body is segmented, and when the size of the last segmented portion is smaller than 35 data bytes, it is assumed that the lacking number of data bytes in the FIC segment payload is completed with by adding the same number of stuffing bytes therein, so that the size of the last FIC segment can be equal to 35 data bytes. However, it is apparent that the above-described data byte values (i.e., 37 bytes for the FIC segment, 2 bytes for the FIC segment header, and 35 bytes for the FIC segment payload) are merely exemplary, and will, therefore, not limit the scope of the present invention.

FIG. 15 illustrates an exemplary bit stream syntax structure with respect to an FIC segment according to an embodiment of the present invention. Herein, the FIC segment signifies a unit used for transmitting the FIC data. The FIC segment consists of an FIC segment header and an FIC segment payload. Referring to FIG. 15, the FIC segment payload corresponds to the portion starting from the 'for' loop statement. Meanwhile, the FIC segment header may include a FIC_type field, an error_indicator field, an FIC_seg_number field, and an FIC_last_seg_number field. A detailed description of each field will now be given.

The FIC_type field is a 2-bit field indicating the type of the corresponding FIC. The error_indicator field is a 1-bit field, which indicates whether or not an error has occurred within the FIC segment during data transmission. If an error has occurred, the value of the error_indicator field is set to '1'. More specifically, when an error that has failed to be recovered still remains during the configuration process of the FIC segment, the error_indicator field value is set to '1'. The error_indicator field enables the receiving system to recognize the presence of an error within the FIC data. The FIC_seg_number field is a 4-bit field. Herein, when a single FIC body is divided into a plurality of FIC segments and transmitted, the FIC_seg_number field indicates the number of the corresponding FIC segment. Finally, the FIC_last_seg_number field is also a 4-bit field. The FIC_last_seg_number field indicates the number of the last FIC segment within the corresponding FIC body.

FIG. 16 illustrates an exemplary bit stream syntax structure with respect to a payload of an FIC segment according to the present invention, when an FIC type field value is equal to '0'. According to the embodiment of the present invention, the payload of the FIC segment is divided into 3 different regions. A first region of the FIC segment payload exists only when the FIC_seg_number field value is equal to '0'. Herein, the first region may include a current_next_indicator field, an ESG_version field, and a transport_stream_id field. However, depending upon the embodiment of the present invention, it may be assumed that each of the 3 fields exists regardless of the FIC_seg_number field.

The current_next_indicator field is a 16-bit field. The current_next_indicator field acts as an indicator identifying whether the corresponding FIC data carry MH ensemble configuration information of an MH frame including the current FIC segment, or whether the corresponding FIC data carry MH ensemble configuration information of a next MH frame. The ESG_version field is a 5-bit field indicating ESG version information. Herein, by providing version information on the service guide providing channel of the corresponding ESG, the ESG_version field enables the receiving system to notify whether or not the corresponding ESG has been updated. Finally, the transport_stream_id field is a 16-bit field acting as a unique identifier of a broadcast stream through which the corresponding FIC segment is being transmitted.

A second region of the FIC segment payload corresponds to an ensemble loop region, which includes an ensemble_id field, an SI_version field, and a num_channel field. More specifically, the ensemble_id field is an 8-bit field indicating identifiers of an MH ensemble through which MH services are transmitted. The MH services will be described in more detail in a later process. Herein, the ensemble_id field binds the MH services and the MH ensemble. The SI_version field is a 4-bit field indicating version information of SI data included in the corresponding ensemble, which is being transmitted within the RS frame. Finally, the num_channel field is an 8-bit field indicating the number of virtual channel being transmitted via the corresponding ensemble.

A third region of the FIC segment payload a channel loop region, which includes a channel_type field, a channel_activity field, a CA_indicator field, a stand_alone_service_indicator field, a major_channel_num field, and a minor_channel_num field. The channel_type field is a 5-bit field indicating a service type of the corresponding virtual channel. For example, the channel_type field may indicates an audio/video channel, an audio/video and data channel, an audio-only channel, a data-only channel, a file download channel, an ESG delivery channel, a notification channel, and so on. The channel_activity field is a 2-bit field indicating activity information of the corresponding virtual channel. More specifically, the channel_activity field may indicate whether the current virtual channel is providing the current service.

The CA_indicator field is a 1-bit field indicating whether or not a conditional access (CA) is applied to the current virtual channel. The stand_alone_service_indicator field is also a 1-bit field, which indicates whether the service of the corresponding virtual channel corresponds to a stand alone service. The major_channel_num field is an 8-bit field indicating a major channel number of the corresponding virtual channel. Finally, the minor_channel_num field is also an 8-bit field indicating a minor channel number of the corresponding virtual channel.

Service Table Map

FIG. 17 illustrates an exemplary bit stream syntax structure of a service map table (hereinafter referred to as "SMT") according to the present invention. According to the embodiment of the present invention, the SMT is configured in an MPEG-2 private section format. However, this will not limit the scope and spirit of the present invention. The SMT according to the embodiment of the present invention includes description information for each virtual channel within a single MH ensemble. And, additional information may further be included in each descriptor area. Herein, the SMT according to the embodiment of the present invention includes at least one field and is transmitted from the transmitting system to the receiving system.

As described in FIG. 3, the SMT section may be transmitted by being included in the MH TP within the RS frame. In this case, each of the RS frame decoders 170 and 180, shown in FIG. 1, decodes the inputted RS frame, respectively. Then, each of the decoded RS frames is outputted to the respective RS frame handler 211 and 212. Thereafter, each RS frame handler 211 and 212 identifies the inputted RS frame by row units, so as to create an MH TP, thereby outputting the created MH TP to the MH TP handler 213. When it is determined that the corresponding MH TP includes an SMT section based upon the header in each of the inputted MH TP, the MH TP handler 213 parses the corresponding SMT section, so as to output the SI data within the parsed SMT section to the physical adaptation control signal handler 216. However, this is limited to when the SMT is not encapsulated to IP datagrams.

Meanwhile, when the SMT is not encapsulated to IP datagrams, and when it is determined that the corresponding MH TP includes an SMT section based upon the header in each of the inputted MH TP, the MH TP handler 213 outputs the SMT section to the IP network stack 220. Accordingly, the IP network stack 220 performs IP and UDP processes on the inputted SMT section and, then, outputs the processed SMT section to the SI handler 240. The SI handler 240 parses the inputted SMT section and controls the system so that the parsed SI data can be stored in the storage unit 290. The following corresponds to example of the fields that may be transmitted through the SMT.

The table_id field corresponds to an 8-bit unsigned integer number, which indicates the type of table section. The table_id field allows the corresponding table to be defined as the service map table (SMT). The ensemble_id field is an 8-bit unsigned integer field, which corresponds to an ID value associated to the corresponding MH ensemble. Herein, the ensemble_id field may be assigned with a value ranging from range '0x00' to '0x3F'. It is preferable that the value of the ensemble_id field is derived from the parade_id of the TPC data, which is carried from the baseband processor of MH physical layer subsystem. When the corresponding MH ensemble is transmitted through (or carried over) the primary RS frame, a value of '0' may be used for the most significant bit (MSB), and the remaining 7 bits are used as the parade_id value of the associated MH parade (i.e., for the least significant 7 bits). Alternatively, when the corresponding MH ensemble is transmitted through (or carried over) the secondary RS frame, a value of '1' may be used for the most significant bit (MSB).

The num_channels field is an 8-bit field, which specifies the number of virtual channels in the corresponding SMT section. Meanwhile, the SMT according to the embodiment of the present invention provides information on a plurality of virtual channels using the 'for' loop statement. The major_channel_num field corresponds to an 8-bit field, which represents the major channel number associated with the corresponding virtual channel. Herein, the major_channel_num field may be assigned with a value ranging from '0x00' to '0xFF'. The minor_channel_num field corresponds to an 8-bit field, which represents the minor channel number associated with the corresponding virtual channel. Herein, the minor_channel_num field may be assigned with a value ranging from '0x00' to '0xFF'.

The short_channel_name field indicates the short name of the virtual channel. The service_id field is a 16-bit unsigned integer number (or value), which identifies the virtual channel service. The service_type field is a 6-bit enumerated type field, which designates the type of service carried in the corresponding virtual channel as defined in Table 2 below.

TABLE 2

| | |
|---|---|
| 0x00 | [Reserved] |
| 0x01 | MH__digital__television field: the virtual channel carries television programming (audio, video and optional associated data) conforming to ATSC standards. |
| 0x02 | MH__audio field: the virtual channel carries audio programming (audio service and optional associated data) conforming to ATSC standards. |
| 0x03 | MH__data__only__service field: the virtual channel carries a data service conforming to ATSC standards, but no video or audio component. |
| 0x04 to 0xFF | [Reserved for future ATSC usage] |

The virtual_channel_activity field is a 2-bit enumerated field identifying the activity status of the corresponding virtual channel. When the most significant bit (MSB) of the virtual_channel_activity field is '1', the virtual channel is active, and when the most significant bit (MSB) of the virtual_channel_activity field is '0', the virtual channel is inactive. Also, when the least significant bit (LSB) of the virtual_channel_activity field is '1', the virtual channel is hidden (when set to 1), and when the least significant bit (LSB) of the virtual_channel_activity field is '0', the virtual channel is not hidden. The num_components field is a 5-bit field, which specifies the number of IP stream components in the corresponding virtual channel. The IP_version_flag field corresponds to a 1-bit indicator. More specifically, when the value of the IP_version_flag field is set to '1', this indicates that a source_IP_address field, a virtual_channel_target_IP_address field, and a component_target_IP_address field are IPv6 addresses. Alternatively, when the value of the IP_version_flag field is set to '0', this indicates that the source_IP_address field, the virtual_channel_target_IP_address field, and the component_ target_IP_address field are IPv4.

The source_IP_address_flag field is a 1-bit Boolean flag, which indicates, when set, that a source IP address of the corresponding virtual channel exist for a specific multicast source. The virtual_channel_target_IP_address_flag field is a 1-bit Boolean flag, which indicates, when set, that the corresponding IP stream component is delivered through IP datagrams with target IP addresses different from the virtual_channel_target_IP_address. Therefore, when the flag is set, the receiving system (or receiver) uses the component_target_IP_address as the target_IP_address in order to access the corresponding IP stream component. Accordingly, the receiving system (or receiver) may ignore the virtual_channel_target_IP_address field included in the num_channels loop.

The source_IP_address field corresponds to a 32-bit or 128-bit field. Herein, the source_IP_address field will be significant (or present), when the value of the source_IP_address_flag field is set to '1'. However, when the value of the source_IP_address_flag field is set to '0', the source_IP_address field will become insignificant (or absent). More specifically, when the source_IP_address_flag field value is set to '1', and when the IP_version_flag field value is set to '0', the source_IP_address field indicates a 32-bit IPv4 address, which shows the source of the corresponding virtual channel. Alternatively, when the IP_version_flag field value is set to '1', the source_IP_address field indicates a 128-bit IPv6 address, which shows the source of the corresponding virtual channel.

The virtual_channel_target_IP_address field also corresponds to a 32-bit or 128-bit field. Herein, the virtual_channel_target_IP_address field will be significant (or present), when the value of the virtual_channel_target_IP_address_flag field is set to '1'. However, when the value of the virtual_channel_target_IP_address_flag field is set to '0', the virtual_channel_target_IP_address field will become insignificant (or absent). More specifically, when the virtual_channel_target_IP_address_flag field value is set to '1', and when the IP_version_flag field value is set to '0', the virtual_channel_target_IP_address field indicates a 32-bit target IPv4 address associated to the corresponding virtual channel. Alternatively, when the virtual_channel_target_IP_address_flag field value is set to '1', and when the IP_version_flag field value is set to '1', the virtual_channel_target_IP_address field indicates a 64-bit target IPv6 address associated to the corresponding virtual channel. If the virtual_channel_target_IP_address field is insignificant (or absent), the component_target_IP_address field within the num_channels loop should become significant (or present). And, in order to enable the receiving system to access the IP stream component, the component_target_IP_address field should be used.

Meanwhile, the SMT according to the embodiment of the present invention uses a 'for' loop statement in order to provide information on a plurality of components. Herein, the RTP_payload_type field, which is assigned with 7 bits, identifies the encoding format of the component based upon Table 3 shown below. When the IP stream component is not encapsulated to RTP, the RTP_payload_type field shall be ignored (or deprecated). Table 3 below shows an example of an RTP payload type.

TABLE 3

| RTP__payload__type | Meaning |
|---|---|
| 35 | AVC video |
| 36 | MH audio |
| 37 to 72 | [Reserved for future ATSC use] |

The component_target_IP_address_flag field is a 1-bit Boolean flag, which indicates, when set, that the corresponding IP stream component is delivered through IP datagrams with target IP addresses different from the virtual_channel_target_IP_address. Furthermore, when the component_ target_IP_address_flag is set, the receiving system (or receiver) uses the component_target_IP_address field as the target IP address for accessind the corresponding IP stream component. Accordingly, the receiving system (or receiver) will ignore the virtual_channel_target_IP_address field included in the num_channels loop. The component_target_IP_address field corresponds to a 32-bit or 128-bit field. Herein, when the value of the IP_version_flag field is set to '0', the component_target_IP_address field indicates a 32-bit target IPv4 address associated to the corresponding IP stream component. And, when the value of the IP_version_flag field is set to '1', the component_target_IP_address field indicates a 128-bit target IPv6 address associated to the corresponding IP stream component.

The port_num_count field is a 6-bit field, which indicates the number of UDP ports associated with the corresponding IP stream component. A target UDP port number value starts from the target_UDP_port_num field value and increases (or is incremented) by 1. For the RTP stream, the target UDP port number should start from the target_UDP_port_num field value and shall increase (or be incremented) by 2. This is to incorporate RTCP streams associated with the RTP streams.

The target_UDP_port_num field is a 16-bit unsigned integer field, which represents the target UDP port number for the corresponding IP stream component. When used for RTP streams, the value of the target_UDP_port_num field shall correspond to an even number. And, the next higher value shall represent the target UDP port number of the associated RTCP stream. The component_level_descriptor( ) represents zero or more descriptors providing additional information on the corresponding IP stream component. The virtual_channel_level_descriptor( ) represents zero or more descriptors providing additional information for the corresponding virtual channel. The ensemble_level_descriptor( ) represents zero or more descriptors providing additional information for the MH ensemble, which is described by the corresponding SMT.

FIG. 18 illustrates an exemplary bit stream syntax structure of an MH audio descriptor according to the present invention. When at least one audio service is present as a component of the current event, the MH_audio_descriptor( ) shall be used as a component_level_descriptor of the SMT. The MH_audio_descriptor( ) may be capable of informing the system of the audio language type and stereo mode status. If there is no audio service associated with the current event, then it is preferable that the MH_audio_descriptor( ) is considered to be insignificant (or absent) for the current event. Each field shown in the bit stream syntax of FIG. 18 will now be described in detail.

The descriptor_tag field is an 8-bit unsigned integer having a TBD value, which indicates that the corresponding descriptor is the MH_audio_descriptor( ). The descriptor_length field is also an 8-bit unsigned integer, which indicates the length (in bytes) of the portion immediately following the descriptor_length field up to the end of the MH_audio_descriptor( ). The channel_configuration field corresponds to an 8-bit field indicating the number and configuration of audio channels. The values ranging from '1' to '6' respectively indicate the number and configuration of audio channels as given for "Default bit stream index number" in Table 42 of ISO/IEC 13818-7:2006. All other values indicate that the number and configuration of audio channels are undefined.

The sample_rate_code field is a 3-bit field, which indicates the sample rate of the encoded audio data. Herein, the indication may correspond to one specific sample rate, or may correspond to a set of values that include the sample rate of the encoded audio data as defined in Table A3.3 of ATSC A/52B.

The bit_rate_code field corresponds to a 6-bit field. Herein, among the 6 bits, the lower 5 bits indicate a nominal bit rate. More specifically, when the most significant bit (MSB) is '0', the corresponding bit rate is exact. On the other hand, when the most significant bit (MSB) is '0', the bit rate corresponds to an upper limit as defined in Table A3.4 of ATSC A/53B. The ISO_639_language_code field is a 24-bit (i.e., 3-byte) field indicating the language used for the audio stream component, in conformance with ISO 639.2/B [x]. When a specific language is not present in the corresponding audio stream component, the value of each byte will be set to '0x00'.

FIG. 19 illustrates an exemplary bit stream syntax structure of an MH RTP payload type descriptor according to the present invention. The MH_RTP_payload_type_descriptor( ) specifies the RTP payload type. Yet, the MH_RTP_payload_type_descriptor( ) exists only when the dynamic value of the RTP_payload_type field within the num_components loop of the SMT is in the range of '96' to '127'. The MH_RTP_payload_type_descriptor( ) is used as a component_level_descriptor of the SMT. The MH_RTP_payload_type_descriptor translates (or matches) a dynamic RTP_payload_type field value into (or with) a MIME type. Accordingly, the receiving system (or receiver) may collect (or gather) the encoding format of the IP stream component, which is encapsulated in RTP. The fields included in the MH_RTP_payload_type_descriptor( ) will now be described in detail.

The descriptor_tag field corresponds to an 8-bit unsigned integer having the value TBD, which identifies the current descriptor as the MH_RTP_payload_type_descriptor( ). The descriptor_length field also corresponds to an 8-bit unsigned integer, which indicates the length (in bytes) of the portion immediately following the descriptor_length field up to the end of the MH_RTP_payload_type_descriptor ( ). The RTP_payload_type field corresponds to a 7-bit field, which identifies the encoding format of the IP stream component. Herein, the dynamic value of the RTP_payload_type field is in the range of '96' to '127'. The MIME_type_length field specifies the length (in bytes) of the MIME_type field. The MIME_type field indicates the MIME type corresponding to the encoding format of the IP stream component, which is described by the MH_RTP_payload_type_descriptor( ).

FIG. 20 illustrates an exemplary bit stream syntax structure of an MH current event descriptor according to the present invention. The MH_current_event_descriptor( ) shall be used as the virtual_channel_level_descriptor( ) within the SMT. Herein, the MH_current_event_descriptor( ) provides basic information on the current event (e.g., the start time, duration, and title of the current event, etc.), which is transmitted via the respective virtual channel. The fields included in the MH_current_event_descriptor( ) will now be described in detail.

The descriptor_tag field corresponds to an 8-bit unsigned integer having the value TBD, which identifies the current descriptor as the MH_current_event_descriptor( ). The descriptor_length field also corresponds to an 8-bit unsigned integer, which indicates the length (in bytes) of the portion immediately following the descriptor_length field up to the end of the MH_current_event_descriptor( ). The current_event_start_time field corresponds to a 32-bit unsigned integer quantity. The current_event_start_time field represents the start time of the current event and, more specifically, as the number of GPS seconds since 00:00:00 UTC, Jan. 6, 1980. The current_event_duration field corresponds to a 24-bit field. Herein, the current_event_duration field indicates the duration of the current event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 21 illustrates an exemplary bit stream syntax structure of an MH next event descriptor according to the present invention. The optional MH_next_event_descriptor( ) shall be used as the virtual_channel_level_descriptor( ) within the SMT. Herein, the MH_next_event_descriptor( ) provides basic information on the next event (e.g., the start time, duration, and title of the next event, etc.), which is transmitted via the respective virtual channel. The fields included in the MH_next_event_descriptor( ) will now be described in detail.

The descriptor_tag field corresponds to an 8-bit unsigned integer having the value TBD, which identifies the current descriptor as the MH_next_event_descriptor( ). The descriptor_length field also corresponds to an 8-bit unsigned integer, which indicates the length (in bytes) of the portion immediately following the descriptor_length field up to the end of the MH_next_event_descriptor( ). The next_event_start_time field corresponds to a 32-bit unsigned integer quantity. The next_event_start_time field represents the start time of the next event and, more specifically, as the number of GPS seconds since 00:00:00 UTC, Jan. 6, 1980. The next_event_duration field corresponds to a 24-bit field. Herein, the next_event_duration field indicates the duration of the next event in hours, minutes, and seconds (wherein the format is in 6 digits, 4-bit BCD=24 bits). The title_length field specifies the length (in bytes) of the title_text field. Herein, the value '0' indicates that there are no titles existing for the corresponding event. The title_text field indicates the title of the corresponding event in event title in the format of a multiple string structure as defined in ATSC A/65C [x].

FIG. 22 illustrates an exemplary bit stream syntax structure of an MH system time descriptor according to the present invention. The MH_system_time_descriptor( ) shall be used as the ensemble_level_descriptor( ) within the SMT. Herein, the MH_system_time_descriptor( ) provides information on current time and date. The MH_system_time_descriptor( ) also provides information on the time zone in which the transmitting system (or transmitter) transmitting the corresponding broadcast stream is located, while taking into consideration the mobile/portable characterstics of the MH service data. The fields included in the MH_system_time_descriptor( ) will now be described in detail.

The descriptor_tag field corresponds to an 8-bit unsigned integer having the value TBD, which identifies the current descriptor as the MH_system_time_descriptor( ). The descriptor_length field also corresponds to an 8-bit unsigned integer, which indicates the length (in bytes) of the portion immediately following the descriptor_length field up to the end of the MH_system_time_descriptor( ). The system_time field corresponds to a 32-bit unsigned integer quantity. The system_time field represents the current system time and, more specifically, as the number of GPS seconds since 00:00:00 UTC, Jan. 6, 1980. The GPS_UTC_offset field corresponds to an 8-bit unsigned integer, which defines the current offset in whole seconds between GPS and UTC time standards. In order to convert GPS time to UTC time, the GPS_UTC_offset is subtracted from GPS time. Whenever the International Bureau of Weights and Measures decides that the current offset is too far in error, an additional leap second may be added (or subtracted). Accordingly, the GPS_UTC_offset field value will reflect the change.

The time_zone_offset_polarity field is a 1-bit field, which indicates whether the time of the time zone, in which the broadcast station is located, exceeds (or leads or is faster) or falls behind (or lags or is slower) than the UTC time. When the value of the time_zone_offset_polarity field is equal to '0', this indicates that the time on the current time zone exceeds the UTC time. Therefore, the time_zone_offset_polarity field value is added to the UTC time value. Conversely, when the value of the time_zone_offset_polarity field is equal to '1', this indicates that the time on the current time zone falls behind the UTC time. Therefore, the time_zone_offset_polarity field value is subtracted from the UTC time value.

The time_zone_offset field is a 31-bit unsigned integer quantity. More specifically, the time_zone_offset field represents, in GPS seconds, the time offset of the time zone in which the broadcast station is located, when compared to the UTC time. The daylight_savings field corresponds to a 16-bit field providing information on the Summer Time (i.e., the Daylight Savings Time). The time_zone field corresponds to a (5×8)-bit field indicating the time zone, in which the transmitting system (or transmitter) transmitting the corresponding broadcast stream is located.

Figure 23:
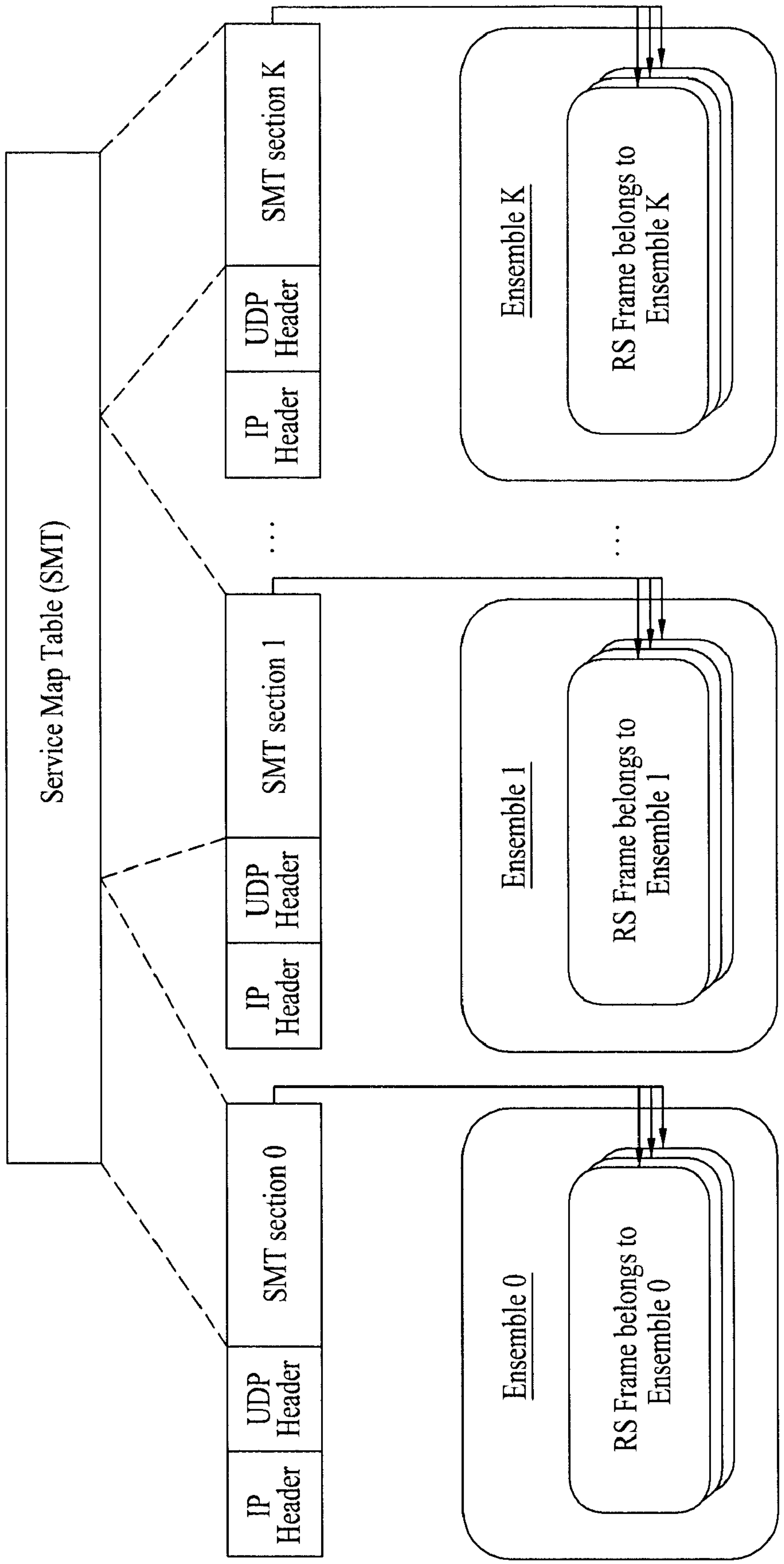
FIG. 23 illustrates segmentation and encapsulation processes of a service map table according to the present invention.

FIG. 23 illustrates segmentation and encapsulation processes of a service map table (SMT) according to the present invention. According to the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. In addition, the SMT section provides signaling information on all virtual channel included in the MH ensemble including the corresponding SMT section. At least one SMT section describing the MH ensemble is included in each RS frame included in the corresponding MH ensemble. Finally, each SMT section is identified by an ensemble_id included in each section. According to the embodiment of the present invention, by informing the receiving system of the target IP address and target UDP port number, the corresponding data (i.e., target IP address and target UDP port number) may be parsed without having the receiving system to request for other additional information.

Figure 24:
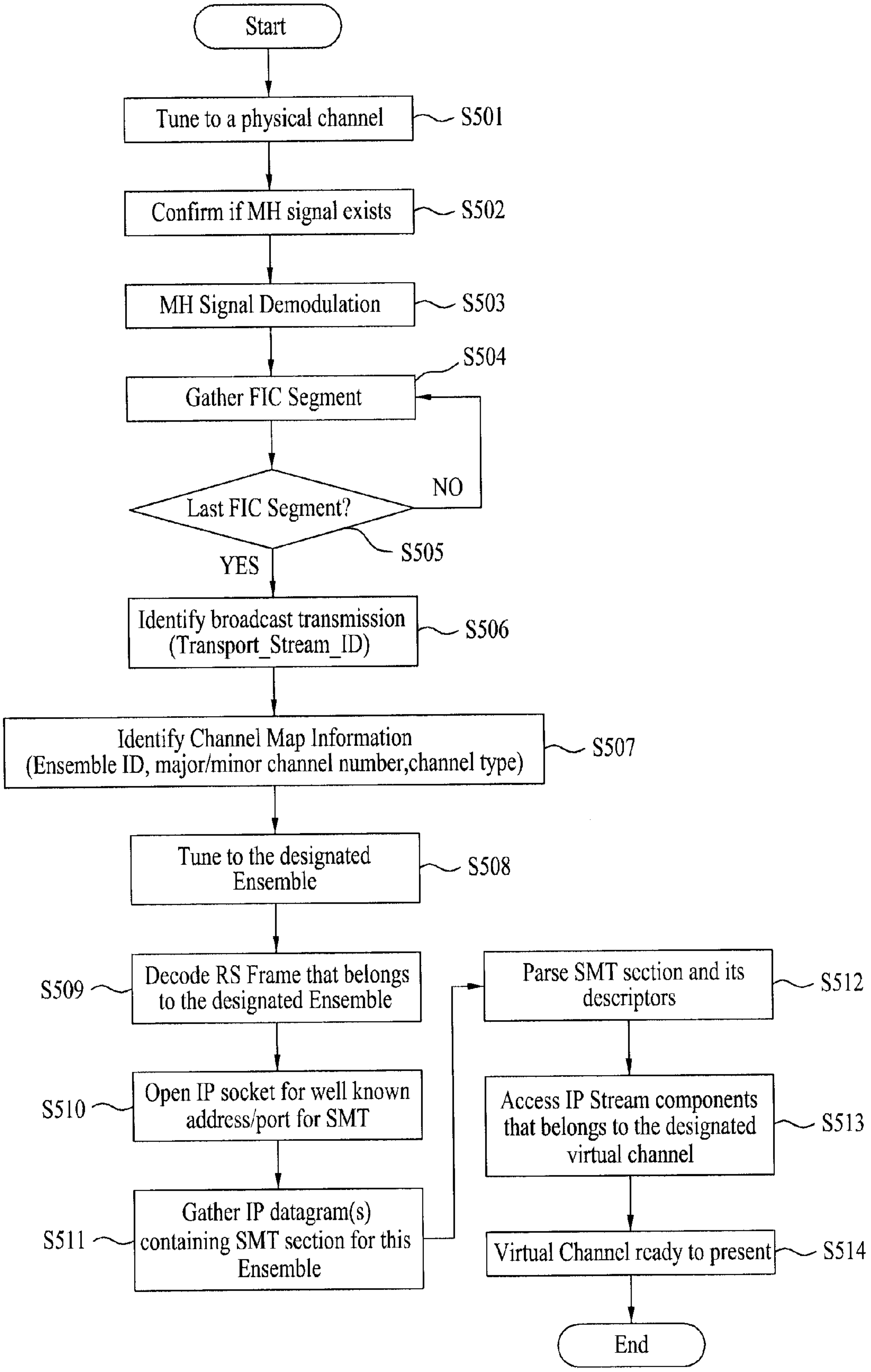
FIG. 24 illustrates a flow chart for accessing a virtual channel using FIC and SMT according to the present invention.

FIG. 24 illustrates a flow chart for accessing a virtual channel using FIC and SMT according to the present invention. More specifically, a physical channel is tuned (S501). And, when it is determined that an MH signal exists in the tuned physical channel (S502), the corresponding MH signal is demodulated (S503). Additionally, FIC segments are grouped from the demodulated MH signal in sub-frame units (S504 and S505). According to the embodiment of the present invention, an FIC segment is inserted in a data group, so as to be transmitted. More specifically, the FIC segment corresponding to each data group described service information on the MH ensemble to which the corresponding data group belongs.

When the FIC segments are grouped in sub-frame units and, then, deinterleaved, all service information on the physical channel through which the corresponding FIC segment is transmitted may be acquired. Therefore, after the tuning process, the receiving system may acquire channel information on the corresponding physical channel during a sub-frame period. Once the FIC segments are grouped, in S504 and S505, a broadcast stream through which the corresponding FIC segment is being transmitted is identified (S506). For example, the broadcast stream may be identified by parsing the transport_stream_id field of the FIC body, which is configured by grouping the FIC segments. Furthermore, an ensemble identifier, a major channel number, a minor channel number, channel type information, and so on, are extracted from the FIC body (S507). And, by using the extracted ensemble information, only the slots corresponding to the designated ensemble are acquired by using the time-slicing method, so as to configure an ensemble (S508).

Subsequently, the RS frame corresponding to the designated ensemble is decoded (S509), and an IP socket is opened for SMT reception (S510). According to the example given in the embodiment of the present invention, the SMT is encapsulated to UDP, while including a target IP address and a target UDP port number within the IP datagram. More specifically, the SMT is first segmented into a predetermined number of sections, then encapsulated to a UDP header, and finally encapsulated to an IP header. According to the embodiment of the present invention, by informing the receiving system of the target IP address and target UDP port number, the receiving system parses the SMT sections and the descriptors of each SMT section without requesting for other additional information (S511).

The SMT section provides signaling information on all virtual channel included in the MH ensemble including the corresponding SMT section. At least one SMT section describing the MH ensemble is included in each RS frame included in the corresponding MH ensemble. Also, each SMT section is identified by an ensemble_id included in each section. Furthermore each SMT provides IP access information on each virtual channel subordinate to the corresponding MH ensemble including each SMT. Finally, the SMT provides IP stream component level information required for the servicing of the corresponding virtual channel. Therefore, by using the information parsed from the SMT, the IP stream component belonging to the virtual channel requested for reception may be accessed (S513). Accordingly, the service associated with the corresponding virtual channel is provided to the user (S514).

Meanwhile, if signaling tables describing signaling information required for an IP based service are received, the present invention enables the received signaling tables to be processed.

The signaling tables correspond to any one that describes signaling information. According to one embodiment of the present invention, a process for transmitting, receiving and processing STT (system time table), CIT (cell information table) and RRT (rating region table) is described in the following description.

First of all, the STT provides information on a current time and date and time zone information. In particular, in case that a broadcasting system for a mobile subject provides a service to cover such a wide area as North America, there exists at least one or more time zones to hand over. Therefore, the time zone information is mandatory.

The CIT provides channel information of each cell, which is a propagating area of broadcast signals, and the like. In multi-frequency network (MFN) environment, a range affected by a transmitter according to a single physical frequency is named a cell. Namely, the CIT provides adjacent cell carrier frequency information of a current transmitter. Hence, with the CIT information, a receiver can travel from one transmitter's (or exciter's) coverage area to another.

The RRT provides rating information relevant to various regions. In particular, the RRT provides content advisory rating information. A receiver of the present invention is able to perform parental blocking using the RRT.

Each of the signaling tables of the present invention can be received by being included in an RS frame in IP based signaling format or non-IP signaling format.

For instance, each of the signaling tables is encapsulated with a UDP header, is encapsulated with an IP header, and is then included in an RS frame in an IP based signaling format. Alternatively, each of the signaling tables is encapsulated in a section structure and is then included in an RS frame in a non-IP signaling format.

Figure 25:
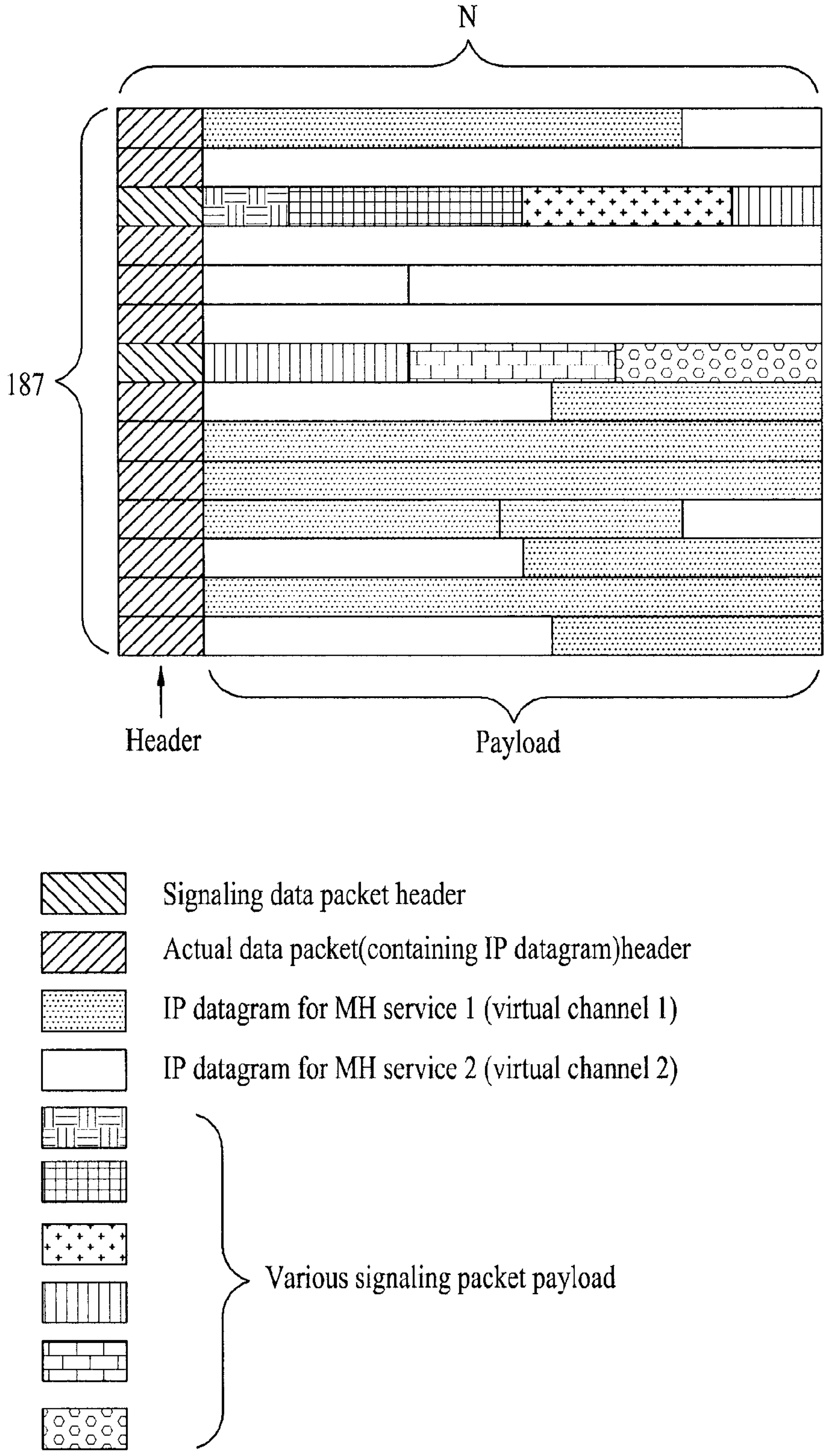
FIG. 25 is a diagram of an RS frame according to another embodiment of the present invention.

FIG. 25 is a diagram of an RS frame according to another embodiment of the present invention.

Referring to FIG. 25, the RS frame includes at least one MH TP (transport packet). The MH TP includes an MH header and an MH payload.

Signaling table data can be included in the MH payload as well as mobile service data. In particular, a single MH payload includes mobile service data only, includes signaling table data only, or includes both of the mobile service data and the signaling table data.

In FIG. 25, signaling table data are allocated to two MH payloads within a single RS frame and mobile service data are allocated to the rest of MH payloads. The mobile service data is encapsulated with RTP/UDP/IP header and is then included as an IP based format in the RS frame.

The signaling table data allocated to the two MH payloads within the RS frame can include SMT, STT, CIT, RRT or the like.

In this case, a plurality of signaling table data, as shown in FIG. 25, can be sequentially allocated to a single MH payload in the predetermined order. Alternatively, a single table data can be allocated to a single MH payload.

In FIG. 25, the positions and number of MH TP, to which the signaling table data are allocated, within the single RS frame are just exemplary and may be modified by a designer. Hence, the present invention is non-limited by this embodiment.

In case that the signaling table data, as shown in FIG. 25, are received by being included in the MH TP within the RS frame, the RS frame decoders 170 and 180 shown in FIG. 1 decode an inputted RS frame. The decoded RS frame is outputted to the corresponding RS frame handlers 211 and 212. Each of the RS frame handlers 211 and 212 configures an MH TP by discriminating the inputted RS frame by a row unit and then outputs the MH TP to the MH TP handler 213.

If the corresponding MH TP includes the signaling table data based on a header of each of the inputted MH TPs and if the included the signaling table data is in non-IP format, the MH TP handler 213 outputs the signaling table data to the physical adaptation control signal handler 216. The physical adaptation control signal handler 216 parses the non-IP type signal table data and then stores the result in the storage unit 290.

Meanwhile, if the corresponding MH TP includes the signaling table data based on a header of each of the inputted MH TPs and if the included the signaling table data is in IP based format, the MH TP handler 213 outputs it to the IP network stack 220. If so, the IP network stack 220 performs IP and UDP processing on the signaling able data and then outputs it to the SI handler 240. The SI handler 240 parses the inputted signaling table data and then stores the result in the storage unit 290.

FIG. 26 is a diagram of a syntax structure for an STT section in signaling tables according to one embodiment of the present invention. In particular, in case that STT is transmitted in non-IP signaling format, a type of MPEG-2 'short-form' private section is shown in FIG. 26.

The STT provides a current date and time and time zone information of a time zone to which a transmitter transmitting a signal currently received by a receiver belongs. The STT can be received in a manner of being included in an RS frame in non-IP or IP-based signaling format.

In case that the STT is received in the non-IP signaling format, the STT data passes through the MH TP handler 213, is outputted to the physical adaptation control signal handler 216, and is then decoded. The corresponding contents are stored in the storage unit 290.

In case that the STT is received in the IP-based signaling format, the STT data is outputted to the SI handler 240 through the MH TP handler 213 and the IP network stack 220 and is then decoded. The corresponding contents are stored in the storage unit 290.

In FIG. 26, table_id field is an identifier of a table and can be set to an identifier for identifying STT.

A 'section_syntax_indicator' field is an indicator for defining a section format of STT.

A 'private_indicator' field indicates whether STT follows a private section.

A 'section_length' field indicates a section length of STT.

A 'version_number' field indicates a version number of STT.

A 'section_number' field indicates a section number of a current STT section.

A 'last_section_number' field indicates a last section number of STT.

A 'system_time' field indicates a current system time and indicates the number counted by GPS second since 00 hour 00 minute 00 second on Jan. 6, 1980 UTC. Hence, system_time becomes the time information based on UTC (universal time coordinates).

A 'GPS_UTC_offset' field indicates a difference between GPS time and UTC time by second unit. In order to convert GPS time to UTC time, GPS_UTC_offset is subtracted from GPS time.

A 'daylight_savings' field is used to consider a period to which a time named a summer time in Korea is applied.

A 'time_zone_offset_polarity' field indicates whether a time of a time zone at which a transmitter is located is ahead of or behind UTC time.

A 'time_zone_offset' field indicates a time offset of a time zone where a transmitter is located.

The STT section can further include a descriptor for describing additional information that is associated with the STT.

Figure 27:
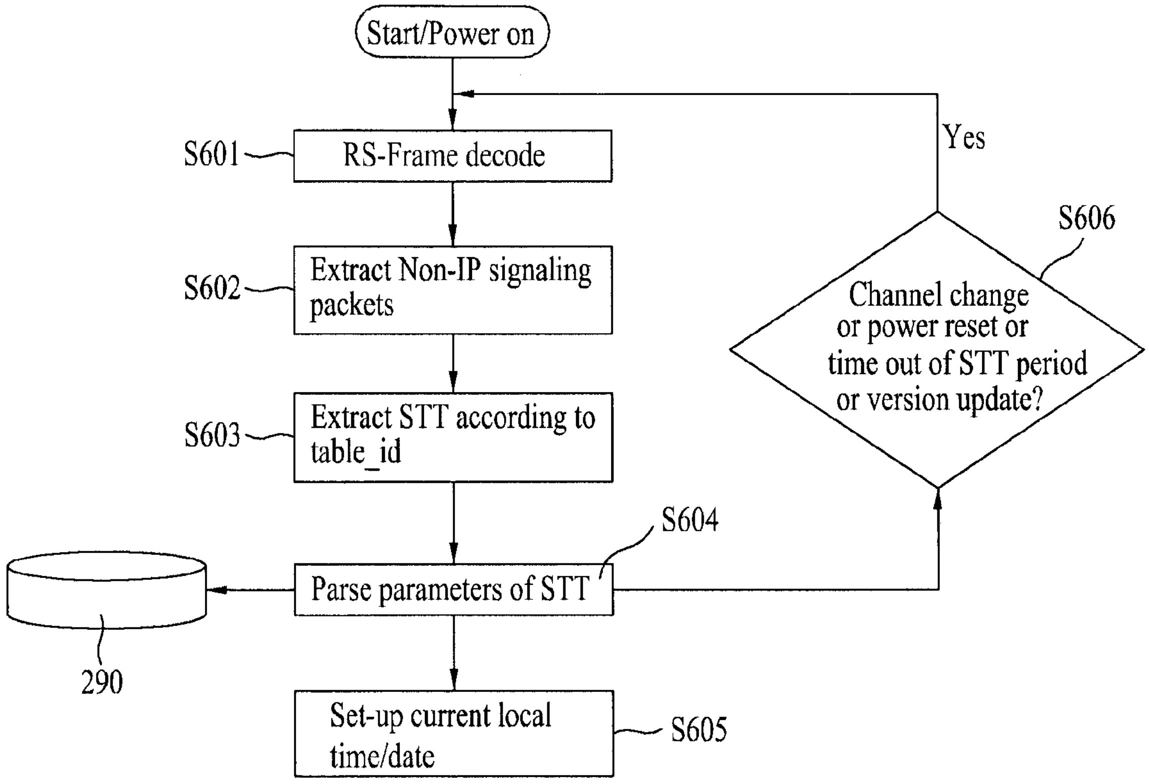
FIG. 27 is a flowchart for a method of processing an STT received in non-IP signaling format according to one embodiment of the present invention.

FIG. 27 is a flowchart for a method of processing an STT received in non-IP signaling format according to one embodiment of the present invention. A receiver of the present invention periodically receives STT for example.

Referring to FIG. 27, by decoding an RS frame including the STT (S601), MH TPs including non-IP signaling table data are extracted (S602).

The STT is extracted from the MH TP according to table_id (S603), a parameter of the extracted STT is parsed, the corresponding result from the parsing is then stored in the storage unit 290 (S604).

By referring to the parsing result of the STT, a current local time and date are set up (S605).

If a channel is switched, if a power is reset, if an STT period is timed out, or if an STT version is updated, the routine goes back to the step S601 to perform the STT receiving and processing steps again.

In FIG. 27, the steps S601 and S602 are performed by the RS frame handlers 211 and 212, the steps S603 and S604 are performed by the physical adaptation control signal handler 216, and the step S605 is performed by the presentation controller 330, for example.

Figure 28:
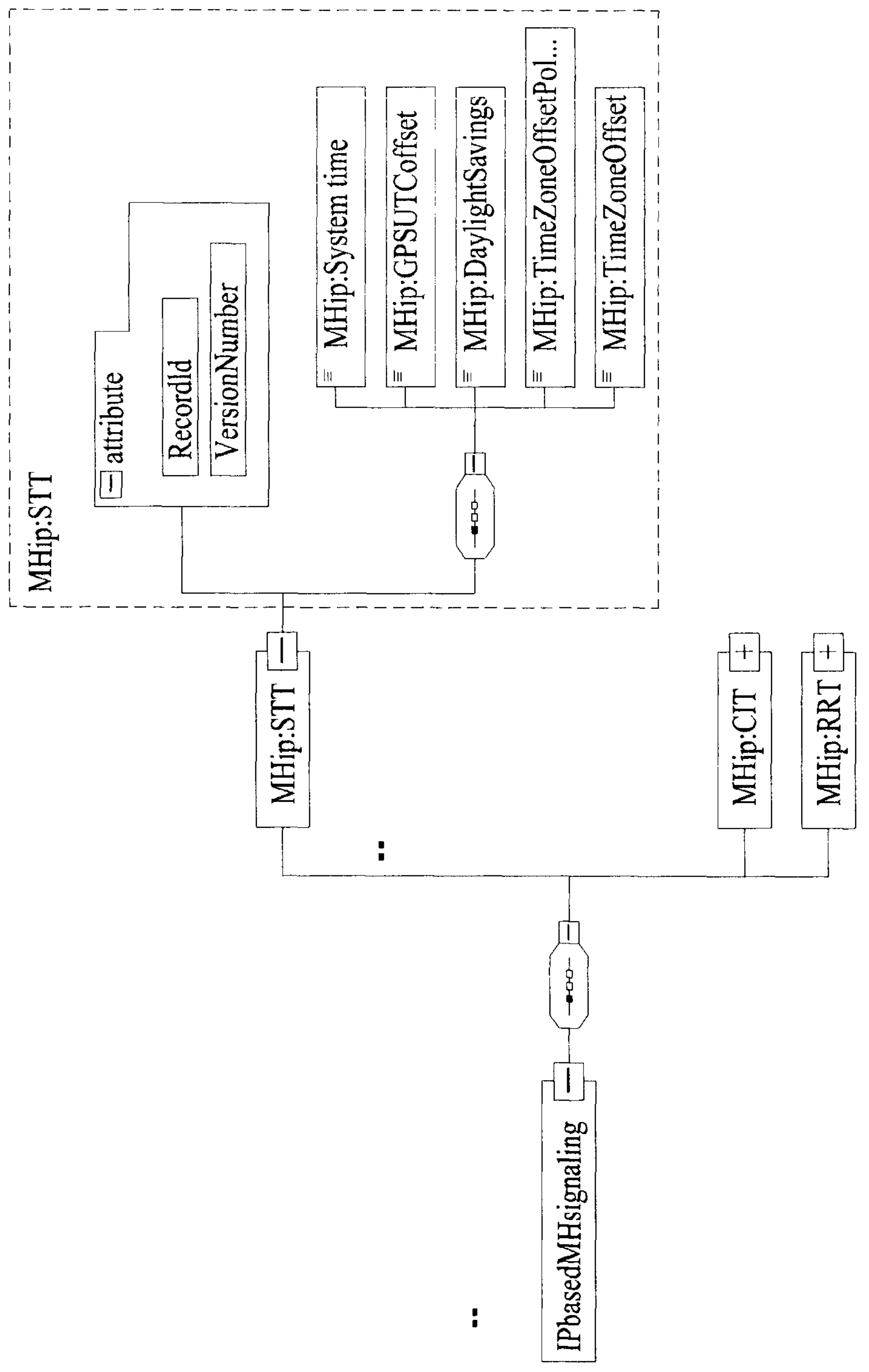
FIG. 28 is an exemplary diagram for an XML data structure of STT data received in IP based signaling format according to the present invention.

FIG. 28 is an exemplary diagram for an XML data structure of STT data received in IP based signaling format according to the present invention, and FIG. 29 is a diagram for the STT data of FIG. 28 represented in XML schema format.

Referring to FIG. 28 and FIG. 29, an IP based signaling element IPbasedMHsignaling can include an STT element, a CIT element and an RRT element as lower elements.

The STT element can include a Recordid field and a VersionNumber field, which are defined as attributes.

The Recordid field indicates a unique identifier for identifying the STT element. And, the VersionNumber field indicates a version number of the STT element.

The STT element includes System Time element, GPSUTCoffset element, DaylightSavings element, TimeZoneOffsetPloalrity element and TimeZoneoffset element as lower elements.

The System Time element indicates a current system time and represents the number counted by GPS second since 00 hour 00 minute 00 second on Jan. 6, 1980 UTC. Hence, system_time becomes the time information based on UTC (universal time coordinates).

The GPSUTCoffset element indicates a difference between GPS time and UTC time by second unit. In order to convert GPS time to UTC time, GPS_UTC_offset is subtracted from GPS time.

The DaylightSavings element is used to consider a time period to which a time named the summer time in Korea is applied.

The TimeZoneOffsetPolarity element indicates whether a time of a time zone at which a transmitter is located is ahead of or behind UTC time.

The TimeZoneOffset element indicates a time offset of a time zone where a transmitter is located.

Figure 30:
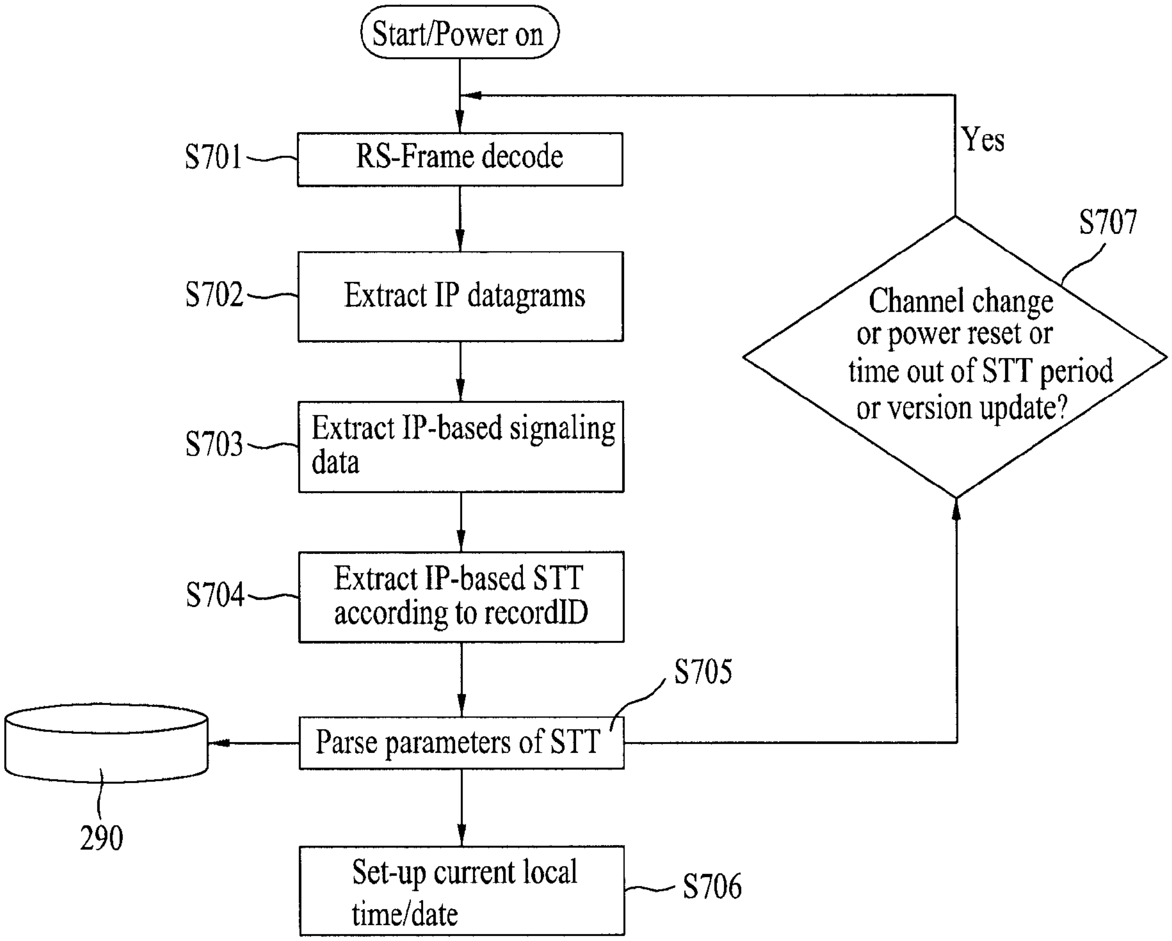
FIG. 30 is a flowchart for a method of processing an STT received in IP-based signaling format according to one embodiment of the present invention.

FIG. 30 is a flowchart for a method of processing an STT received in IP-based signaling format according to one embodiment of the present invention, in which a receiver of the present invention periodically receives the STT for example. In this case, the STT is encapsulated by UDP/IP with a target IP address and a target UDP port number on IP datagram and is then received in IP based signaling format by being included in an RS frame. In doing so, an IP address of and a UDP port number the STT use well-known values, whereby a receiving system is able to receive the STT without separate IP access information.

Referring to FIG. 30, by decoding an RS frame including the STT (S701), IP datagrams are extracted from MH TPs within the RS frame (S702). Subsequently, IP based signaling data are extracted from the IP datagrams extracted in the step S702 (S703).

IP based STT is extracted from the IP based signaling data according to Recordid (S704), a parameter of the extracted STT is parsed, and the corresponding result is then stored in the storage unit (S705).

By referring to the parsing result of the STT, a current local time and date are set up (S706).

If a channel is switched, if a power is reset, if an STT period is timed out, or if an STT version is updated, the routine goes back to the step S701 to perform the STT receiving and processing steps again.

In FIG. 30, the steps S701 and S702 are performed by the RS frame handlers 211 and 212, the step S703 is performed by the IP network stack 220, the steps S704 and S705 are performed by the SI handler 240, and the step S706 is performed by the presentation controller 330, for example.

FIG. 31 is a diagram of a syntax structure for a CIT section in signaling tables according to one embodiment of the present invention. In particular, in case that CIT is transmitted in non-IP signaling format, a type of MPEG-2 'short-form' private section is shown in FIG. 31.

Referring to FIG. 31, the CIT enables a receiver to know carrier frequency and channel information of another transmitter (or exciter) except a transmitter of which signal is currently received by the receiver. And, the CIT enables a receiver to perform soft handoff between transmitters (or exciters). The CIT is able to include information of all cells (exciters) of a broadcast network, which transmit the corresponding CIT. Alternatively, the CIT is able to include informations of adjacent cells (exciters) of a cell (exciter) that is currently transmitting the CIT only.

The CIT can be received in non-IP signaling format by being included in an RS frame or can be received in IP based signaling format by being included in an RS frame.

In case that the CIT is received in the non-IP signaling format, the CIT data passes through the MH TP handler 213, is outputted to the physical control signal handler 216, and is then decoded by the physical control signal handler 216. The decoded contents are then stored in the storage unit 290.

Meanwhile, in case that the CIT is received in the IP based signaling format, the CIT data passes through the MH TP handler 213 and the IP network stack 220, is outputted to the SI handler 240, and is then decoded by the SI handler 240. The decode contents are then stored in the storage unit 290.

In FIG. 31, the table_id field is an identifier of a table and can be set to an identifier for identifying the CIT.

A 'section_syntax_indicator' field is an indicator for defining a section format of CIT.

A 'private_indicator' field indicates whether CIT follows a private section.

A 'section_length' field indicates a section length of CIT.

A 'version_number' field indicates a version number of CIT.

A 'section_number' field indicates a section number of a current CIT section.

A 'last_section_number' field indicates a last section number of CIT.

And, num_cells_in_section field is the number of cells defined in CIT and may coincide with the number of transmitters. A broadcasting station enables information on all transmitters transmitting broadcasts to be defined in CIT. In particular, the num_cells_in_section field is an 8-bit unsigned integer number that represents the number of adjacent transmitters' (exciters') information that are carried in this CIT section.

After the num_cells_in_section field, information of each cell is described using 'for loop (hereinafter named a cell loop region)' repeated as many times as a value of the num_cells_in_section field.

The cell loop area can include a cell_id field, a num_channels_in_cell field and 'for loop (hereinafter named a channel loop region)' that describes information of each channel within a corresponding cell in a manner of being repeated as many times as a value of the num_channels_in_cell field.

The cell_id field is an identifier that identifies a cell according to a signal transmission region of each transmitter and is able to match a transmitter of each broadcasting station.

The num_channels_in_cell field indicates the number of broadcast channels transmitted by each transmitter (or cell). The num_channels_in_cell field may correspond to a total number of virtual channels for physical channels transmitted by the respective transmitters.

The channel loop region can include a major_channel_number (major channel number), minor_channel_number (minor channel number), carrier_frequency (carrier frequency), and a descriptor for describing additional information.

Figure 32:
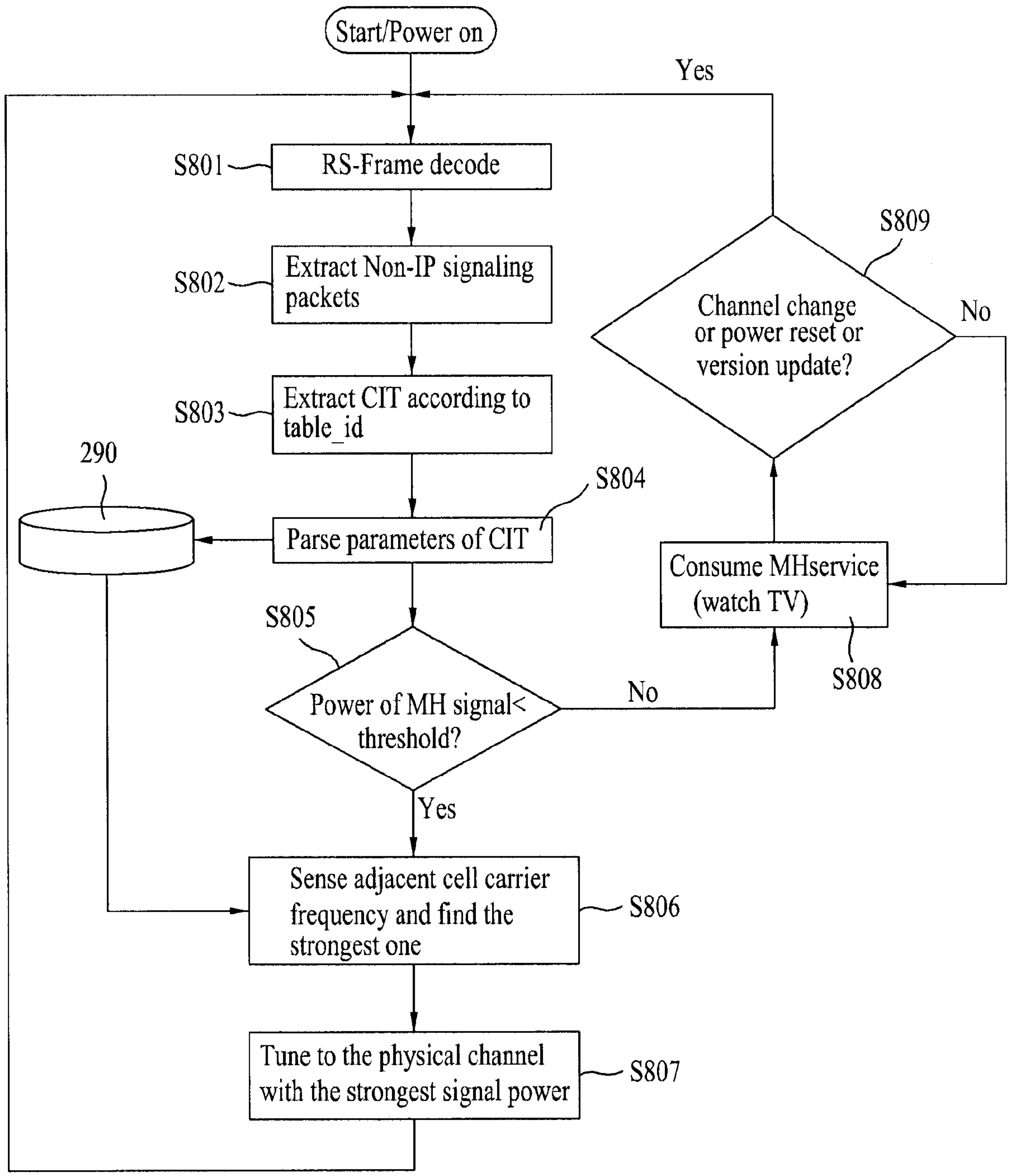
FIG. 32 is a flowchart for a method of processing a CIT received in non-IP signaling format according to one embodiment of the present invention.

FIG. 32 is a flowchart for a method of processing a CIT received in non-IP signaling format according to one embodiment of the present invention, in which a receiver of the present invention periodically receives the CIT for example.

Referring to FIG. 32, by decoding an RS frame including the CIT (S801), MH TPs including non-IP signaling table data are extracted (S802).

Subsequently, CIT is extracted from the MH TP according to table_id (S803), a parameter of the extracted CIT is parsed, and the corresponding result is then stored in the storage unit (S804).

Moreover, a power of the MH signal is compared to a preset threshold. If the power of the MH signal is smaller than the threshold, it is decided as a handover that a receiver moves away from a current cell into another cell (S805). Subsequently, by referring to an adjacent cell carrier frequency parsed from the CIT, a cell having a strongest signal power is searched for (S806). A physical channel of the cell having the strongest signal power, which is found in the step S806, is then tuned to (S807). In particular, if a power of a currently received MH signal becomes smaller than the preset threshold, a receiver senses an MH signal of an adjacent cell and then sets a physical layer side to receive an MH signal from a transmitter having a strongest power.

Meanwhile, if the step S805 checks that the power of the MH signal is greater than the preset threshold, it is checked whether one of a channel switching, a power reset and a CIT version change is generated (S809) while providing an MH service, which is received as information of a current cell and is then processed, to a user (S808). If one of the channel switching, the power reset and the CIT version change is generated, the routine goes back to the step S801 and then repeats the CIT receiving and processing process.

In FIG. 32, the steps S801 and S802 are performed by the RS frame handlers 211 and 212, the steps S803 and S804 are performed by the physical adaptation control signal handler 216, and the steps S806 and S807 are performed by the physical layer, for example.

Figure 33:
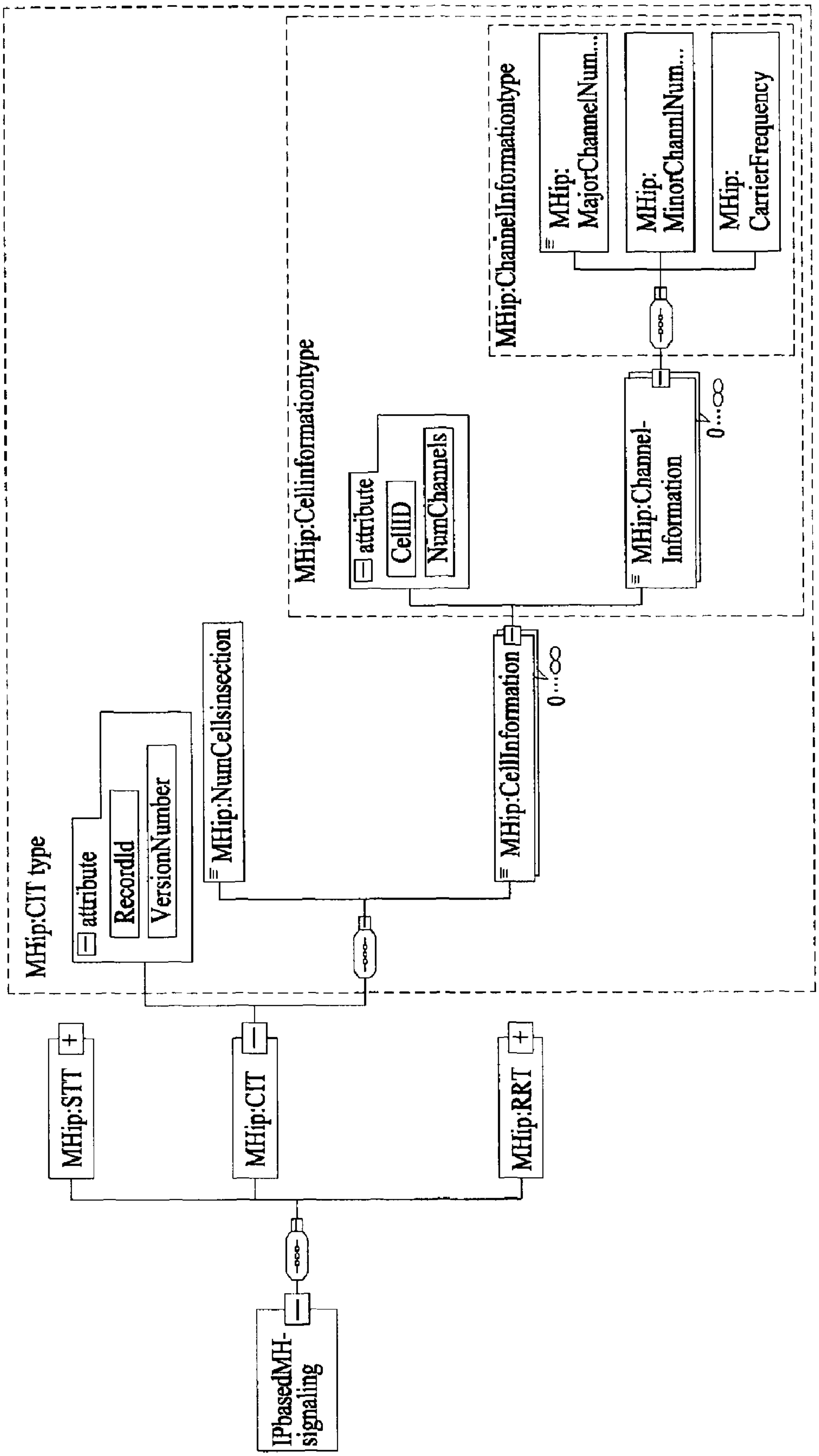
FIG. 33 is an exemplary diagram for an XML data structure of CIT data received in IP based signaling format according to the present invention.

FIG. 33 is an exemplary diagram for an XML data structure of CIT data received in IP based signaling format according to the present invention, and FIG. 34 is a diagram for the CIT data of FIG. 33 represented in XML schema format.

Referring to FIG. 33 and FIG. 34, an IP based signaling element IPbaseMHsignaling can include STT, CIT and RRT elements as lower elements.

The CIT element can include Recordid field and VersionNumber field, which are defined as attributes.

The Recordid field indicates a unique identifier for identifying the CIT element. And, the VersionNUmber field indicates a version number of the CIT element.

The CIT element can include NumCellInSection and CellInformation elements as lower elements.

The CellInformation element can include CellID and NumChannels fields defined as attributes. And, the CellInformation element can include ChannelInformation element as a lower element. The ChannelInformation element can include MajorChannelNumber, MinorChannelNumber and CarrierFrequency elements as lower elements.

The CellInformation element describes information of each cell included in the CIT element and information of each channel included in the corresponding cell.

The CellID field indicates an identifier that identifies a cell according to a signal transmission region of each transmitter. And, the CellID field can match a transmitter of each broadcasting station.

The NumChannels field indicates the number of broadcast channels transmitted by each transmitter (or cell). The NumChannels field may correspond to a total number of virtual channels for a physical channel transmitted by each transmitter.

The MajorChannelNumber element indicates a major channel number of a virtual channel.

The MinorChannelNumber element indicates a minor channel number of a virtual channel.

And, the CarrierFrequency element indicates a carrier frequency of a physical frequency carrying a corresponding virtual channel.

Figure 35:
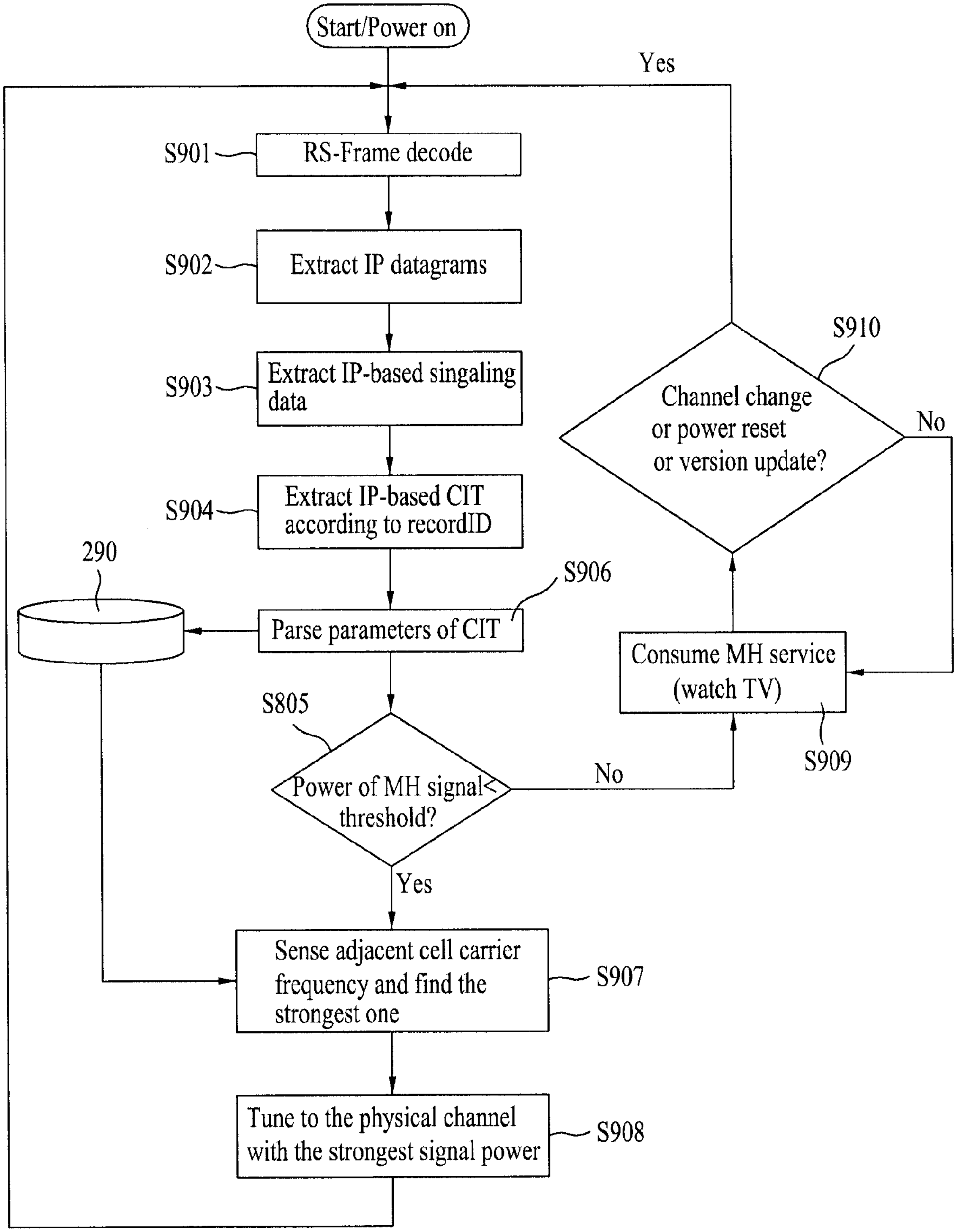
FIG. 35 is a flowchart for a method of processing a CIT received in IP based signaling format according to one embodiment of the present invention.

FIG. 35 is a flowchart for a method of processing a CIT received in IP based signaling format according to one embodiment of the present invention, in which a receiver of the present invention periodically receives the CIT for example. In this case, the CIT is encapsulated by UDP/IP with a target IP address and a target UDP port number on IP datagram and is then received in IP based signaling format by being included in an RS frame. In doing so, an IP address of and a UDP port number the CIT use well-known values, whereby a receiving system is able to receive the CIT without separate IP access information.

Referring to FIG. 35, by decoding an RS frame including the CIT (S901), IP datagrams are extracted from MH TPs within the RS frame (S902). Subsequently, IP based signaling data are extracted from the IP datagrams extracted in the step S902 (S903).

IP based CIT is extracted from the IP based signaling data according to Recordid (S904), a parameter of the extracted CIT is parsed, and the corresponding result is then stored in the storage unit 290 (S905).

Moreover, a power of the MH signal is compared to a preset threshold. If the power of the MH signal is smaller than the threshold, it is decided as a handover that a receiver moves away from a current cell into another cell (S906). Subsequently, by referring to an adjacent cell carrier frequency parsed from the CIT, a cell having a strongest signal power is searched for (S907). A physical channel of the cell having the strongest signal power, which is found in the step S907, is then tuned to (S807). In particular, if a power of a currently received MH signal becomes smaller than the preset threshold, a receiver senses an MH signal of an adjacent cell and then sets a physical layer side to receive an MH signal from a transmitter having a strongest power.

Meanwhile, if the step S906 checks that the power of the MH signal is greater than the preset threshold, it is checked whether one of a channel switching, a power reset and a CIT version change is generated (S910) while providing an MH service, which is received as information of a current cell and is then processed, to a user (S909). If one of the channel switching, the power reset and the CIT version change is generated, the routine goes back to the step S901 and then repeats the CIT receiving and processing process.

In FIG. 35, the steps S901 and S902 are performed by the RS frame handlers 211 and 212, the step S903 is performed by the IP network stack 220, the steps S904 and S905 are performed by the SI handler 240, and the steps S907 and S908 are performed by the physical layer, for example.

FIG. 36 is a diagram of a syntax structure for an RRT section in signaling tables according to one embodiment of the present invention. In particular, in case that RRT is transmitted in non-IP signaling format, a type of MPEG-2 'short-form' private section is shown in FIG. 36.

Referring to FIG. 36, the RRT delivers information on a content advisory rating applied to broadcast programs to a receiver and enables the receiver to perform parental blocking.

The RRT can be received in non-IP signaling format by being included in an RS frame or can be received in IP based signaling format by being included in an RS frame.

In case that the RRT is received in the non-IP signaling format, the RRT data passes through the MH TP handler 213, is outputted to the physical control signal handler 216, and is then decoded by the physical control signal handler 216. The decoded contents are then stored in the storage unit 290.

Meanwhile, in case that the RRT is received in the IP based signaling format, the RRT data passes through the MH TP handler 213 and the IP network stack 220, is outputted to the SI handler 240, and is then decoded by the SI handler 240. The decode contents are then stored in the storage unit 290.

In FIG. 36, the table_id field is an identifier of a table and can be set to an identifier for identifying the RRT.

A 'section_syntax_indicator' field is an indicator for defining a section format of RRT.

A 'private_indicator' field indicates whether RRT follows a private section.

A 'section_length' field indicates a section length of RRT.

A 'version_number' field indicates a version number of RRT.

A 'section_number' field indicates a section number of a current RRT section.

A 'last_section_number' field indicates a last section number of RRT.

A 'rating_region_name' field indicates a total length of the following rating_region_name_text( ) field.

The rating_region_name_text( ) field represents a rating region name as a multiple string structure.

A 'dimensions_defined' field means the number of dimensions defined in a current RRT section.

A 'dimension_name_length' field indicates a total length of the following dimension_name_text( ) field.

The dimension_name_text( ) field represents a dimension name described by the loop as a multiple string structure.

A 'graduated_scale' field indicates whether a rating value has a graduated scale in a corresponding dimension.

A 'values_defined' field indicates the number of values defined in the corresponding dimension.

A 'rating_level_tag' field is an 8-bit unsigned integer that acts as a unique ID for this rating value. The value of this field shall be unique through all the rating regions, dimensions and rating value.

An 'abbrev_rating_value_length' field indicates a total length of the following abbrev_rating_value_text( ) field.

The abbrev_rating_value_text( ) field represents an abbreviated name of a specific rating as a multiple sting structure.

A 'rating_value_length' field indicates a total length of the following rating_value_text( ) field.

The rating_value_text( ) field represents a full name of a specific rating as a multiple string structure.

The RRT section can further include a descriptor that describes additional information relevant to the RRT.

Thus, the RRT includes a rating region name (rating_region_name_text), dimensions (language, age, sex) defined in the RRT (dimensions_defined), a dimension name (dimension_name_text), a viewing rating for a corresponding dimension (value_defined) and the like.

Meanwhile, a receiver is able to receive a content advisory descriptor (CAD). The CAD can be received in a descriptor format of RRT. Alternatively, the CAD can be received in a descriptor format of another signaling table. According to one embodiment of the present invention, the CAD is received in a descriptor format of SMT. Likewise, the CAD can be received in non-IP signaling format or IP based signaling format.

FIG. 37 is a diagram of a syntax structure for a content advisory descriptor (CAD) according to one embodiment of the present invention. In particular, in case that CAD is transmitted in non-IP signaling format, a type of MPEG-2 'short-form' private section is shown in FIG. 37.

Referring to FIG. 37, the CAD is used to indicate a rating of a corresponding event (or MH service). For instance, it is able to designate the rating that is defined up to maximum eight regions per event. The CAD-omitted event indicates that a rating is zero in all dimensions defined within a region. 'Non-rating for a specific dimension' means that a rating of zero is provided to the corresponding dimension. 'Non-rating for a specific region' means that there exists no rating defined in all dimensions within the corresponding region. Moreover, 'CAD for a specific event fails to exist' means that a rating for the event is not defined in all regions.

In FIG. 37, descriptor_tag field is a descriptor identifier and can be set to an identifier that identifies CAD.

A descriptor_length field indicates a rest length of a descriptor by a byte unit to an end of the descriptor behind the descriptor_length field.

A rating_region_count field indicates the number of rating region specifications.

A rating_region field indicates a value for connecting a rating region defined in RRT to a rating region of a descriptor.

A rating_dimensions field indicates the number of rating dimensions relevant to a corresponding event (or MH service). This field value is equal to or smaller than a value defined by dimensions_defined field within the corresponding RRT.

A rating_dimension_j field defines a dimension index at an RRT instance for a region defined by the rating_region field. And, dimension indexes are arranged in numerical order. In particular, a value of rating_dimension_j+1 is greater than a value of the rating_dimension_j.

A rating_level_tag field is an 8-bit unsigned integer that acts as a unique identifier (ID) for this rating value. The value of the rating_level_tag field shall be unique through all the rating regions, dimensions and rating values.

A rating_value field indicates a rating value of a dimension defined at the rating_dimension_j field in a rating region (rating_region).

A rating_description_length field indicates a length of the following rating_description_text( ).

The rating_description_text( ) field is a rating description for a rating in format of a multiple string structure. For instance, a rating_description display string is limited to 16 characters or under. A rating description text represents a rating of a program in an abbreviated format suitable to be displayed on a screen.

As mentioned in the foregoing description, the CAD provides rating information of the programs that are being serviced. A rating restriction item defined by the RRT is checked in a manner of extracting dimension information through the rating_dimensions_j field. And, rating information of a corresponding program (MH service, event or content) is extracted from the rating_value field. In particular, the CAD provides the information indicating that a rating restriction value of an MH service of 'KBS News' is '0'. If '0' is discovered from RRT, it can be observed that the MH service is viewable for all ages.

Figure 38:
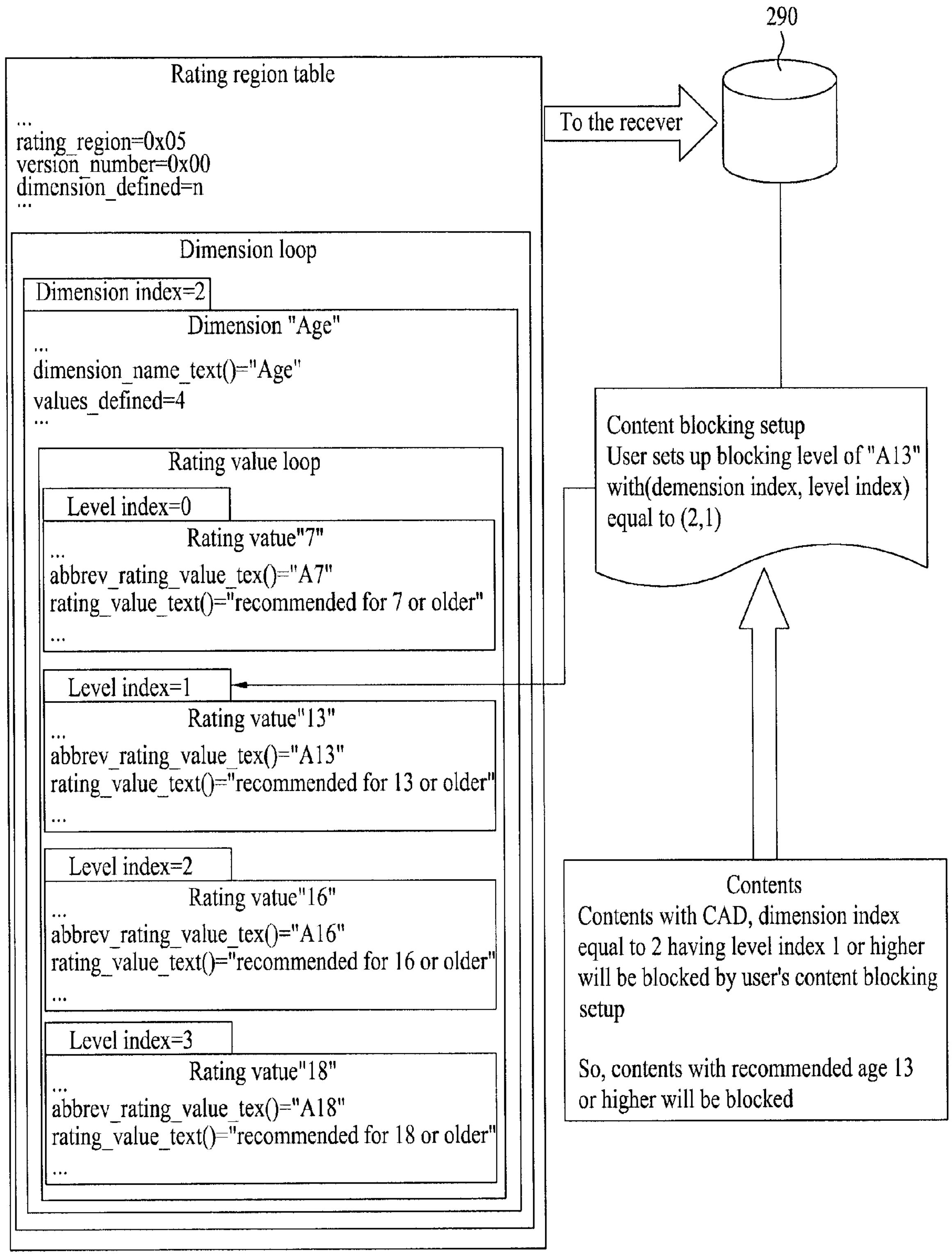
FIG. 38 is a diagram of a process for performing content blocking using RRT and CAD according to one embodiment of the present invention.

FIG. 38 is a diagram of a process for performing content blocking using RRT and CAD according to one embodiment of the present invention.

Referring to FIG. 38, in order to restrict children under a predetermined age from viewing a specific program (event, MH service, channel or content), RRT and CAD are used.

Ratings of programs containing viewing-restricted contents are classified according to a prescribed reference.

This rating classification information is described in the RRT, and rating information on the corresponding program is described in the CAD. Contents of the RRT and CAD decoded by the physical adaptation control signal handler 216 or the SI handler 240 are stored in the storage unit 290.

A user inputs viewing restriction rating information for viewing restriction to a receiver. The inputted information is stored in the receiver. Whether to put a viewing restriction on a corresponding program is then decided in a manner of comparing rating information of the corresponding program, which is obtained using the RRT and CAD stored in the storage unit 290 to the viewing restriction rating information of a user.

Assume that a value of the dimensions_defined field corresponding to the age shown in FIG. 38, i.e., a dimension index is set to 2. Assume that viewing ratings are classified into four types if the dimension index is 2. Assume that the viewing rating is set to an age 7 or above if a level index determined by the values_defined field is 0. Assume that the viewing rating is set to an age 13 or above if a level index determined by the values_defined field is 1. Assume that the viewing rating is set to an age 16 or above if a level index determined by the values_defined field is 2. And, assume that the viewing rating is set to an age 18 or above if a level index determined by the values_defined field is 3.

In order to perform blocking on a program of which user is set to an age 13 or above, assume that a viewing restriction rating of an age 13 or above is inputted.

If a dimension_index of a program received and processed by a receiver is 2 and if a level index is 1, the blocking is performed by providing no service for the program or muting the video.

In particular, the blocking is performed on the program set to the age 13 or above.

Figure 39:
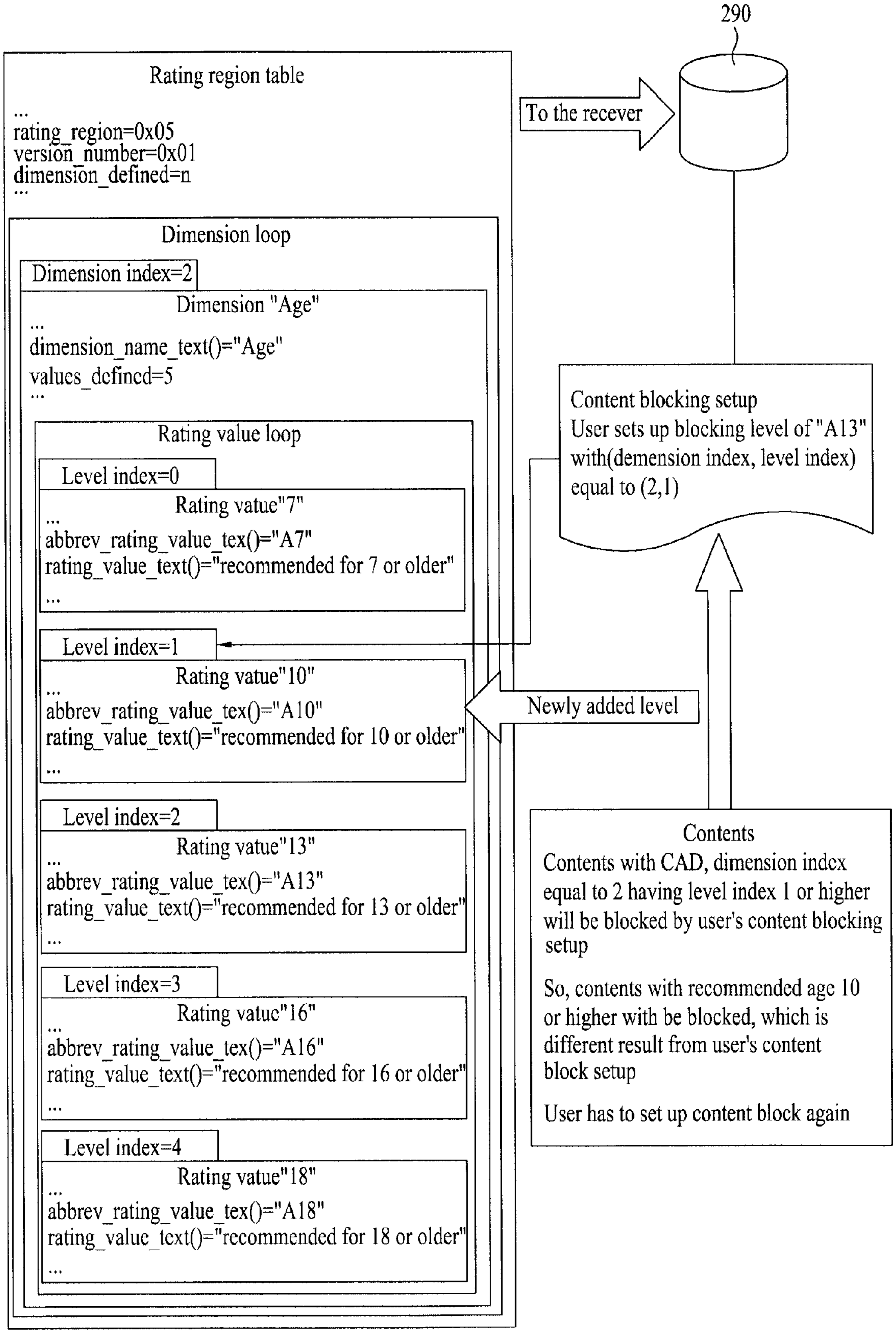
FIG. 39 is a diagram of a process for performing content blocking using RRT and CAD according to another embodiment of the present invention.

FIG. 39 is a diagram of a process for performing content blocking using RRT and CAD according to another embodiment of the present invention.

Referring to FIG. 39, assume that a value of the dimensions_defined field corresponding to the age, i.e., a dimension index is set to 2. Assume that viewing ratings are classified into five types by adding a viewing restriction level if the dimension index is 2. Assume that the viewing rating is set to an age 7 or above if a level index determined by the values_defined field is 0. Assume that the viewing rating is set to an age 10 or above if a level index determined by the values_defined field is 1. Assume that the viewing rating is set to an age 16 or above if a level index determined by the values_defined field is 2. Assume that the viewing rating is set to an age 16 or above if a level index determined by the values_defined field is 3. And, assume that the viewing rating is set to an age 18 or above if a level index determined by the values_defined field is 4.

If a dimension index of a program received and processed by a receiver is 2 and if a level index is 1, the blocking is performed by providing no service for the program or muting the video.

Yet, in the RRT shown in FIG. 39, when dimension index equals to 2 and level index equals to 1, a viewing restriction is the age 10 or above. Therefore, although a user attempts to perform blocking on programs for the age 13 or above, the blocking is actually performed on programs for the age 10 or above.

Thus, the level index may be varied if a viewing restriction level is added or deleted. Yet, since the receiver performs the blocking using the dimension index and the level index only, the blocking may be performed at the viewing restriction level that is not specified by a user.

Figure 40:
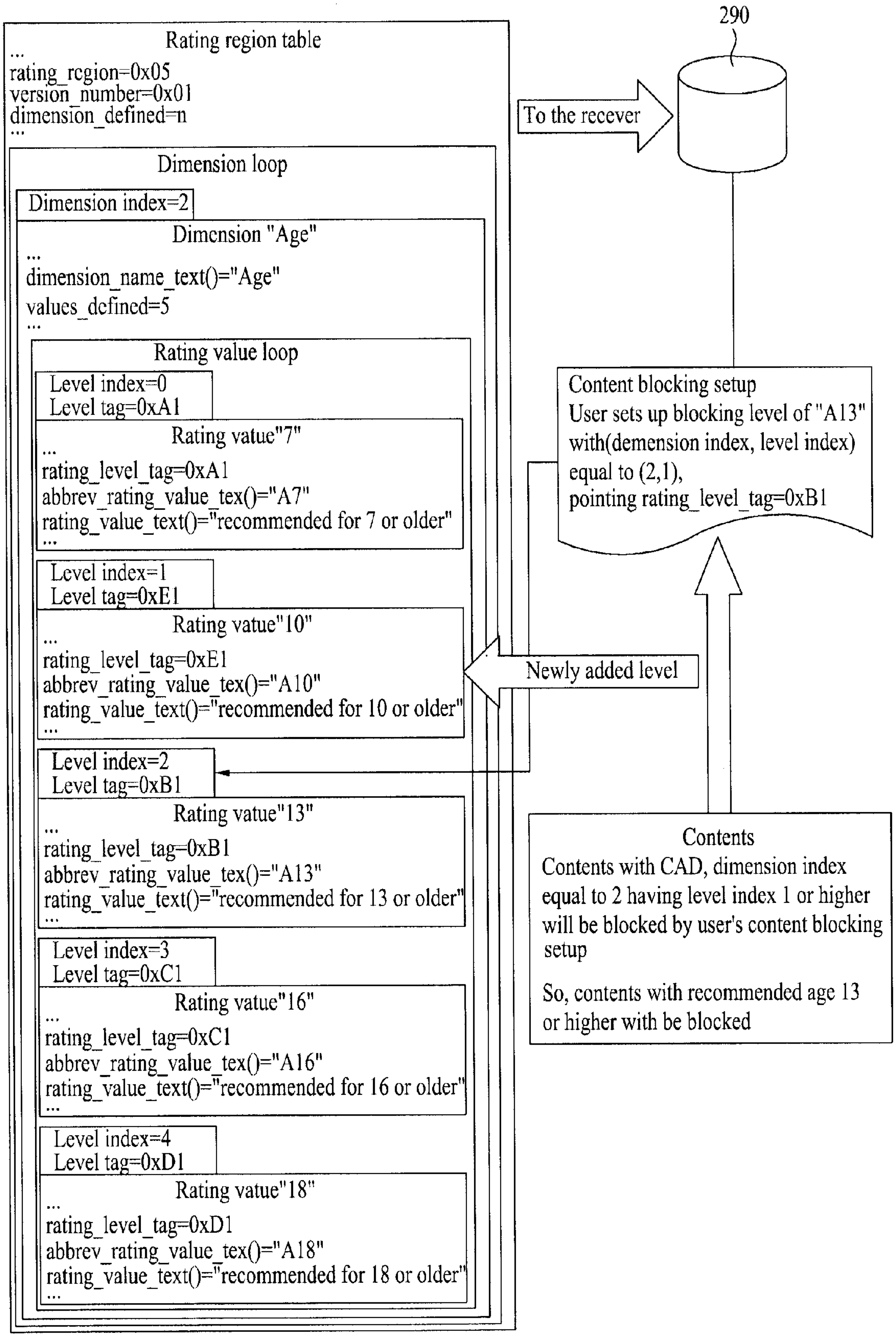
FIG. 40 is a diagram of a process for performing content blocking using RRT and CAD according to a further embodiment of the present invention.

To solve this problem, according to the present invention, parental blocking, as shown in FIG. 40, is performed using the dimension index, the level index and the rating_level_tag field.

The rating_level_tag field acts as a unique identifier (ID) for the corresponding rating value. The value of the rating_level_tag field shall be unique through all the rating regions, dimensions and rating levels. In particular, although a viewing restriction level is added or deleted, the value of the rating_level_tag field is not varied at the corresponding viewing restriction level.

For instance, assume that 0xA1 is allocated for an age 7 or above. Assume that 0xB1 is allocated for an age 13 or above. Assume that 0xC1 is allocated for an age 16 or above. And, assume that 0xD1 is allocated for an age 18 or above. If an age 10 or above is added in a next RRT, the rating_level_tag field value allocated to each age is not changed. In this case, the rating_level_tag field value for the age 10 or above is set to a different value such as 0xE1.

Therefore, in order for a user to perform blocking on a program set to an age 13 or above, assuming that the user inputs a viewing restriction rating of an age 13 or above, the blocking is always performed on the programs for the age 13 or above despite that the viewing restriction level of the RRT is changed thereafter.

Figure 41:
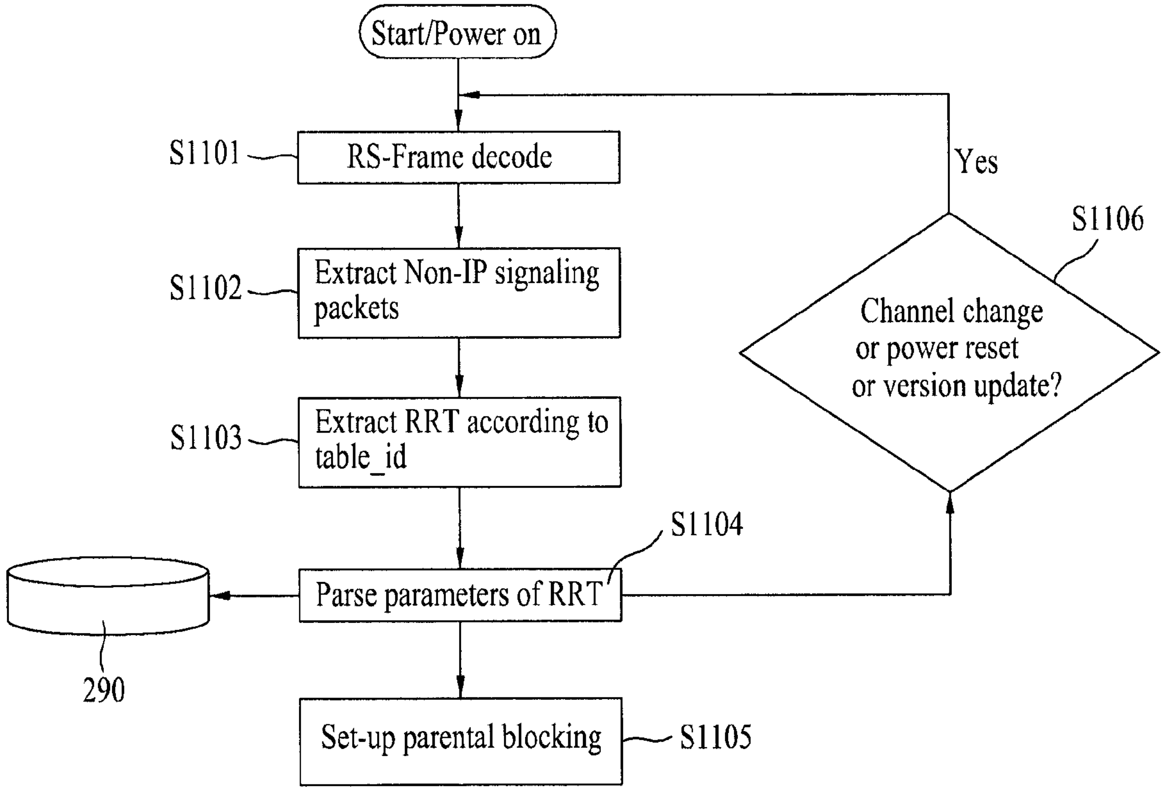
FIG. 41 is a flowchart for a method of processing an RRT received in non-IP signaling format according to one embodiment of the present invention.

FIG. 41 is a flowchart for a method of processing an RRT received in non-IP signaling format according to one embodiment of the present invention.

Referring to FIG. 41, by decoding an RS frame including the RRT (S1101), MH TPs including non-IP signaling table data are extracted (S1102).

RRT is extracted from the MH TP according to table_id (S1103). A parameter of the extracted RRT is parsed. The corresponding result is then stored in the storage unit 290 (S1104).

Parental blocking is performed by referring to the RRT parsing result stored in the storage unit 290 and the CAD which was stored by being received in a descriptor format of SMT and then stored (S1105).

If a channel is switched, if a power is rest, or if an RRT version is updated, the routine goes back to the step S1101 to perform the RRT receiving and processing steps again.

In FIG. 41, the steps S1101 and S1102 are performed by the RS frame handlers 211 and 212, the steps S1103 and S1104 are performed by the physical adaptation control signal handler 216, and the step S1105 is performed by the presentation controller 330, for example.

Figure 42:
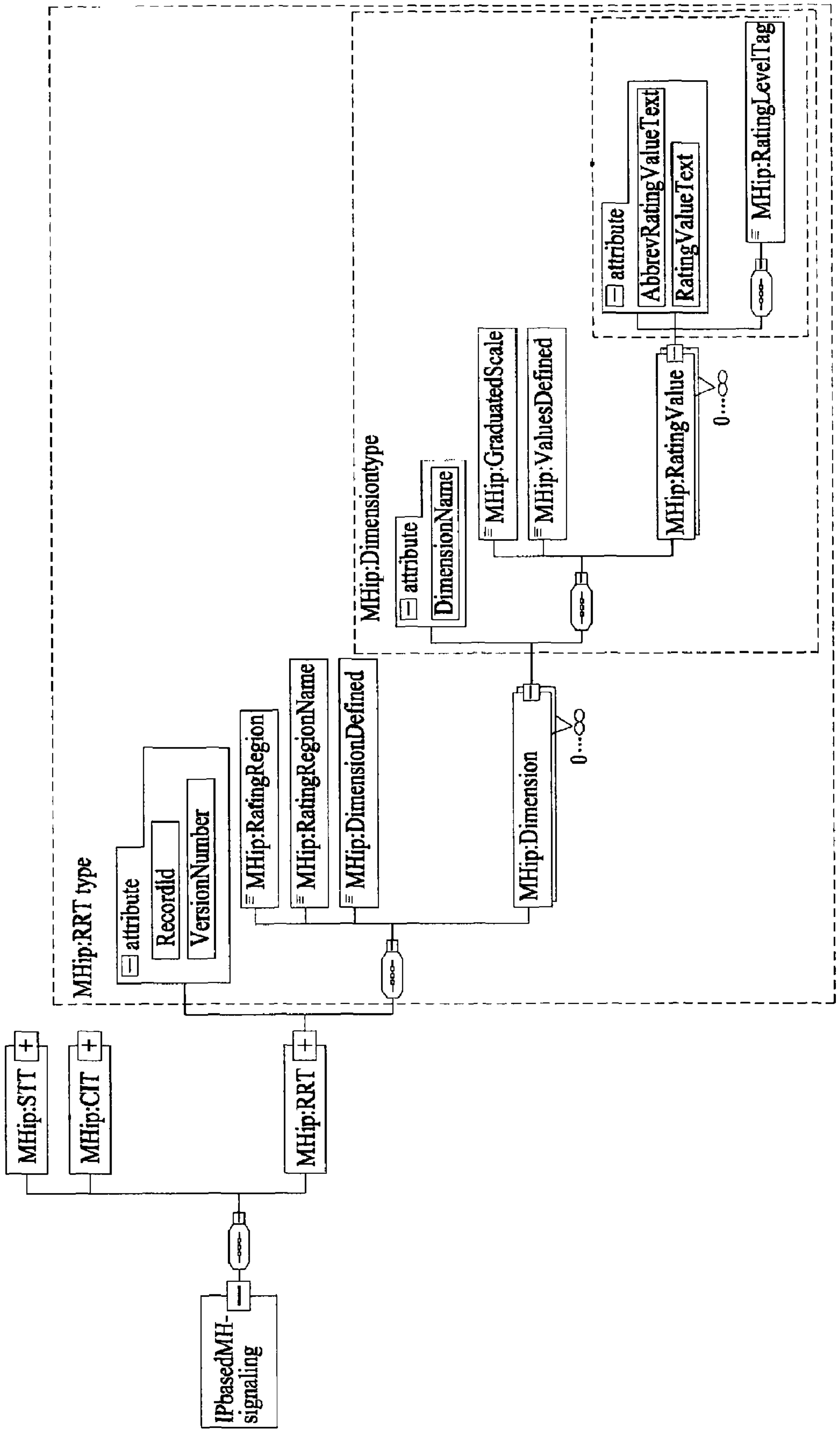
FIG. 42 is an exemplary diagram for an XML data structure of RRT data received in IP based signaling format according to the present invention.

FIG. 42 is an exemplary diagram for an XML data structure of RRT data received in IP based signaling format according to the present invention, and FIG. 43 is a diagram for the RRT data of FIG. 42 represented in XML schema format.

Referring to FIG. 42 and FIG. 43, an IP based signaling element IPbasedMH signaling can include STT, CIT and RRT elements as lower elements.

The RRT element can include Recordid and VersionNumber fields defined as attributes.

The Recordid field indicates a unique identifier for identifying the RRT element. And, the VersionNUmber field indicates a version number of the RRT element.

The RRT element can include RatingRegion, RatingRegionName, DimensionDefined and Dimension elements as lower elements.

The Dimension element defines a DimensionName field as an attribute. And, the Dimension element can include GraduateScale, ValuesDefined and RatingValue elements as lower elements.

The RatingValue element can include AbbrevRatingValueText and RatingValueText fields that are defined as attributes. And, the RatingValue element can include a RatingLevelTag field as a lower element.

The RatingRegion element indicates a total length of the following RatingRegionName element.

The RatingRegionName element represents a rating region name having a broadcast rating applied thereto as a multiple string structure.

The DimensionsDefined element indicates the number of dimensions currently defined in RRT.

The DimensionName field of the Dimension element indicates a dimension name.

The GraduateScale element of the Dimension element indicates whether a rating value has a graduated scale in the corresponding dimension.

The ValuesDefined element indicates the number of values defined in the corresponding dimension.

The AbbrevRatingValueText field of the RatingValue element indicates an abbreviated name of a specific rating value.

The RatingLevelTag element of the RatingValue element indicates a unique identifier that can identify the corresponding rating value. The rating_level_tag element indicates a unique value through all rating regions, dimensions and rating levels.

FIG. 44 is an exemplary diagram for an XML data structure of CAD data received in IP based signaling format according to the present invention, and FIG. 45 is a diagram for the CAD data of FIG. 44 represented in XML schema format.

Referring to FIG. 44 and FIG. 45, an IP based CAD element CADtype defines a DescriptionTag field as an attribute and defines a RatedDimension element as a lower element.

The RatedDimension element can include RatingLevelTag and RatingValue elements as lower elements.

The RatingLevelTag element represents a unique identifier that can identify a corresponding rating value. The rating_level_tag element indicates a unique value through all rating regions, dimensions and rating levels.

The RatingValue element indicates a rating value of a dimension defined at the rating_dimension_j field in the rating region (rating_region).

Figure 46:
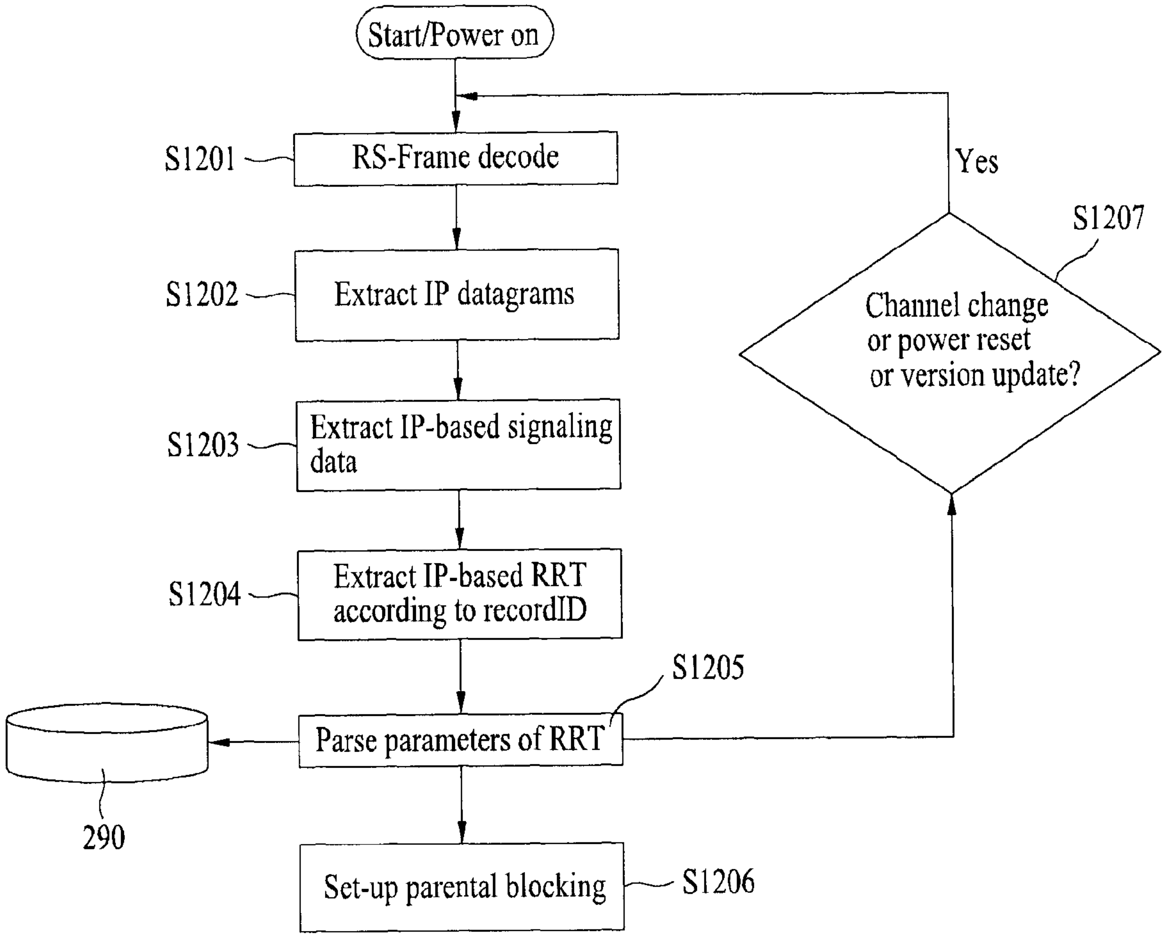
FIG. 46 is a flowchart for a method of processing an RRT received in IP based signaling format according to one embodiment of the present invention.

FIG. 46 is a flowchart for a method of processing an RRT received in IP based signaling format according to one embodiment of the present invention. In this case, the RRT is encapsulated by UDP/IP with a target IP address and a target UDP port number on IP datagram and is then received in IP based signaling format by being included in an RS frame. In doing so, an IP address of and a UDP port number the RRT use well-known values, whereby a receiving system is able to receive the RRT without separate IP access information.

Referring to FIG. 46, by decoding an RS frame including the RRT (S1201), IP datagrams are extracted from MH TPs within the RS frame (S1202). Subsequently, IP based signaling data are extracted from the IP datagrams extracted in the step S1202.

IP based RRT is extracted from the IP based signaling data according to Recordid (S1204), a parameter of the extracted RRT is parsed, and the corresponding result is then stored in the storage unit 290 (S1205).

Parental blocking is performed by referring to the RRT parsing result stored in the storage unit 290 and the CAD which was parsed and stored by being received in a descriptor format of SMT (S1206). If a channel is switched, if a power is reset or if an RRT version is updated, the routine goes back to the step S1201 and then repeats the RRT receiving and processing process.

In FIG. 46, the steps S1201 and S1202 are performed by the RS frame handlers 211 and 212, the step S1203 is performed by the IP network stack 220, the steps S1204 and S1205 are performed by the SI handler 240, and the step S1206 is performed by the presentation controller 330, for example.

Accordingly, the present invention receives and processes signaling table information in non-IP or IP-based signaling format (e.g., STT, CIT and RRT). In particular, the present invention is able to set up a current local time and date by processing the STT. By processing the CIT, if a power of a currently received MH signal becomes lower than a preset threshold, the present invention is able to receive an MH signal from a transmitter having a strongest power by sensing MH signals of adjacent cells. And, the present invention is able to perform blocking of a user-specific program by processing the RRT. In particular, even if a viewing restriction level within the RRT is changed, the present invention able to correctly block a program to a user-specific viewing restriction level.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing broadcast data in a broadcast receiver, the method comprising:

receiving a broadcast signal, the broadcast signal comprising fast information channel (FIC) data, transmission parameter channel (TPC) data, mobile service data, and signaling information data describing rating information of the mobile service data, wherein the FIC data includes information for rapid mobile service acquisition, and wherein the TPC data includes FIC version information for indicating an update of the FIC data;

demodulating the received broadcast signal;

building a Reed-Solomon (RS) frame including the mobile service data of the demodulated broadcast signal, the RS frame belonging to an ensemble, the ensemble including the signaling information data; and obtaining the signaling information data from the ensemble, wherein the signaling information data is delivered through a mobile and handheld (M/H) service signaling channel (SSC), and wherein Internet Protocol (IP) datagrams carried through the M/H SSC have a well-known IP address and a well-known User Datagram Protocol (UDP) port number.

2. The method of claim 1, wherein obtaining the signaling information data comprises:

obtaining the rating information of the mobile service data from the signaling information data;

comparing the obtained rating information of the mobile service data to viewing restriction rating information set by a user; and determining a presence or non-presence of a viewing restriction of the mobile service data.

3. The method of claim 2, further comprising determining a display of the mobile service data by blocking the mobile service data if the presence of the viewing restriction of the mobile service data is determined.

4. The method of claim 1, wherein the signaling information data includes a rating region table (RRT) describing rating classification information of the mobile service data and a content advisory descriptor (CAD) describing the rating information on the corresponding mobile service data.

5. The method of claim 4, wherein each of the rating region table (RRT) and the content advisory descriptor (CAD) includes rating level tag information for identifying a corresponding rating level uniquely.

6. The method of claim 5, further comprising:

determining a presence or non-presence of a viewing restriction of the mobile service data by referring to the rating level tag information of the corresponding mobile service data obtained from the rating region table (RRT) and the content advisory descriptor (CAD).

7. The method of claim 1, wherein the RS frame is mapped into a plurality of groups, each of the plurality of groups including a portion of data included in the RS frame, the FIC data, the TPC data and a plurality of known data sequences.

8. The method of claim 7, wherein the FIC data and the TPC data are inserted between a first known data sequence and a second known data sequence among the plurality of known data sequences.

9. A broadcast receiver comprising:

a tuner for receiving a broadcast signal, the broadcast signal comprising fast information channel (FIC) data, transmission parameter channel (TPC) data, mobile service data, and signaling information data describing rating information of the mobile service data, wherein the FIC data includes information for rapid mobile service acquisition, and wherein the TPC data includes FIC version information for indicating an update of the FIC data;

a demodulator for demodulating the received broadcast signal;

a Reed-Solomon (RS) frame decoder for building an RS frame including the mobile service data of the demodulated broadcast signal, the RS frame belonging to an ensemble, the ensemble including the signaling information data; and a handler for obtaining the signaling information data from the ensemble, wherein the signaling information data is delivered through a mobile and handheld (M/H) service signaling channel (SSC), and wherein Internet Protocol (IP) datagrams carried through the M/H SSC have a well-known IP address and a well-known User Data Protocol (UDP) port number.

10. The broadcast receiver of claim 9, wherein the handler obtains the rating information of the mobile service data from the signaling information data, compares the obtained rating information of the mobile service data to viewing restriction rating information set by a user, and determines a presence or non-presence of a viewing restriction of the mobile service data.

11. The broadcast receiver of claim 10, wherein the handler determines a display of the mobile service data and blocks the mobile service data if the presence of the viewing restriction of the mobile service data is determined.

12. The broadcast receiver of claim 9, wherein the signaling information data includes a rating region table (RRT) describing rating classification information of the mobile service data and a content advisory descriptor (CAD) describing the rating information on the corresponding mobile service data.

13. The broadcast receiver of claim 12, wherein each of the rating region table (RRT) and the content advisory descriptor (CAD) includes rating level tag information for identifying a corresponding rating level uniquely.

14. The broadcast receiver of claim 13, wherein the receiver determines a presence or non-presence of a viewing restriction of the mobile service data by referring to the rating level tag information of the corresponding mobile service data obtained from the rating region table (RRT) and the content advisory descriptor (CAD).

15. The broadcast receiver of claim 9, wherein the the RS frame is mapped into a plurality of groups, each of the plurality of groups including a portion of data included in the RS frame, the FIC data, the TPC data and a plurality of known data sequences.

16. The broadcast receiver of claim 15, wherein the FIC data and the TPC data are inserted between a first known data sequence and a second known data sequence among the plurality of known data sequences.

* * * * *